United States Patent
Nurvitadhi et al.

(10) Patent No.: US 12,112,397 B2
(45) Date of Patent: Oct. 8, 2024

(54) PROGRAMMABLE COARSE GRAINED AND SPARSE MATRIX COMPUTE HARDWARE WITH ADVANCED SCHEDULING

(71) Applicant: Intel Corporation, Santa Clara, CA (US)

(72) Inventors: Eriko Nurvitadhi, Hillsoboro, OR (US); Balaji Vembu, Folsom, CA (US); Nicolas C. Galoppo Von Borries, Portland, OR (US); Rajkishore Barik, Santa Clara, CA (US); Tsung-Han Lin, Campbell, CA (US); Kamal Sinha, Rancho Cordova, CA (US); Nadathur Rajagopalan Satish, Santa Clara, CA (US); Jeremy Bottleson, Rancho Cordova, CA (US); Farshad Akhbari, Chandler, AZ (US); Altug Koker, El Dorado Hills, CA (US); Narayan Srinivasa, Portland, OR (US); Dukhwan Kim, San Jose, CA (US); Sara S. Baghsorkhi, San Jose, CA (US); Justin E. Gottschlich, Santa Clara, CA (US); Feng Chen, Shanghai (CN); Elmoustapha Ould-Ahmed-Vall, Chandler, AZ (US); Kevin Nealis, San Jose, CA (US); Xiaoming Chen, Shanghai (CN); Anbang Yao, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/334,733

(22) Filed: Jun. 14, 2023

(65) Prior Publication Data
US 2023/0394616 A1 Dec. 7, 2023

Related U.S. Application Data

(63) Continuation of application No. 17/541,413, filed on Dec. 3, 2021, now Pat. No. 11,727,527, which is a (Continued)

(51) Int. Cl.
*G06T 1/20* (2006.01)
*G06F 9/30* (2018.01)
(Continued)

(52) U.S. Cl.
CPC .............. *G06T 1/20* (2013.01); *G06F 9/3001* (2013.01); *G06F 9/3017* (2013.01);
(Continued)

(58) Field of Classification Search
CPC ....... G06T 1/20; G06F 9/3001; G06F 9/3017; G06F 9/3851; G06F 9/3887;
(Continued)

(56) References Cited

U.S. PATENT DOCUMENTS

| | | |
|---|---|---|
| 7,873,812 B1 | 1/2011 | Mimar |
| 10,528,864 B2 | 1/2020 | Dally et al. |

(Continued)

FOREIGN PATENT DOCUMENTS

| | | |
|---|---|---|
| CN | 104951281 A | 9/2015 |
| EP | 3396533 A2 | 10/2018 |

OTHER PUBLICATIONS

Office Action for CN 201810393515.0, mailed Dec. 11, 2023, 11 pages.
(Continued)

*Primary Examiner* — Maurice L. McDowell, Jr.
(74) *Attorney, Agent, or Firm* — Jaffery Watson Mendonsa & Hamilton LLP

(57) ABSTRACT

One embodiment provides a parallel processor comprising a hardware scheduler to schedule pipeline commands for
(Continued)

compute operations to one or more of multiple types of compute units, a plurality of processing resources including a first sparse compute unit configured for input at a first level of sparsity and hybrid memory circuitry including a memory controller, a memory interface, and a second sparse compute unit configured for input at a second level of sparsity that is greater than the first level of sparsity.

20 Claims, 48 Drawing Sheets

Related U.S. Application Data continuation of application No. 16/928,353, filed on Jul. 14, 2020, now Pat. No. 11,210,760, which is a continuation of application No. 16/197,783, filed on Nov. 21, 2018, now Pat. No. 10,769,748, which is a continuation of application No. 15/581,182, filed on Apr. 28, 2017, now Pat. No. 10,186,011.

(51) Int. Cl.
| | | |
|---|---|---|
| G06F 9/38 | (2018.01) | |
| G06N 3/04 | (2023.01) | |
| G06N 3/044 | (2023.01) | |
| G06N 3/045 | (2023.01) | |
| G06N 3/063 | (2023.01) | |
| G06N 3/08 | (2023.01) | |
| G06N 3/084 | (2023.01) | |

(52) U.S. Cl.
CPC .......... *G06F 9/3851* (2013.01); *G06F 9/3887* (2013.01); *G06F 9/3895* (2013.01); *G06N 3/04* (2013.01); *G06N 3/044* (2023.01); *G06N 3/045* (2023.01); *G06N 3/063* (2013.01); *G06N 3/08* (2013.01); *G06N 3/084* (2013.01)

(58) Field of Classification Search
CPC ..... G06F 9/3895; G06F 9/30196; G06N 3/04; G06N 3/044; G06N 3/045; G06N 3/063; G06N 3/08; G06N 3/084
See application file for complete search history.

(56) References Cited

U.S. PATENT DOCUMENTS

| 10,860,922 | B2 | 12/2020 | Dally et al. |
|---|---|---|---|
| 10,891,538 | B2 | 1/2021 | Dally et al. |
| 2005/0125369 | A1 | 6/2005 | Buck |
| 2006/0200810 | A1 | 9/2006 | McIntosh |
| 2009/0111413 | A1 | 4/2009 | Luschi et al. |
| 2011/0029471 | A1 | 2/2011 | Chakradhar et al. |
| 2014/0089699 | A1 | 3/2014 | O'Connor |
| 2016/0062947 | A1 | 3/2016 | Chetlur et al. |
| 2016/0267380 | A1 | 9/2016 | Gemello et al. |
| 2018/0011663 | A1 | 1/2018 | Kuwamura |
| 2018/0046906 | A1 | 2/2018 | Dally et al. |
| 2018/0307976 | A1 | 10/2018 | Fang |

OTHER PUBLICATIONS

Goodfellow, et al. "Adaptive Computation and Machine Learning Series", Book, Nov. 18, 2016, pp. 98-165, Chapter 5, The MIT Press, Cambridge, MA.
Ross, et al. "Intel Processor Graphics: Architecture & Programming", Power Point Presentation, Aug. 2015, 78 pages, Intel Corporation, Santa Clara, CA.
Shane Cook, "CUDA Programming", Book, 2013, pp. 37-52, Chapter 3, Elsevier Inc., Amsterdam Netherlands.
Nicholas Wilt, "The CUDA Handbook; A Comprehensive Guide to GPU Programming", Book, Jun. 22, 2013, pp. 41-57, Addison-Wesley Professional, Boston, MA.
Stephen Junkins, "The Compute Architecture of Intel Processor Graphics Gen9", paper, Aug. 14, 2015, 22 pages, Version 1.0, Intel Corporation, Santa Clara, CA.
Communication pursuant to Article 94(3) for EP18162635.9, Jun. 5, 2020, 7 pages.
Partial European Search Report for EP18162635.9, Sep. 19, 2018, 14 pages.
Hehoon, Kim Et al., "Performance Analysis of CNN Frameworks for GPUs", 2017 IEEE International Symposium on Performance Analysis of Systems and Software (ISPASS), Apr. 1, 2017, 10 pages.
Pedram Ardavan et al., "A Highly Efficient Multicore Floating-Point FFT Architecture Based on Hybrid Linear Algebra/ FFT Cores", Journal of Signal Processing Systems, vol. 77, No. 1, Jun. 26, 14, pp. 169-190.
Notification on CN Publication No. for Application No. 201810393515.0 (Pub. No. 108805792), Nov. 13, 2018, 110 pages.
Notification on EP Publication No. for Application No. 18162635.9 (Pub. No. 3396533), Oct. 31, 2018, 4 pages.
Summons to Attend Oral Proceedings for EP Application No. 18162635.9, Feb. 22, 2021, 8 pages.
Decision to Grant EP Application No. 18162635.9), Feb. 22, 2021, 8 pages.
Notice of Allowance for U.S. Appl. No. 16/928,353, mailed Aug. 30, 2021,10 pages.
Pattnaik, "Scheduling Techniques for GPU Architectures with Processing-In-Memory Capabilities", PACT '16: Proceedings of the 2016 International Conference on Parallel Architectures and Compilation, Sep. 2016, pp. 31-44.
Notice of Allowance for U.S. Appl. No. 17/541,413, mailed Mar. 23, 2023, 8 pages.
Office Action for CN 201810393515.0, mailed May 15, 2024, 16 pages.

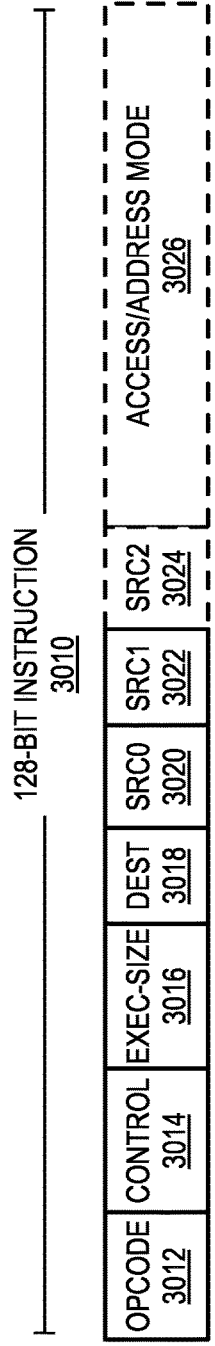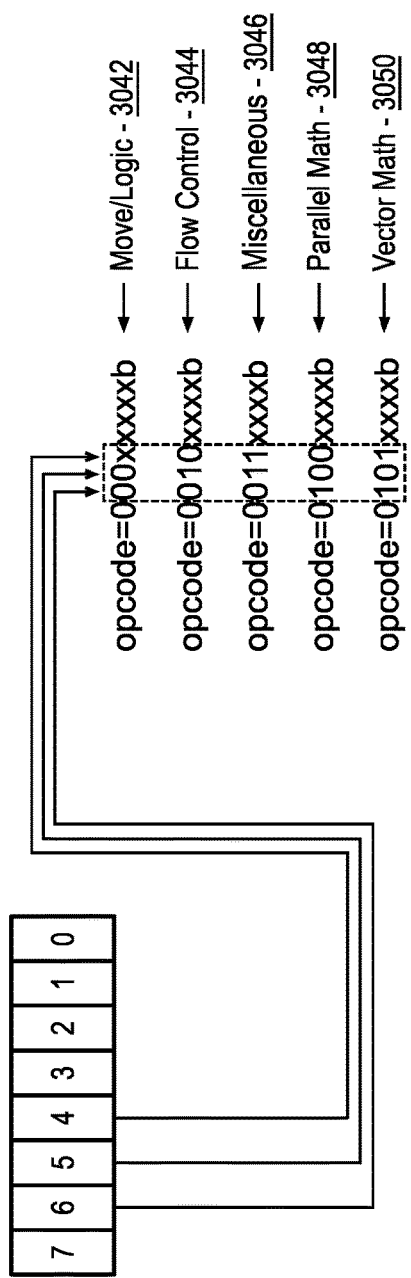
FIG. 30

FIG. 32A  GRAPHICS PROCESSOR COMMAND FORMAT
3200
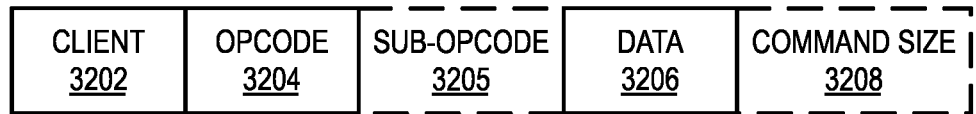
FIG. 32B  GRAPHICS PROCESSOR COMMAND SEQUENCE
3210
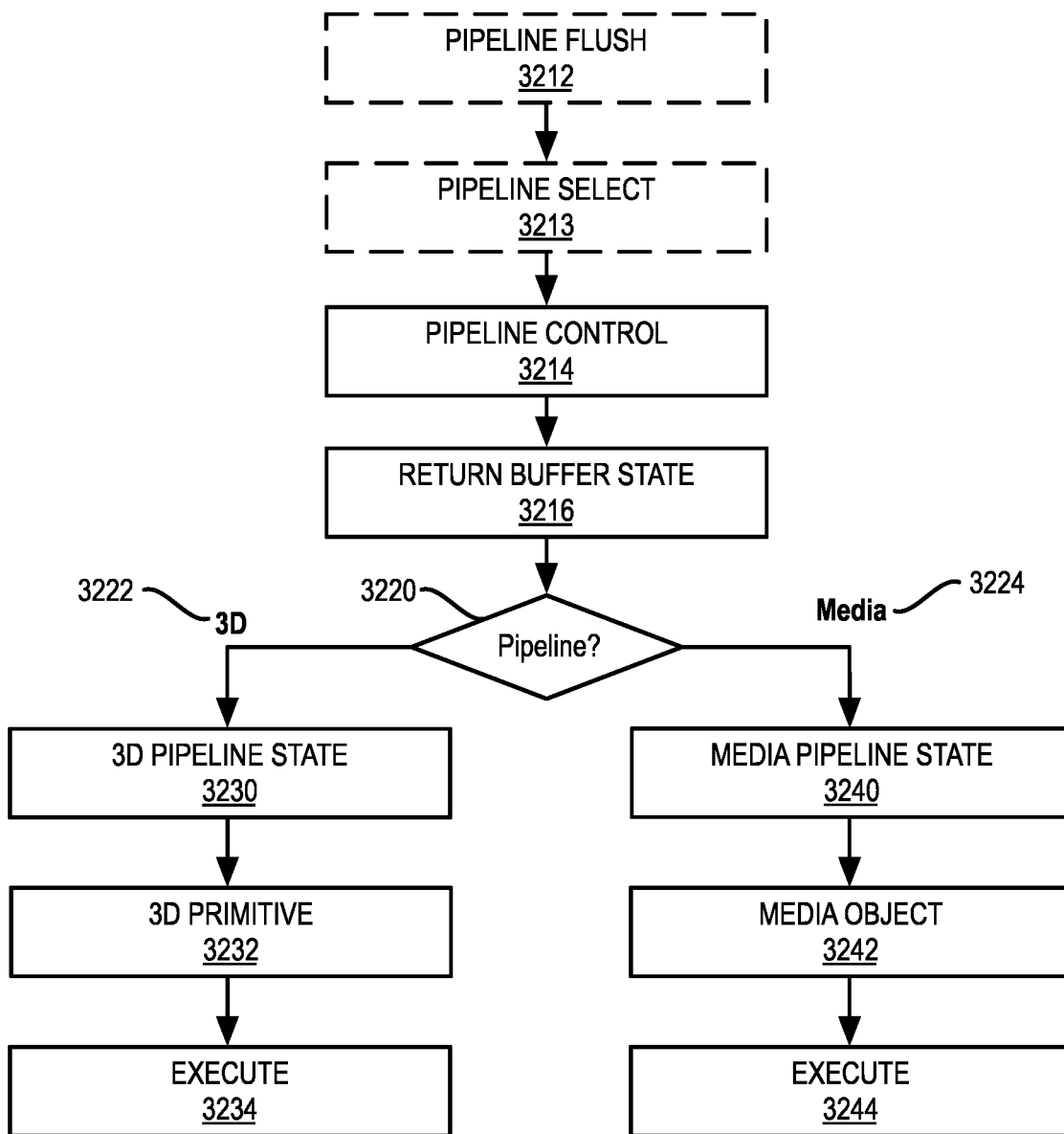

PROGRAMMABLE COARSE GRAINED AND SPARSE MATRIX COMPUTE HARDWARE WITH ADVANCED SCHEDULING

CROSS REFERENCE

This application is a continuation of and claims priority to U.S. patent application Ser. No. 17/541,413, filed Dec. 3, 2021, which is a continuation of U.S. application Ser. No. 16/928,353, filed Jul. 14, 2020, now issued as U.S. Pat. No. 11,210,760, which claims priority to U.S. patent application Ser. No. 16/197,783, filed on Nov. 21, 2018, now issued as U.S. Pat. No. 10,769,748, which claims priority to U.S. patent application Ser. No. 15/581,182, filed Apr. 28, 2017, now issued as U.S. Pat. No. 10,186,011, each of which is hereby incorporated herein by reference.

FIELD

Embodiments relate generally to data processing and more particularly to data processing via a general-purpose graphics processing unit.

BACKGROUND OF THE DESCRIPTION

Current parallel graphics data processing includes systems and methods developed to perform specific operations on graphics data such as, for example, linear interpolation, tessellation, rasterization, texture mapping, depth testing, etc. Traditionally, graphics processors used fixed function computational units to process graphics data; however, more recently, portions of graphics processors have been made programmable, enabling such processors to support a wider variety of operations for processing vertex and fragment data.

To further increase performance, graphics processors typically implement processing techniques such as pipelining that attempt to process, in parallel, as much graphics data as possible throughout the different parts of the graphics pipeline. Parallel graphics processors with single instruction, multiple thread (SIMT) architectures are designed to maximize the amount of parallel processing in the graphics pipeline. In an SIMT architecture, groups of parallel threads attempt to execute program instructions synchronously together as often as possible to increase processing efficiency. A general overview of software and hardware for SIMT architectures can be found in Shane Cook, CUDA Programming, Chapter 3, pages 37-51 (2013) and/or Nicholas Wilt, CUDA Handbook, A Comprehensive Guide to GPU Programming, Sections 2.6.2 to 3.1.2 (June 2013).

BRIEF DESCRIPTION OF THE DRAWINGS

So that the features of the present invention can be understood in detail, a more particular description of the invention may be had by reference to embodiments, some of which are illustrated in the appended drawings. It is to be noted, however, that the appended drawings illustrate only typical embodiments and are therefore not to be considered limiting of the scope of all embodiments.

FIG. 30 is a block diagram illustrating a graphics processor instruction formats according to some embodiments;

FIG. 32A-32B illustrate a graphics processor command format and command sequence, according to some embodiments;

DETAILED DESCRIPTION

In some embodiments, a graphics processing unit (GPU) is communicatively coupled to host/processor cores to accelerate graphics operations, machine-learning operations, pattern analysis operations, and various general-purpose GPU (GPGPU) functions. The GPU may be communicatively coupled to the host processor/cores over a bus or another interconnect (e.g., a high-speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

System Overview

Figure 1:
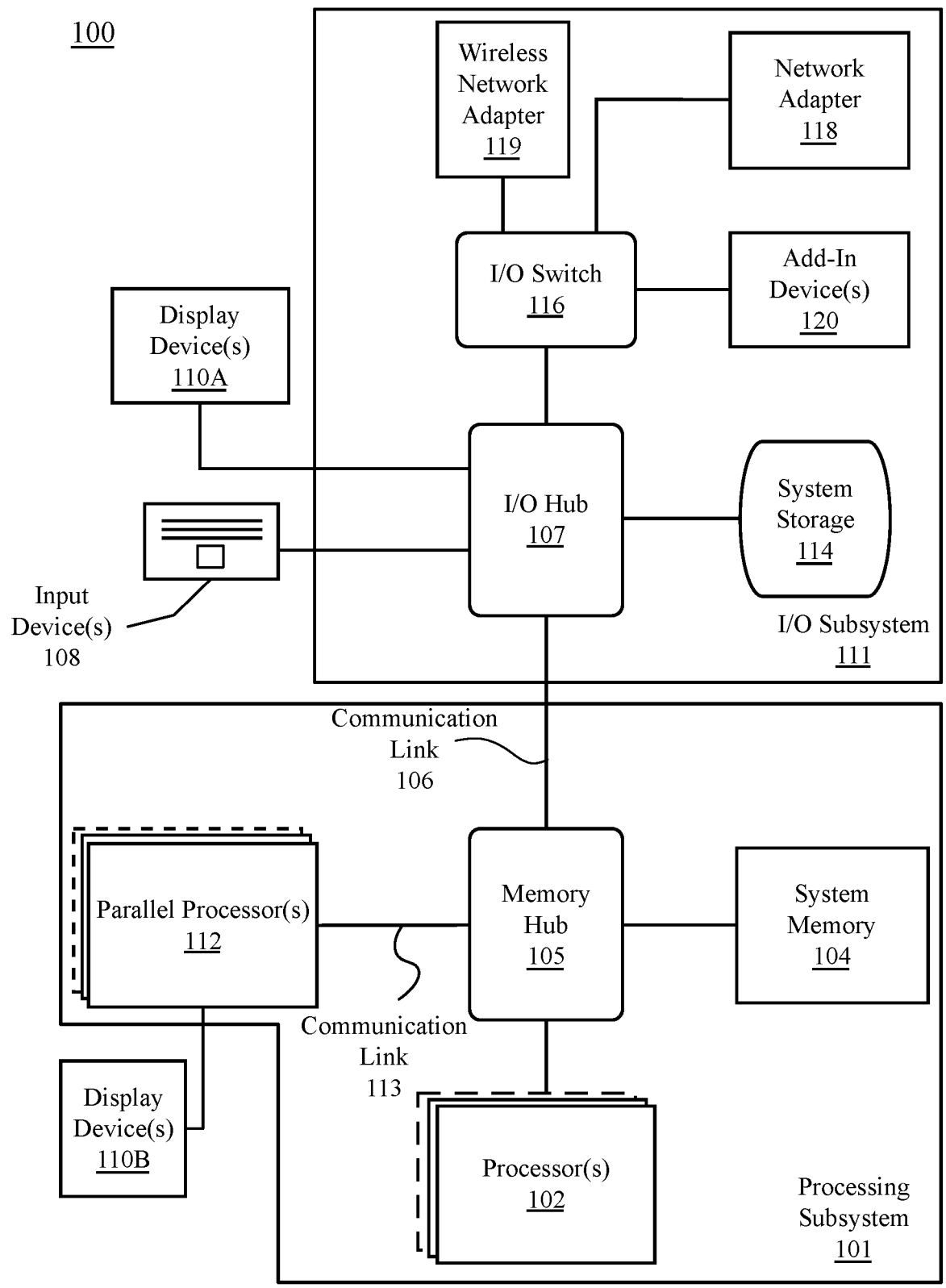
FIG. 1 is a block diagram illustrating a computer system configured to implement one or more aspects of the embodiments described herein.

FIG. 1 is a block diagram illustrating a computing system 100 configured to implement one or more aspects of the embodiments described herein. The computing system 100 includes a processing subsystem 101 having one or more processor(s) 102 and a system memory 104 communicating via an interconnection path that may include a memory hub 105. The memory hub 105 may be a separate component within a chipset component or may be integrated within the one or more processor(s) 102. The memory hub 105 couples with an I/O subsystem 111 via a communication link 106. The I/O subsystem 111 includes an I/O hub 107 that can enable the computing system 100 to receive input from one or more input device(s) 108. Additionally, the I/O hub 107 can enable a display controller, which may be included in the one or more processor(s) 102, to provide outputs to one or more display device(s) 110A. In one embodiment the one or more display device(s) 110A coupled with the I/O hub 107 can include a local, internal, or embedded display device.

In one embodiment the processing subsystem 101 includes one or more parallel processor(s) 112 coupled to memory hub 105 via a bus or other communication link 113. The communication link 113 may be one of any number of standards based communication link technologies or protocols, such as, but not limited to PCI Express, or may be a vendor specific communications interface or communications fabric. In one embodiment the one or more parallel processor(s) 112 form a computationally focused parallel or vector processing system that can include a large number of processing cores and/or processing clusters, such as a many integrated core (MIC) processor. In one embodiment the one or more parallel processor(s) 112 form a graphics processing subsystem that can output pixels to one of the one or more display device(s) 110A coupled via the I/O hub 107. The one or more parallel processor(s) 112 can also include a display controller and display interface (not shown) to enable a direct connection to one or more display device(s) 110B.

Within the I/O subsystem 111, a system storage unit 114 can connect to the I/O hub 107 to provide a storage mechanism for the computing system 100. An I/O switch 116 can be used to provide an interface mechanism to enable connections between the I/O hub 107 and other components, such as a network adapter 118 and/or wireless network adapter 119 that may be integrated into the platform, and various other devices that can be added via one or more add-in device(s) 120. The network adapter 118 can be an Ethernet adapter or another wired network adapter. The wireless network adapter 119 can include one or more of a Wi-Fi, Bluetooth, near field communication (NFC), or other network device that includes one or more wireless radios.

The computing system 100 can include other components not explicitly shown, including USB or other port connections, optical storage drives, video capture devices, and the like, may also be connected to the I/O hub 107. Communication paths interconnecting the various components in FIG. 1 may be implemented using any suitable protocols, such as PCI (Peripheral Component Interconnect) based protocols (e.g., PCI-Express), or any other bus or point-to-point communication interfaces and/or protocol(s), such as the NV-Link high-speed interconnect, or interconnect protocols known in the art.

In one embodiment, the one or more parallel processor(s) 112 incorporate circuitry optimized for graphics and video processing, including, for example, video output circuitry, and constitutes a graphics processing unit (GPU). In another embodiment, the one or more parallel processor(s) 112 incorporate circuitry optimized for general-purpose processing, while preserving the underlying computational architecture, described in greater detail herein. In yet another embodiment, components of the computing system 100 may be integrated with one or more other system elements on a single integrated circuit. For example, the one or more parallel processor(s) 112, memory hub 105, processor(s) 102, and I/O hub 107 can be integrated into a system on chip (SoC) integrated circuit. Alternatively, the components of the computing system 100 can be integrated into a single package to form a system in package (SIP) configuration. In one embodiment at least a portion of the components of the computing system 100 can be integrated into a multi-chip module (MCM), which can be interconnected with other multi-chip modules into a modular computing system.

It will be appreciated that the computing system 100 shown herein is illustrative and that variations and modifications are possible. The connection topology, including the number and arrangement of bridges, the number of processor(s) 102, and the number of parallel processor(s) 112, may be modified as desired. For instance, in some embodiments, system memory 104 is connected to the processor(s) 102 directly rather than through a bridge, while other devices communicate with system memory 104 via the memory hub 105 and the processor(s) 102. In other alternative topologies, the parallel processor(s) 112 are connected to the I/O hub 107 or directly to one of the one or more processor(s) 102, rather than to the memory hub 105. In other embodiments, the I/O hub 107 and memory hub 105 may be integrated into a single chip. Some embodiments may include two or more sets of processor(s) 102 attached via multiple sockets, which can couple with two or more instances of the parallel processor(s) 112.

Some of the particular components shown herein are optional and may not be included in all implementations of the computing system 100. For example, any number of add-in cards or peripherals may be supported, or some components may be eliminated. Furthermore, some architectures may use different terminology for components similar to those illustrated in FIG. 1. For example, the memory hub 105 may be referred to as a Northbridge in some architectures, while the I/O hub 107 may be referred to as a Southbridge.

Figure 2A:
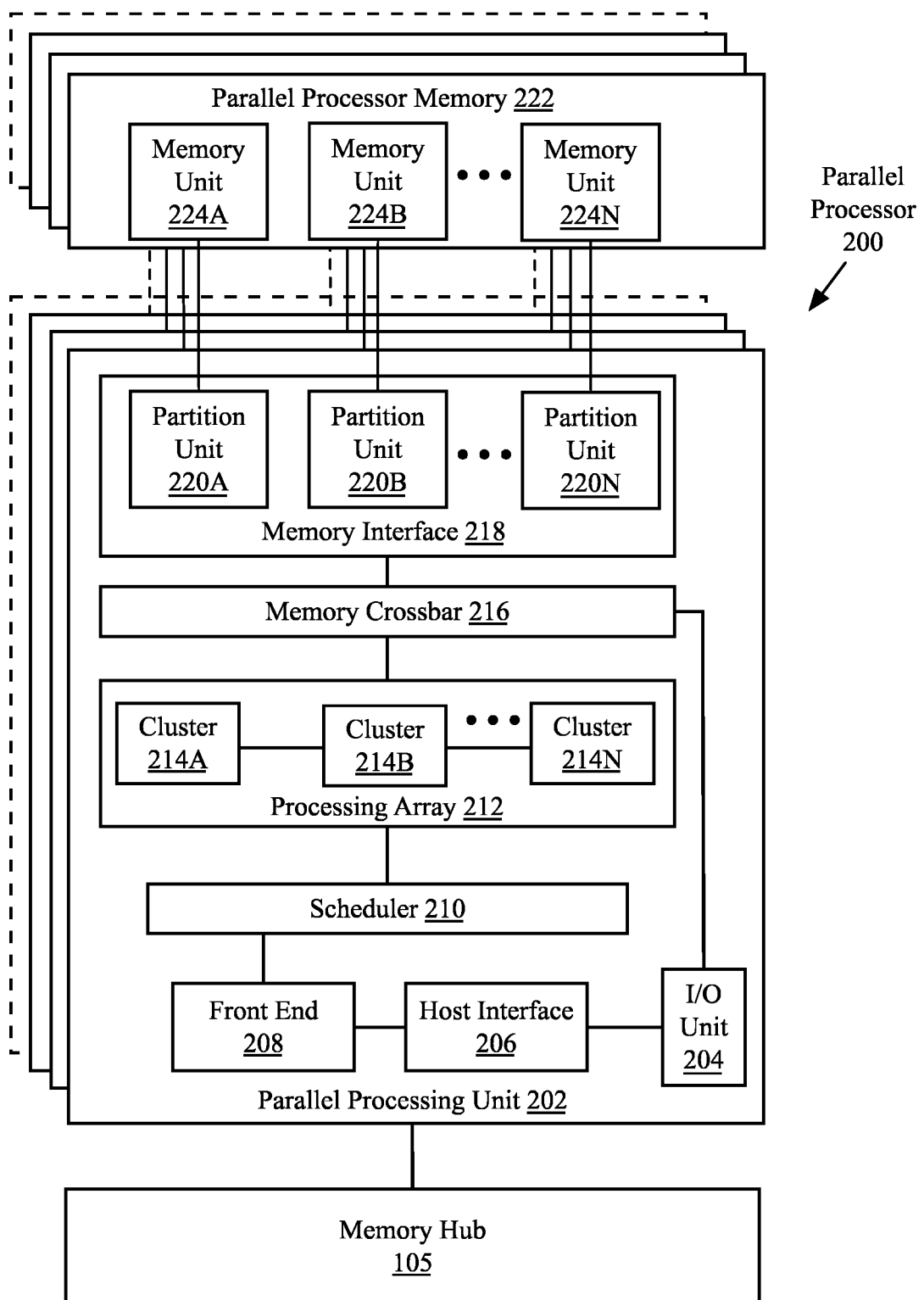
FIG. 2A-2D illustrate parallel processor components, according to an embodiment.

FIG. 2A illustrates a parallel processor 200, according to an embodiment. The various components of the parallel processor 200 may be implemented using one or more integrated circuit devices, such as programmable processors, application specific integrated circuits (ASICs), or field programmable gate arrays (FPGA). The illustrated parallel processor 200 is a variant of the one or more parallel processor(s) 112 shown in FIG. 1, according to an embodiment.

In one embodiment the parallel processor 200 includes a parallel processing unit 202. The parallel processing unit includes an I/O unit 204 that enables communication with other devices, including other instances of the parallel processing unit 202. The I/O unit 204 may be directly connected to other devices. In one embodiment the I/O unit 204 connects with other devices via the use of a hub or switch interface, such as memory hub 105. The connections between the memory hub 105 and the I/O unit 204 form a communication link 113. Within the parallel processing unit 202, the I/O unit 204 connects with a host interface 206 and a memory crossbar 216, where the host interface 206 receives commands directed to performing processing operations and the memory crossbar 216 receives commands directed to performing memory operations.

When the host interface 206 receives a command buffer via the I/O unit 204, the host interface 206 can direct work operations to perform those commands to a front end 208. In one embodiment the front end 208 couples with a scheduler 210, which is configured to distribute commands or other work items to a processing cluster array 212. In one embodiment the scheduler 210 ensures that the processing cluster array 212 is properly configured and in a valid state before tasks are distributed to the processing clusters of the processing cluster array 212. In one embodiment the scheduler 210 is implemented via firmware logic executing on a microcontroller. The microcontroller implemented scheduler 210 is configurable to perform complex scheduling and work distribution operations at coarse and fine granularity, enabling rapid preemption and context switching of threads executing on the processing cluster array 212. In one embodiment, the host software can provide workloads for scheduling on the processing cluster array 212 via one of multiple graphics processing doorbells. The workloads can then be automatically distributed across the processing cluster array 212 by the scheduler 210 logic within the scheduler microcontroller.

The processing cluster array 212 can include up to "N" processing clusters (e.g., cluster 214A, cluster 214B, through cluster 214N). Each cluster 214A-214N of the processing cluster array 212 can execute a large number of concurrent threads. The scheduler 210 can allocate work to the clusters 214A-214N of the processing cluster array 212 using various scheduling and/or work distribution algorithms, which may vary depending on the workload arising for each type of program or computation. The scheduling can be handled dynamically by the scheduler 210, or can be assisted in part by compiler logic during compilation of program logic configured for execution by the processing cluster array 212. In one embodiment, different clusters 214A-214N of the processing cluster array 212 can be allocated for processing different types of programs or for performing different types of computations.

The processing cluster array 212 can be configured to perform various types of parallel processing operations. In one embodiment the processing cluster array 212 is configured to perform general-purpose parallel compute operations. For example, the processing cluster array 212 can include logic to execute processing tasks including filtering of video and/or audio data, performing modeling operations, including physics operations, and performing data transformations.

In one embodiment the processing cluster array 212 is configured to perform parallel graphics processing operations. In embodiments in which the parallel processor 200 is configured to perform graphics processing operations, the processing cluster array 212 can include additional logic to support the execution of such graphics processing operations, including, but not limited to texture sampling logic to perform texture operations, as well as tessellation logic and other vertex processing logic. Additionally, the processing cluster array 212 can be configured to execute graphics processing related shader programs such as, but not limited to vertex shaders, tessellation shaders, geometry shaders, and pixel shaders. The parallel processing unit 202 can transfer data from system memory via the I/O unit 204 for processing. During processing the transferred data can be stored to on-chip memory (e.g., parallel processor memory 222) during processing, then written back to system memory.

In one embodiment, when the parallel processing unit 202 is used to perform graphics processing, the scheduler 210 can be configured to divide the processing workload into approximately equal sized tasks, to better enable distribution of the graphics processing operations to multiple clusters 214A-214N of the processing cluster array 212. In some embodiments, portions of the processing cluster array 212 can be configured to perform different types of processing. For example a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 214A-214N may be stored in buffers to allow the intermediate data to be transmitted between clusters 214A-214N for further processing.

During operation, the processing cluster array 212 can receive processing tasks to be executed via the scheduler 210, which receives commands defining processing tasks from front end 208. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 210 may be configured to fetch the indices corresponding to the tasks or may receive the indices from the front end 208. The front end 208 can be configured to ensure the processing cluster array 212 is configured to a valid state before the workload specified by incoming command buffers (e.g., batch-buffers, push buffers, etc.) is initiated.

Each of the one or more instances of the parallel processing unit 202 can couple with parallel processor memory 222. The parallel processor memory 222 can be accessed via the memory crossbar 216, which can receive memory requests from the processing cluster array 212 as well as the I/O unit 204. The memory crossbar 216 can access the parallel processor memory 222 via a memory interface 218. The memory interface 218 can include multiple partition units (e.g., partition unit 220A, partition unit 220B, through partition unit 220N) that can each couple to a portion (e.g., memory unit) of parallel processor memory 222. In one implementation the number of partition units 220A-220N is configured to be equal to the number of memory units, such that a first partition unit 220A has a corresponding first memory unit 224A, a second partition unit 220B has a corresponding memory unit 224B, and an Nth partition unit 220N has a corresponding Nth memory unit 224N. In other embodiments, the number of partition units 220A-220N may not be equal to the number of memory devices.

In various embodiments, the memory units 224A-224N can include various types of memory devices, including dynamic random access memory (DRAM) or graphics random access memory, such as synchronous graphics random access memory (SGRAM), including graphics double data rate (GDDR) memory. In one embodiment, the memory units 224A-224N may also include 3D stacked memory, including but not limited to high bandwidth memory (HBM). Persons skilled in the art will appreciate that the specific implementation of the memory units 224A-224N can vary, and can be selected from one of various conventional designs. Render targets, such as frame buffers or texture maps may be stored across the memory units 224A-224N, allowing partition units 220A-220N to write portions of each render target in parallel to efficiently use the available bandwidth of parallel processor memory 222. In some embodiments, a local instance of the parallel processor memory 222 may be excluded in favor of a unified memory design that utilizes system memory in conjunction with local cache memory.

In one embodiment, any one of the clusters 214A-214N of the processing cluster array 212 can process data that will be written to any of the memory units 224A-224N within parallel processor memory 222. The memory crossbar 216 can be configured to transfer the output of each cluster 214A-214N to any partition unit 220A-220N or to another cluster 214A-214N, which can perform additional processing operations on the output. Each cluster 214A-214N can communicate with the memory interface 218 through the memory crossbar 216 to read from or write to various external memory devices. In one embodiment the memory crossbar 216 has a connection to the memory interface 218 to communicate with the I/O unit 204, as well as a connection to a local instance of the parallel processor memory 222, enabling the processing units within the different processing clusters 214A-214N to communicate with system memory or other memory that is not local to the parallel processing unit 202. In one embodiment the memory crossbar 216 can use virtual channels to separate traffic streams between the clusters 214A-214N and the partition units 220A-220N.

While a single instance of the parallel processing unit 202 is illustrated within the parallel processor 200, any number of instances of the parallel processing unit 202 can be included. For example, multiple instances of the parallel processing unit 202 can be provided on a single add-in card, or multiple add-in cards can be interconnected. The different instances of the parallel processing unit 202 can be configured to inter-operate even if the different instances have different numbers of processing cores, different amounts of local parallel processor memory, and/or other configuration differences. For example and in one embodiment, some instances of the parallel processing unit 202 can include higher precision floating-point units relative to other instances. Systems incorporating one or more instances of the parallel processing unit 202 or the parallel processor 200 can be implemented in a variety of configurations and form factors, including but not limited to desktop, laptop, or handheld personal computers, servers, workstations, game consoles, and/or embedded systems.

Figure 2B:
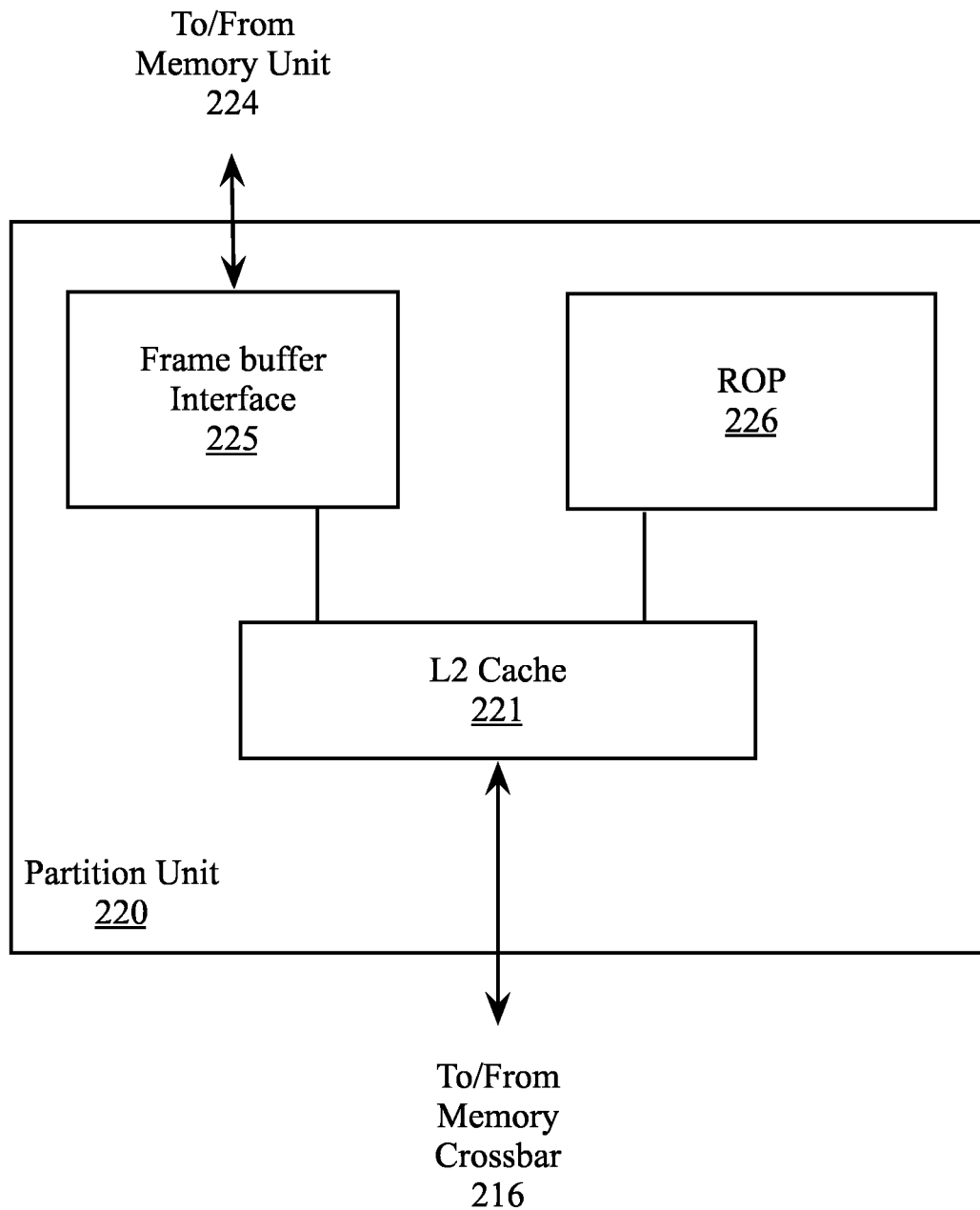

FIG. 2B is a block diagram of a partition unit 220, according to an embodiment. In one embodiment the partition unit 220 is an instance of one of the partition units 220A-220N of FIG. 2A. As illustrated, the partition unit 220 includes an L2 cache 221, a frame buffer interface 225, and a ROP 226 (raster operations unit). The L2 cache 221 is a read/write cache that is configured to perform load and store operations received from the memory crossbar 216 and ROP 226. Read misses and urgent write-back requests are output by L2 cache 221 to frame buffer interface 225 for processing. Updates can also be sent to the frame buffer via the frame buffer interface 225 for processing. In one embodiment the frame buffer interface 225 interfaces with one of the memory units in parallel processor memory, such as the memory units 224A-224N of FIG. 2A (e.g., within parallel processor memory 222).

In graphics applications, the ROP 226 is a processing unit that performs raster operations such as stencil, z test, blending, and the like. The ROP 226 then outputs processed graphics data that is stored in graphics memory. In some embodiments the ROP 226 includes compression logic to compress depth or color data that is written to memory and decompress depth or color data that is read from memory. The compression logic can be lossless compression logic that makes use of one or more of multiple compression algorithms. The type of compression that is performed by the ROP 226 can vary based on the statistical characteristics of the data to be compressed. For example, in one embodiment, delta color compression is performed on depth and color data on a per-tile basis.

In some embodiments, the ROP 226 is included within each processing cluster (e.g., cluster 214A-214N of FIG. 2A) instead of within the partition unit 220. In such embodiment, read and write requests for pixel data are transmitted over the memory crossbar 216 instead of pixel fragment data. The processed graphics data may be displayed on a display device, such as one of the one or more display device(s) 110 of FIG. 1, routed for further processing by the processor(s) 102, or routed for further processing by one of the processing entities within the parallel processor 200 of FIG. 2A.

Figure 2C:
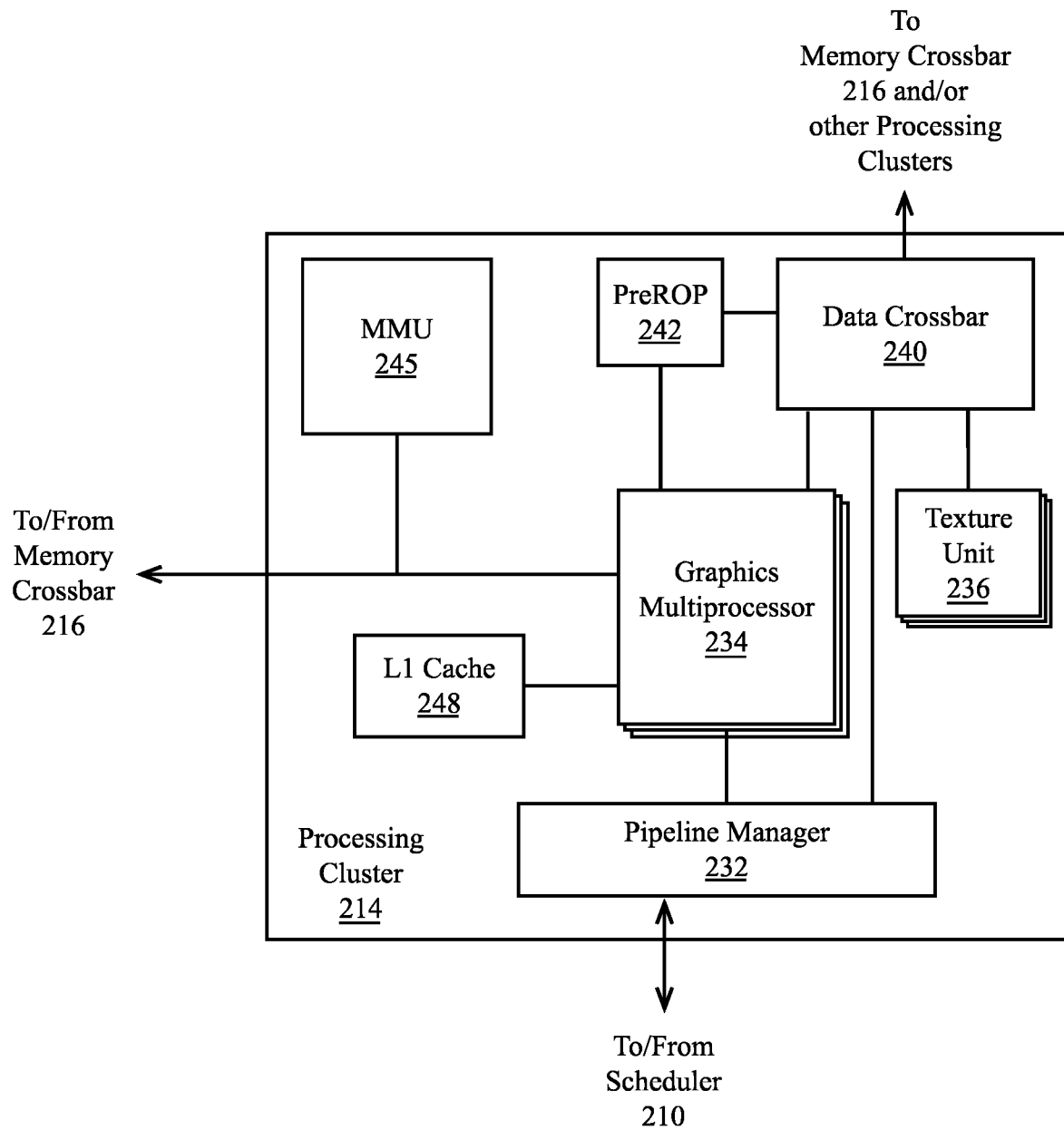

FIG. 2C is a block diagram of a processing cluster 214 within a parallel processing unit, according to an embodiment. In one embodiment the processing cluster is an instance of one of the processing clusters 214A-214N of FIG. 2A. The processing cluster 214 can be configured to execute many threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the processing clusters. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of the processing cluster 214 can be controlled via a pipeline manager 232 that distributes processing tasks to SIMT parallel processors. The pipeline manager 232 receives instructions from the scheduler 210 of FIG. 2A and manages execution of those instructions via a graphics multiprocessor 234 and/or a texture unit 236. The illustrated graphics multiprocessor 234 is an exemplary instance of a SIMT parallel processor. However, various types of SIMT parallel processors of differing architectures may be included within the processing cluster 214. One or more instances of the graphics multiprocessor 234 can be included within a processing cluster 214. The graphics multiprocessor 234 can process data and a data crossbar 240 can be used to distribute the processed data to one of multiple possible destinations, including other shader units. The pipeline manager 232 can facilitate the distribution of processed data by specifying destinations for processed data to be distributed via the data crossbar 240.

Each graphics multiprocessor 234 within the processing cluster 214 can include an identical set of functional execution logic (e.g., arithmetic logic units, load-store units, etc.). The functional execution logic can be configured in a pipelined manner in which new instructions can be issued before previous instructions are complete. The functional execution logic supports a variety of operations including integer and floating-point arithmetic, comparison operations, Boolean operations, bit-shifting, and computation of various algebraic functions. In one embodiment the same functional-unit hardware can be leveraged to perform different operations and any combination of functional units may be present.

The instructions transmitted to the processing cluster 214 constitutes a thread. A set of threads executing across the set of parallel processing engines is a thread group. A thread group executes the same program on different input data. Each thread within a thread group can be assigned to a different processing engine within a graphics multiprocessor 234. A thread group may include fewer threads than the number of processing engines within the graphics multiprocessor 234. When a thread group includes fewer threads than the number of processing engines, one or more of the processing engines may be idle during cycles in which that thread group is being processed. A thread group may also include more threads than the number of processing engines within the graphics multiprocessor 234. When the thread group includes more threads than the number of processing engines within the graphics multiprocessor 234, processing can be performed over consecutive clock cycles. In one embodiment multiple thread groups can be executed concurrently on a graphics multiprocessor 234.

In one embodiment the graphics multiprocessor 234 includes an internal cache memory to perform load and store operations. In one embodiment, the graphics multiprocessor 234 can forego an internal cache and use a cache memory (e.g., L1 cache 248) within the processing cluster 214. Each graphics multiprocessor 234 also has access to L2 caches within the partition units (e.g., partition units 220A-220N of FIG. 2A) that are shared among all processing clusters 214 and may be used to transfer data between threads. The graphics multiprocessor 234 may also access off-chip global memory, which can include one or more of local parallel processor memory and/or system memory. Any memory external to the parallel processing unit 202 may be used as global memory. Embodiments in which the processing cluster 214 includes multiple instances of the graphics multiprocessor 234 can share common instructions and data, which may be stored in the L1 cache 248.

Each processing cluster 214 may include an MMU 245 (memory management unit) that is configured to map virtual addresses into physical addresses. In other embodiments, one or more instances of the MMU 245 may reside within the memory interface 218 of FIG. 2A. The MMU 245 includes a set of page table entries (PTEs) used to map a virtual address to a physical address of a tile and optionally a cache line index. The MMU 245 may include address translation lookaside buffers (TLB) or caches that may reside within the graphics multiprocessor 234 or the L1 cache or processing cluster 214. The physical address is processed to distribute surface data access locality to allow efficient request interleaving among partition units. The cache line index may be used to determine whether a request for a cache line is a hit or miss.

In graphics and computing applications, a processing cluster 214 may be configured such that each graphics multiprocessor 234 is coupled to a texture unit 236 for performing texture mapping operations, e.g., determining texture sample positions, reading texture data, and filtering the texture data. Texture data is read from an internal texture L1 cache (not shown) or in some embodiments from the L1 cache within graphics multiprocessor 234 and is fetched from an L2 cache, local parallel processor memory, or system memory, as needed. Each graphics multiprocessor 234 outputs processed tasks to the data crossbar 240 to provide the processed task to another processing cluster 214 for further processing or to store the processed task in an L2 cache, local parallel processor memory, or system memory via the memory crossbar 216. A preROP 242 (pre-raster operations unit) is configured to receive data from graphics multiprocessor 234, direct data to ROP units, which may be located with partition units as described herein (e.g., partition units 220A-220N of FIG. 2A). The preROP 242 unit can perform optimizations for color blending, organize pixel color data, and perform address translations.

It will be appreciated that the core architecture described herein is illustrative and that variations and modifications are possible. Any number of processing units, e.g., graphics multiprocessor 234, texture units 236, preROPs 242, etc., may be included within a processing cluster 214. Further, while only one processing cluster 214 is shown, a parallel processing unit as described herein may include any number of instances of the processing cluster 214. In one embodiment, each processing cluster 214 can be configured to operate independently of other processing clusters 214 using separate and distinct processing units, L1 caches, etc.

Figure 2D:
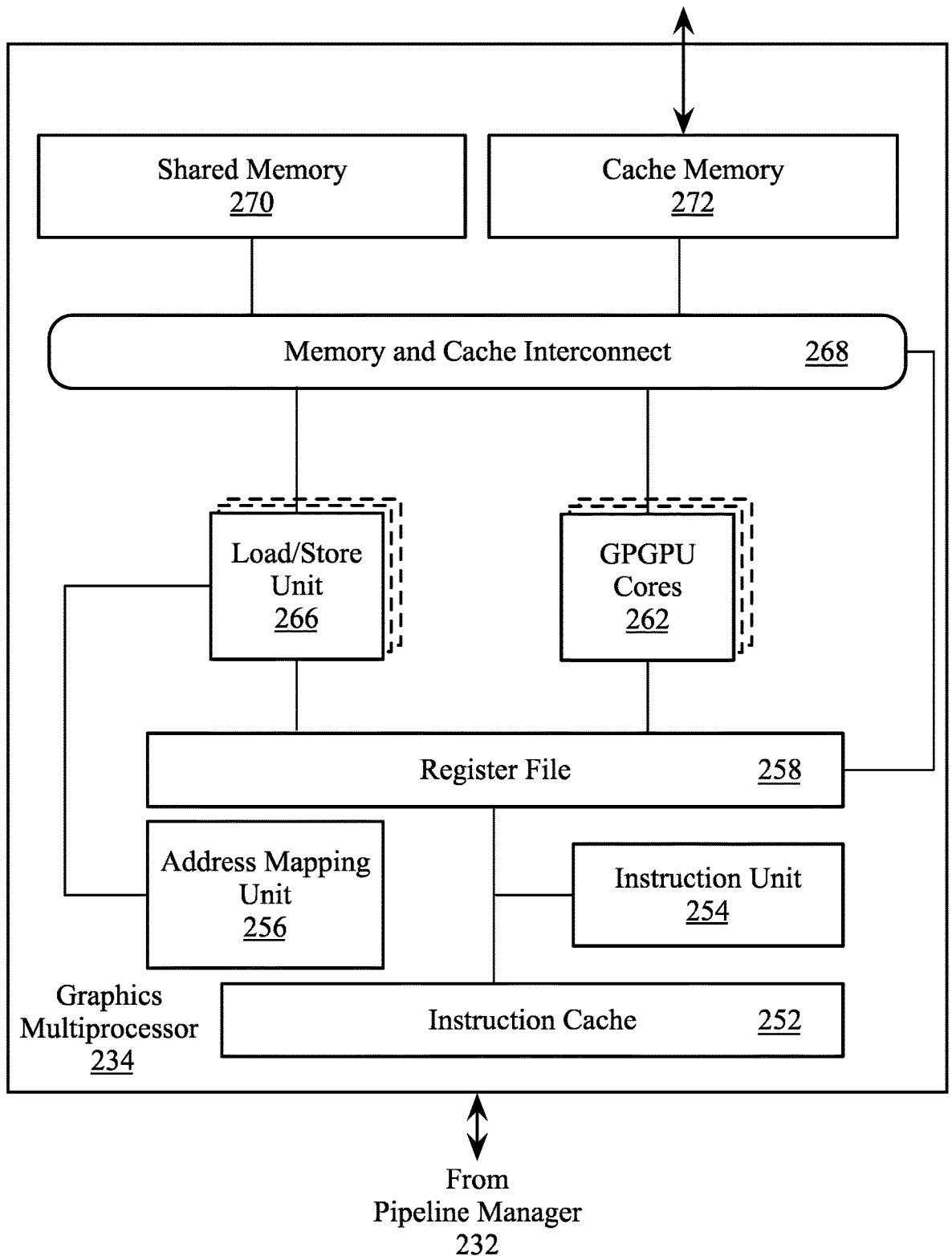

FIG. 2D shows a graphics multiprocessor 234, according to one embodiment. In such embodiment the graphics multiprocessor 234 couples with the pipeline manager 232 of the processing cluster 214. The graphics multiprocessor 234 has an execution pipeline including but not limited to an instruction cache 252, an instruction unit 254, an address mapping unit 256, a register file 258, one or more general-purpose graphics processing unit (GPGPU) cores 262, and one or more load/store units 266. The GPGPU cores 262 and load/store units 266 are coupled with cache memory 272 and shared memory 270 via a memory and cache interconnect 268.

In one embodiment, the instruction cache 252 receives a stream of instructions to execute from the pipeline manager 232. The instructions are cached in the instruction cache 252 and dispatched for execution by the instruction unit 254. The instruction unit 254 can dispatch instructions as thread groups (e.g., warps), with each thread of the thread group assigned to a different execution unit within GPGPU core 262. An instruction can access any of a local, shared, or global address space by specifying an address within a unified address space. The address mapping unit 256 can be used to translate addresses in the unified address space into a distinct memory address that can be accessed by the load/store units 266.

The register file 258 provides a set of registers for the functional units of the graphics multiprocessor 234. The register file 258 provides temporary storage for operands connected to the data paths of the functional units (e.g., GPGPU cores 262, load/store units 266) of the graphics multiprocessor 234. In one embodiment, the register file 258 is divided between each of the functional units such that each functional unit is allocated a dedicated portion of the register file 258. In one embodiment, the register file 258 is divided between the different warps being executed by the graphics multiprocessor 234.

The GPGPU cores 262 can each include floating point units (FPUs) and/or integer arithmetic logic units (ALUs) that are used to execute instructions of the graphics multiprocessor 234. The GPGPU cores 262 can be similar in architecture or can differ in architecture, according to embodiments. For example and in one embodiment, a first portion of the GPGPU cores 262 include a single precision FPU and an integer ALU while a second portion of the GPGPU cores include a double precision FPU. In one embodiment the FPUs can implement the IEEE 754-2008 standard for floating-point arithmetic or enable variable precision floating-point arithmetic. The graphics multiprocessor 234 can additionally include one or more fixed function or special function units to perform specific functions such as copy rectangle or pixel blending operations. In one embodiment one or more of the GPGPU cores can also include fixed or special function logic.

In one embodiment the GPGPU cores 262 include SIMD logic capable of performing a single instruction on multiple sets of data. In one embodiment GPGPU cores 262 can physically execute SIMD4, SIMD8, and SIMD16 instructions and logically execute SIMD1, SIMD2, and SIMD32 instructions. The SIMD instructions for the GPGPU cores can be generated at compile time by a shader compiler or automatically generated when executing programs written and compiled for single program multiple data (SPMD) or SIMT architectures. Multiple threads of a program configured for the SIMT execution model can be executed via a single SIMD instruction. For example and in one embodiment, eight SIMT threads that perform the same or similar operations can be executed in parallel via a single SIMD8 logic unit.

The memory and cache interconnect 268 is an interconnect network that connects each of the functional units of the graphics multiprocessor 234 to the register file 258 and to the shared memory 270. In one embodiment, the memory and cache interconnect 268 is a crossbar interconnect that allows the load/store unit 266 to implement load and store operations between the shared memory 270 and the register file 258. The register file 258 can operate at the same frequency as the GPGPU cores 262, thus data transfer between the GPGPU cores 262 and the register file 258 is very low latency. The shared memory 270 can be used to enable communication between threads that execute on the functional units within the graphics multiprocessor 234. The cache memory 272 can be used as a data cache for example, to cache texture data communicated between the functional units and the texture unit 236. The shared memory 270 can also be used as a program managed cached. Threads executing on the GPGPU cores 262 can programmatically store data within the shared memory in addition to the automatically cached data that is stored within the cache memory 272.

Figure 3A:
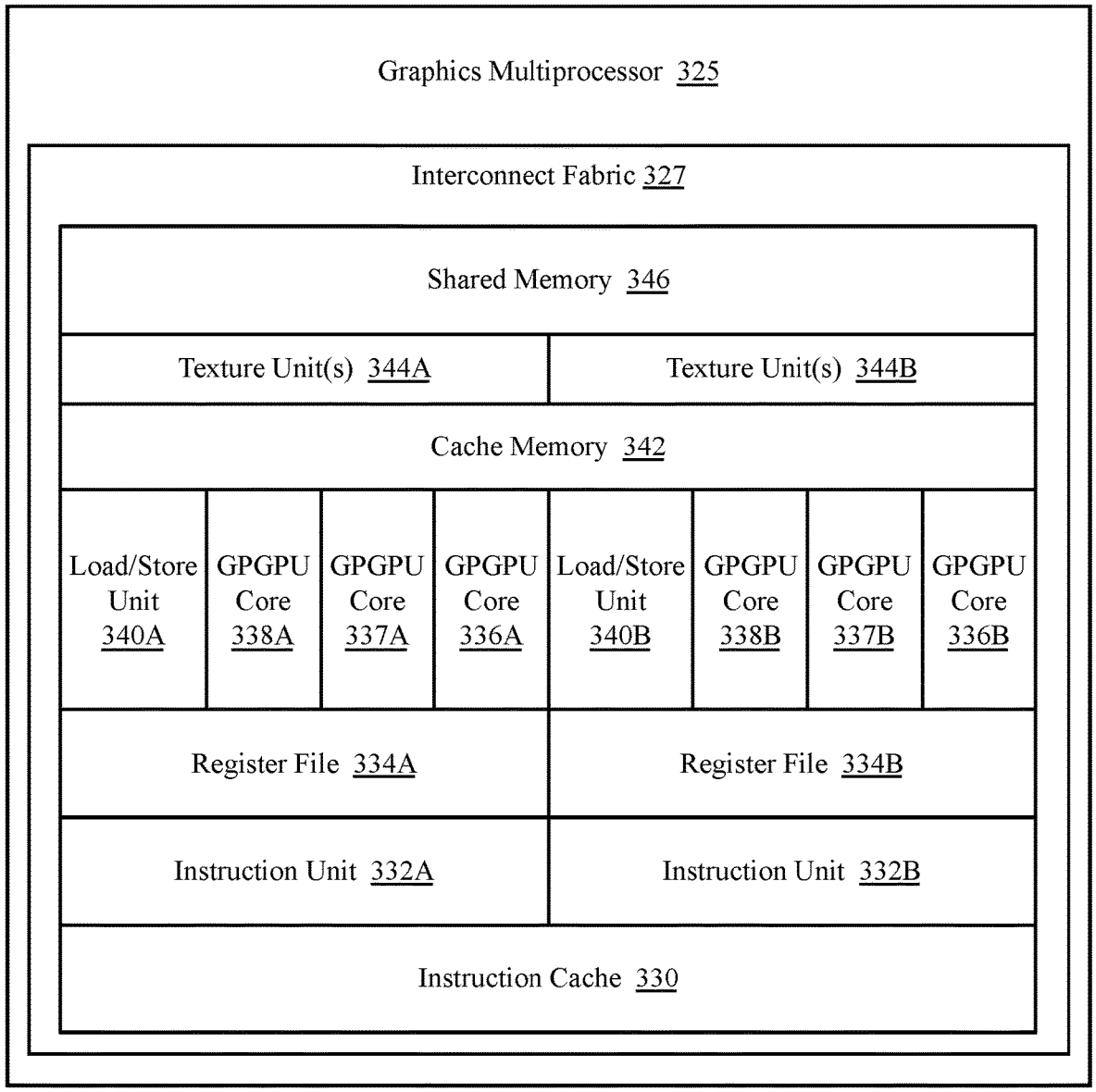
FIG. 3A-3B are block diagrams of graphics multiprocessors, according to embodiments.
Figure 3B:
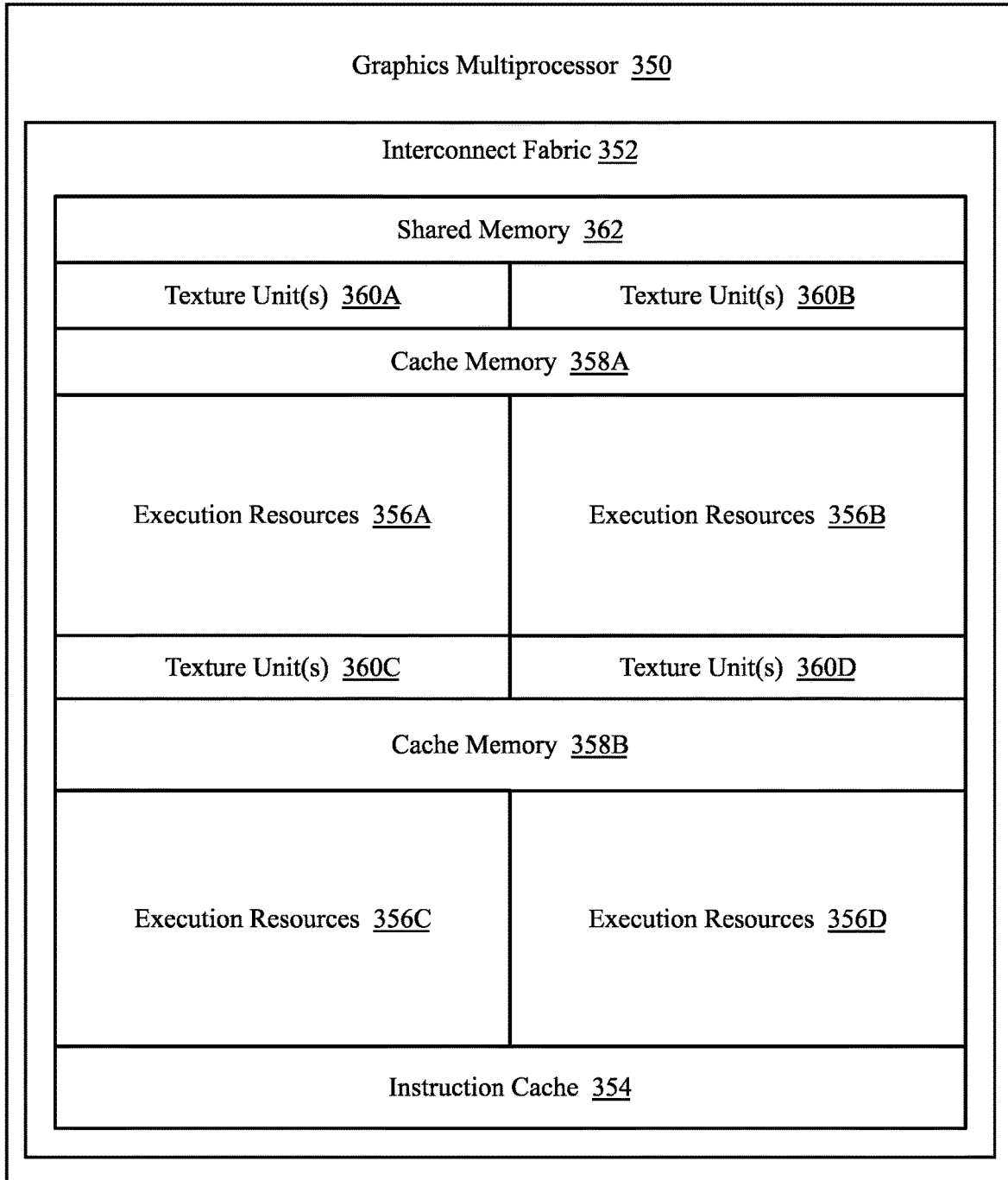

FIG. 3A-3B illustrate additional graphics multiprocessors, according to embodiments. The illustrated graphics multiprocessors 325, 350 are variants of the graphics multiprocessor 234 of FIG. 2C. The illustrated graphics multiprocessors 325, 350 can be configured as a streaming multiprocessor (SM) capable of simultaneous execution of a large number of execution threads.

FIG. 3A shows a graphics multiprocessor 325 according to an additional embodiment. The graphics multiprocessor 325 includes multiple additional instances of execution resource units relative to the graphics multiprocessor 234 of FIG. 2D. For example, the graphics multiprocessor 325 can include multiple instances of the instruction unit 332A-332B, register file 334A-334B, and texture unit(s) 344A-344B. The graphics multiprocessor 325 also includes multiple sets of graphics or compute execution units (e.g., GPGPU core 336A-336B, GPGPU core 337A-337B, GPGPU core 338A-338B) and multiple sets of load/store units 340A-340B. In one embodiment the execution resource units have a common instruction cache 330, texture and/or data cache memory 342, and shared memory 346.

The various components can communicate via an interconnect fabric 327. In one embodiment the interconnect fabric 327 includes one or more crossbar switches to enable communication between the various components of the graphics multiprocessor 325. In one embodiment the interconnect fabric 327 is a separate, high-speed network fabric layer upon which each component of the graphics multiprocessor 325 is stacked. The components of the graphics multiprocessor 325 communicate with remote components via the interconnect fabric 327. For example, the GPGPU cores 336A-336B, 337A-337B, and 3378A-338B can each communicate with shared memory 346 via the interconnect fabric 327. The interconnect fabric 327 can arbitrate communication within the graphics multiprocessor 325 to ensure a fair bandwidth allocation between components.

FIG. 3B shows a graphics multiprocessor 350 according to an additional embodiment. The graphics processor includes multiple sets of execution resources 356A-356D, where each set of execution resource includes multiple instruction units, register files, GPGPU cores, and load store units, as illustrated in FIG. 2D and FIG. 3A. The execution resources 356A-356D can work in concert with texture unit(s) 360A-360D for texture operations, while sharing an instruction cache 354, and shared memory 362. In one embodiment the execution resources 356A-356D can share an instruction cache 354 and shared memory 362, as well as multiple instances of a texture and/or data cache memory 358A-358B. The various components can communicate via an interconnect fabric 352 similar to the interconnect fabric 327 of FIG. 3A.

Persons skilled in the art will understand that the architecture described in FIGS. 1, 2A-2D, and 3A-3B are descriptive and not limiting as to the scope of the present embodiments. Thus, the techniques described herein may be implemented on any properly configured processing unit, including, without limitation, one or more mobile application processors, one or more desktop or server central processing units (CPUs) including multi-core CPUs, one or more parallel processing units, such as the parallel processing unit 202 of FIG. 2A, as well as one or more graphics processors or special purpose processing units, without departure from the scope of the embodiments described herein.

In some embodiments a parallel processor or GPGPU as described herein is communicatively coupled to host/processor cores to accelerate graphics operations, machine-learning operations, pattern analysis operations, and various general-purpose GPU (GPGPU) functions. The GPU may be communicatively coupled to the host processor/cores over a bus or other interconnect (e.g., a high speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Techniques for GPU to Host Processor Interconnection

Figure 4A:
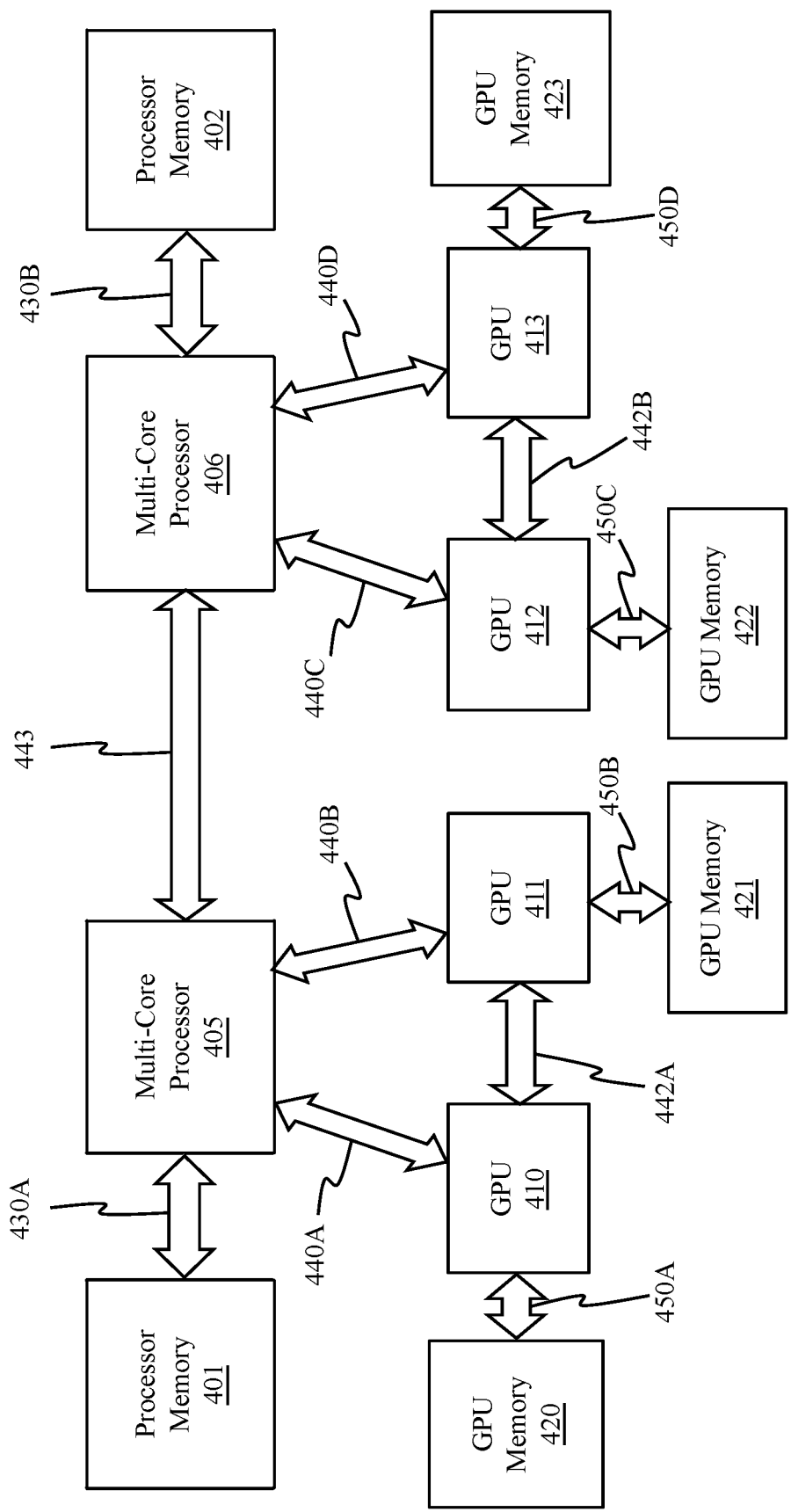
FIG. 4A-4F illustrate an exemplary architecture in which a plurality of GPUs is communicatively coupled to a plurality of multi-core processors.

FIG. 4A illustrates an exemplary architecture in which a plurality of GPUs 410-413 is communicatively coupled to a plurality of multi-core processors 405-406 over high-speed links 440A-440D (e.g., buses, point-to-point interconnects, etc.). In one embodiment, the high-speed links 440A-440D support a communication throughput of 4 GB/s, 30 GB/s, 80 GB/s or higher, depending on the implementation. Various interconnect protocols may be used including, but not limited to, PCIe 4.0 or 5.0 and NVLink 2.0. However, the underlying principles of the invention are not limited to any particular communication protocol or throughput.

In addition, in one embodiment, two or more of the GPUs 410-413 are interconnected over high-speed links 442A-442B, which may be implemented using the same or different protocols/links than those used for high-speed links 440A-440D. Similarly, two or more of the multi-core processors 405-406 may be connected over high speed link 443 which may be symmetric multi-processor (SMP) buses operating at 20 GB/s, 30 GB/s, 120 GB/s or higher. Alternatively, all communication between the various system components shown in FIG. 4A may be accomplished using the same protocols/links (e.g., over a common interconnection fabric). As mentioned, however, the underlying principles of the invention are not limited to any particular type of interconnect technology.

In one embodiment, each multi-core processor 405-406 is communicatively coupled to a processor memory 401-402, via memory interconnects 430A-430B, respectively, and each GPU 410-413 is communicatively coupled to GPU memory 420-423 over GPU memory interconnects 450A-450D, respectively. The memory interconnects 430A-430B and 450A-450D may utilize the same or different memory access technologies. By way of example, and not limitation, the processor memories 401-402 and GPU memories 420-423 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of the memories may be volatile memory and another portion may be non-volatile memory (e.g., using a two-level memory (2LM) hierarchy).

As described below, although the various processors 405-406 and GPUs 410-413 may be physically coupled to a particular memory 401-402, 420-423, respectively, a unified memory architecture may be implemented in which the same virtual system address space (also referred to as the "effective address" space) is distributed among all of the various physical memories. For example, processor memories 401-402 may each comprise 64 GB of the system memory address space and GPU memories 420-423 may each comprise 32 GB of the system memory address space (resulting in a total of 256 GB addressable memory in this example).

Figure 4B:
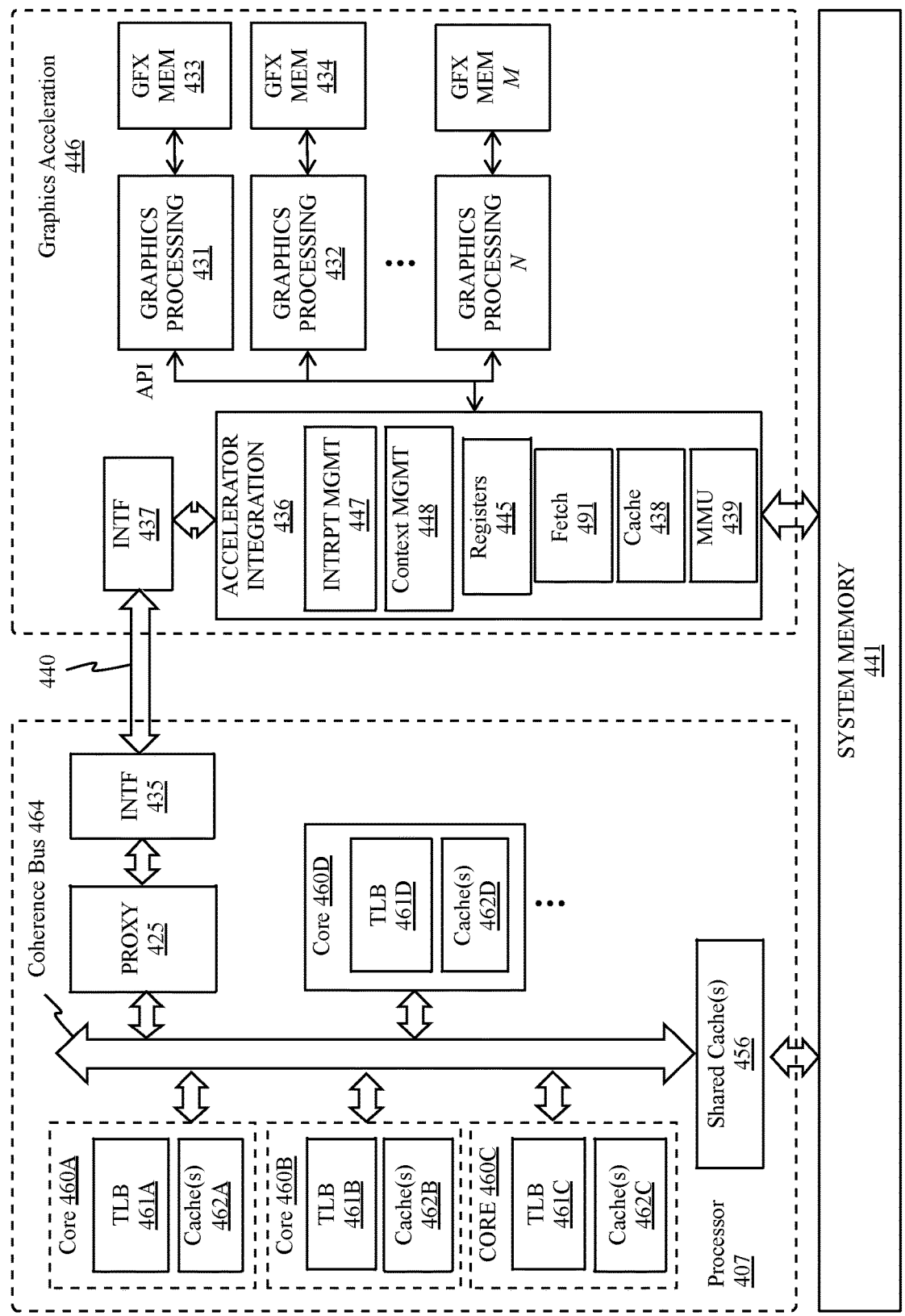

FIG. 4B illustrates additional details for an interconnection between a multi-core processor 407 and a graphics acceleration module 446 in accordance with one embodiment. The graphics acceleration module 446 may include one or more GPU chips integrated on a line card which is coupled to the processor 407 via the high-speed link 440. Alternatively, the graphics acceleration module 446 may be integrated on the same package or chip as the processor 407.

The illustrated processor 407 includes a plurality of cores 460A-460D, each with a translation lookaside buffer 461A-461D and one or more caches 462A-462D. The cores may include various other components for executing instructions and processing data which are not illustrated to avoid obscuring the underlying principles of the invention (e.g., instruction fetch units, branch prediction units, decoders, execution units, reorder buffers, etc.). The caches 462A-462D may comprise level 1 (L1) and level 2 (L2) caches. In addition, one or more shared caches 456 may be included in the caching hierarchy and shared by sets of the cores 460A-460D. For example, one embodiment of the processor 407 includes 24 cores, each with its own L1 cache, twelve shared L2 caches, and twelve shared L3 caches. In this embodiment, one of the L2 and L3 caches are shared by two adjacent cores. The processor 407 and the graphics accelerator integration module 446 connect with system memory 441, which may include processor memories 401-402.

Coherency is maintained for data and instructions stored in the various caches 462A-462D, 456 and system memory 441 via inter-core communication over a coherence bus 464. For example, each cache may have cache coherency logic/circuitry associated therewith to communicate to over the coherence bus 464 in response to detected reads or writes to particular cache lines. In one implementation, a cache snooping protocol is implemented over the coherence bus 464 to snoop cache accesses. Cache snooping/coherency techniques are well understood by those of skill in the art and will not be described in detail here to avoid obscuring the underlying principles of the invention.

In one embodiment, a proxy circuit 425 communicatively couples the graphics acceleration module 446 to the coherence bus 464, allowing the graphics acceleration module 446 to participate in the cache coherence protocol as a peer of the cores. In particular, an interface 435 provides connectivity to the proxy circuit 425 over high-speed link 440 (e.g., a PCIe bus, NVLink, etc.) and an interface 437 connects the graphics acceleration module 446 to the high-speed link 440.

In one implementation, an accelerator integration circuit 436 provides cache management, memory access, context management, and interrupt management services on behalf of a plurality of graphics processing engines 431, 432, N of the graphics acceleration module 446. The graphics processing engines 431, 432, N may each comprise a separate graphics processing unit (GPU). Alternatively, the graphics processing engines 431, 432, N may comprise different types of graphics processing engines within a GPU such as graphics execution units, media processing engines (e.g., video encoders/decoders), samplers, and blit engines. In other words, the graphics acceleration module may be a GPU with a plurality of graphics processing engines 431-432, N or the graphics processing engines 431-432, N may be individual GPUs integrated on a common package, line card, or chip.

In one embodiment, the accelerator integration circuit 436 includes a memory management unit (MMU) 439 for performing various memory management functions such as virtual-to-physical memory translations (also referred to as effective-to-real memory translations) and memory access protocols for accessing system memory 441. The MMU 439 may also include a translation lookaside buffer (TLB) (not shown) for caching the virtual/effective to physical/real address translations. In one implementation, a cache 438 stores commands and data for efficient access by the graphics processing engines 431-432, N. In one embodiment, the data stored in cache 438 and graphics memories 433-434, M is kept coherent with the core caches 462A-462D, 456 and system memory 411. As mentioned, this may be accomplished via proxy circuit 425 which takes part in the cache coherency mechanism on behalf of cache 438 and memories 433-434, M (e.g., sending updates to the cache 438 related to modifications/accesses of cache lines on processor caches 462A-462D, 456 and receiving updates from the cache 438).

A set of registers 445 store context data for threads executed by the graphics processing engines 431-432, N and a context management circuit 448 manages the thread contexts. For example, the context management circuit 448 may perform save and restore operations to save and restore contexts of the various threads during contexts switches (e.g., where a first thread is saved and a second thread is stored so that the second thread can be execute by a graphics processing engine). For example, on a context switch, the context management circuit 448 may store current register values to a designated region in memory (e.g., identified by a context pointer). It may then restore the register values when returning to the context. In one embodiment, an interrupt management circuit 447 receives and processes interrupts received from system devices.

In one implementation, virtual/effective addresses from a graphics processing engine 431 are translated to real/physical addresses in system memory 411 by the MMU 439. One embodiment of the accelerator integration circuit 436 supports multiple (e.g., 4, 8, 16) graphics accelerator modules 446 and/or other accelerator devices. The graphics accelerator module 446 may be dedicated to a single application executed on the processor 407 or may be shared between multiple applications. In one embodiment, a virtualized graphics execution environment is presented in which the resources of the graphics processing engines 431-432, N are shared with multiple applications or virtual machines (VMs). The resources may be subdivided into "slices" which are allocated to different VMs and/or applications based on the processing requirements and priorities associated with the VMs and/or applications.

Thus, the accelerator integration circuit acts as a bridge to the system for the graphics acceleration module 446 and provides address translation and system memory cache services. In addition, the accelerator integration circuit 436 may provide virtualization facilities for the host processor to manage virtualization of the graphics processing engines, interrupts, and memory management.

Because hardware resources of the graphics processing engines 431-432, N are mapped explicitly to the real address space seen by the host processor 407, any host processor can address these resources directly using an effective address value. One function of the accelerator integration circuit 436, in one embodiment, is the physical separation of the graphics processing engines 431-432, N so that they appear to the system as independent units.

As mentioned, in the illustrated embodiment, one or more graphics memories 433-434, M are coupled to each of the graphics processing engines 431-432, N, respectively. The graphics memories 433-434, M store instructions and data being processed by each of the graphics processing engines 431-432, N. The graphics memories 433-434, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over the high-speed link 440, biasing techniques are used to ensure that the data stored in graphics memories 433-434, M is data which will be used most frequently by the graphics processing engines 431-432, N and preferably not used by the cores 460A-460D (at least not frequently). Similarly, the biasing mechanism attempts to keep data needed by the cores (and preferably not the graphics processing engines 431-432, N) within the caches 462A-462D, 456 of the cores and system memory 411.

Figure 4C:
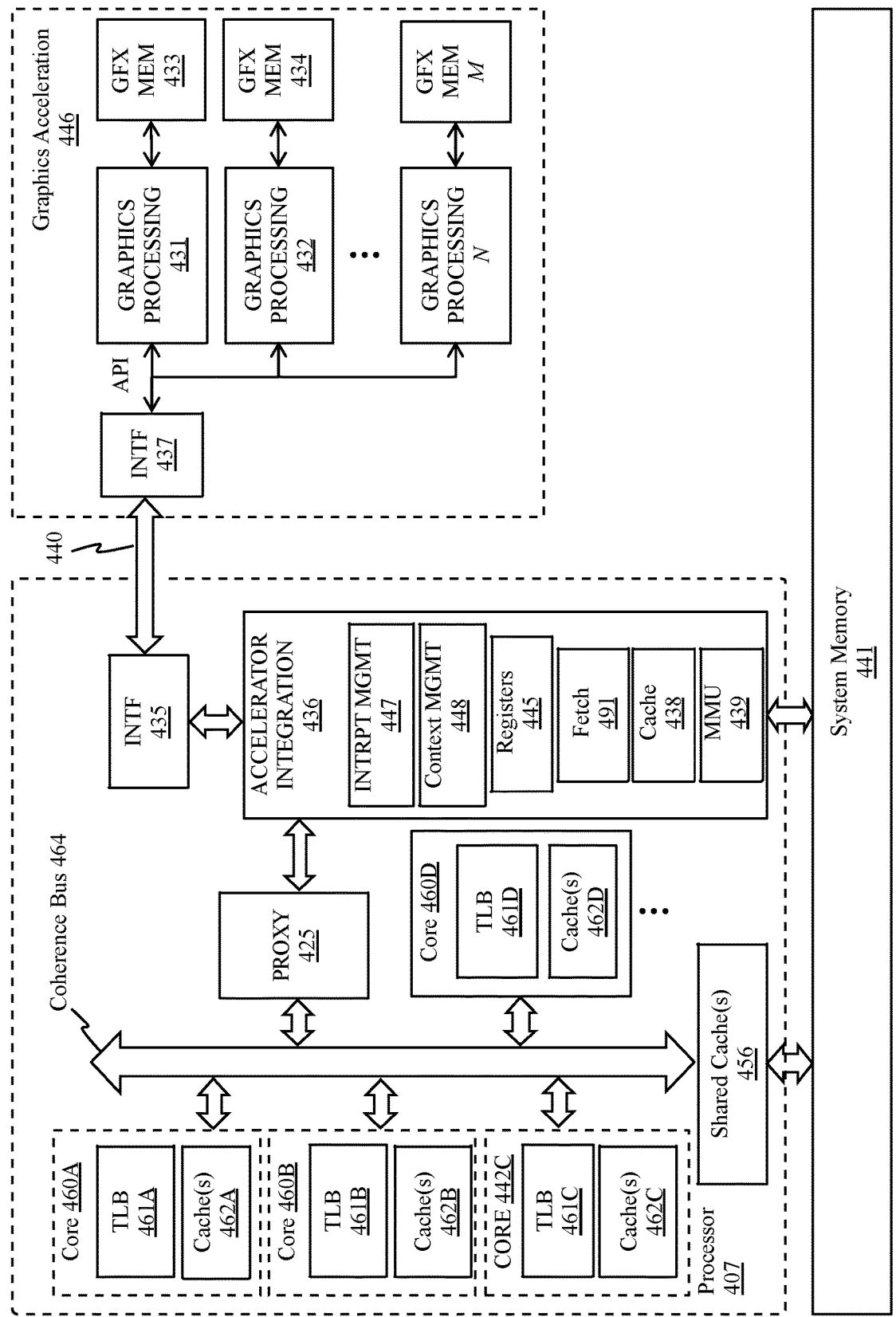

FIG. 4C illustrates another embodiment in which the accelerator integration circuit 436 is integrated within the processor 407. In this embodiment, the graphics processing engines 431-432, N communicate directly over the high-speed link 440 to the accelerator integration circuit 436 via interface 437 and interface 435 (which, again, may be utilize any form of bus or interface protocol). The accelerator integration circuit 436 may perform the same operations as those described with respect to FIG. 4B, but potentially at a higher throughput given its close proximity to the coherency bus 464 and caches 462A-462D, 456.

One embodiment supports different programming models including a dedicated-process programming model (no graphics acceleration module virtualization) and shared programming models (with virtualization). The latter may include programming models which are controlled by the accelerator integration circuit 436 and programming models which are controlled by the graphics acceleration module 446.

In one embodiment of the dedicated process model, graphics processing engines 431-432, N are dedicated to a single application or process under a single operating system. The single application can funnel other application requests to the graphics engines 431-432, N, providing virtualization within a VM/partition.

In the dedicated-process programming models, the graphics processing engines 431-432, N, may be shared by multiple VM/application partitions. The shared models require a system hypervisor to virtualize the graphics processing engines 431-432, N to allow access by each operating system. For single-partition systems without a hypervisor, the graphics processing engines 431-432, N are owned by the operating system. In both cases, the operating system can virtualize the graphics processing engines 431-432, N to provide access to each process or application.

For the shared programming model, the graphics acceleration module 446 or an individual graphics processing engine 431-432, N selects a process element using a process handle. In one embodiment, process elements are stored in system memory 411 and are addressable using the effective address to real address translation techniques described herein. The process handle may be an implementation-specific value provided to the host process when registering its context with the graphics processing engine 431-432, N (that is, calling system software to add the process element to the process element linked list). The lower 16-bits of the process handle may be the offset of the process element within the process element linked list.

Figure 4D:
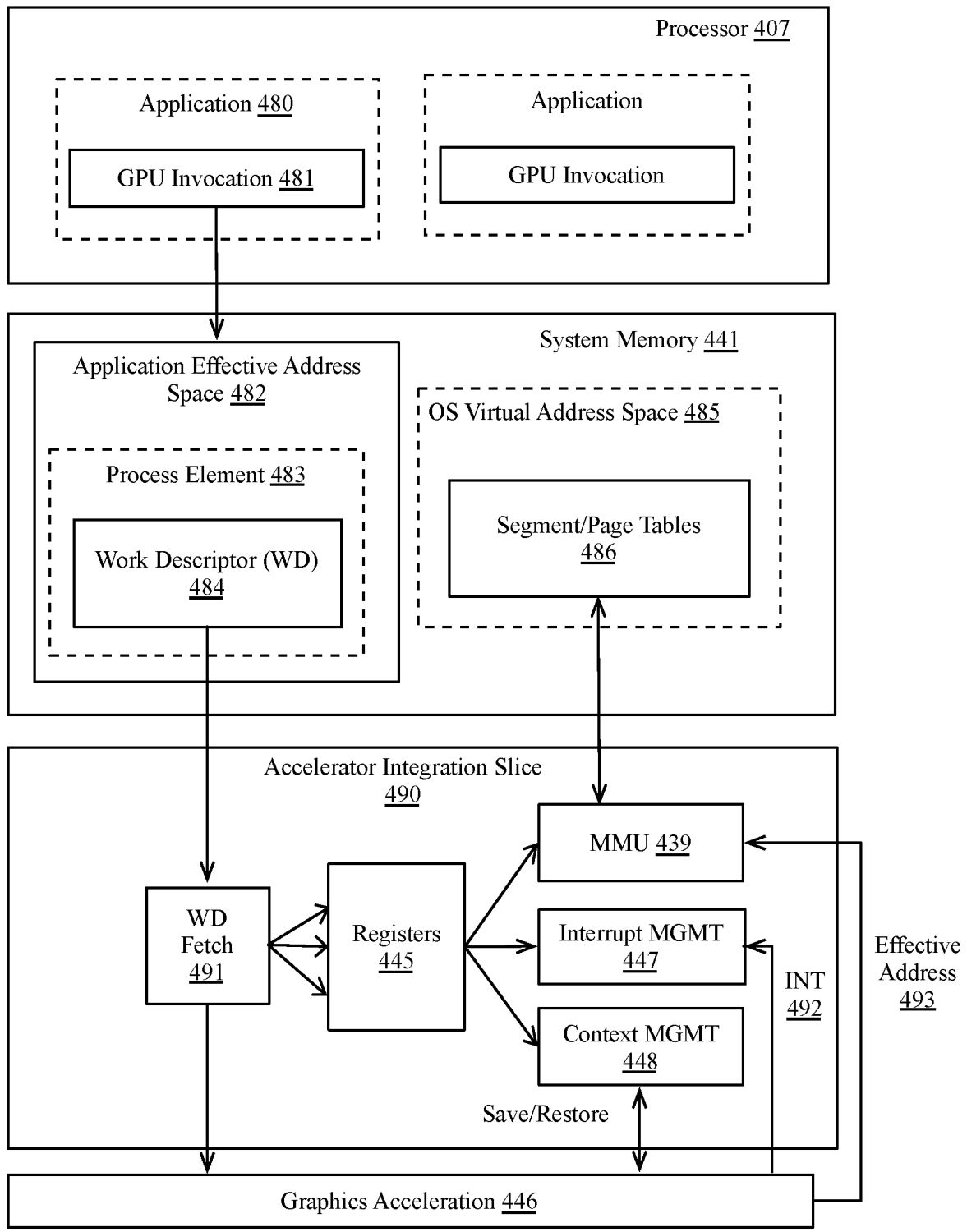

FIG. 4D illustrates an exemplary accelerator integration slice 490. As used herein, a "slice" comprises a specified portion of the processing resources of the accelerator integration circuit 436. Application effective address space 482 within system memory 411 stores process elements 483. In one embodiment, the process elements 483 are stored in response to GPU invocations 481 from applications 480 executed on the processor 407. A process element 483 contains the process state for the corresponding application 480. A work descriptor (WD) 484 contained in the process element 483 can be a single job requested by an application or may contain a pointer to a queue of jobs. In the latter case, the WD 484 is a pointer to the job request queue in the application's address space 482.

The graphics acceleration module 446 and/or the individual graphics processing engines 431-432, N can be shared by all or a subset of the processes in the system. Embodiments of the invention include an infrastructure for setting up the process state and sending a WD 484 to a graphics acceleration module 446 to start a job in a virtualized environment.

In one implementation, the dedicated-process programming model is implementation-specific. In this model, a single process owns the graphics acceleration module 446 or an individual graphics processing engine 431. Because the graphics acceleration module 446 is owned by a single process, the hypervisor initializes the accelerator integration circuit 436 for the owning partition and the operating system initializes the accelerator integration circuit 436 for the owning process at the time when the graphics acceleration module 446 is assigned.

In operation, a WD fetch unit 491 in the accelerator integration slice 490 fetches the next WD 484 which includes an indication of the work to be done by one of the graphics processing engines of the graphics acceleration module 446. Data from the WD 484 may be stored in registers 445 and used by the MMU 439, interrupt management circuit 447 and/or context management circuit 448 as illustrated. For example, one embodiment of the MMU 439 includes segment/page walk circuitry for accessing segment/page tables 486 within the OS virtual address space 485. The interrupt management circuit 447 may process interrupt events 492 received from the graphics acceleration module 446. When performing graphics operations, an effective address 493 generated by a graphics processing engine 431-432, N is translated to a real address by the MMU 439.

In one embodiment, the same set of registers 445 are duplicated for each graphics processing engine 431-432, N and/or graphics acceleration module 446 and may be initialized by the hypervisor or operating system. Each of these duplicated registers may be included in an accelerator integration slice 490. Exemplary registers that may be initialized by the hypervisor are shown in Table 1.

TABLE 1

Hypervisor Initialized Registers

| | |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by the operating system are shown in Table 2.

TABLE 2

Operating System Initialized Registers

| | |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 484 is specific to a particular graphics acceleration module 446 and/or graphics processing engine 431-432, N. It contains all the information a graphics processing engine 431-432, N requires to do its work or it can be a pointer to a memory location where the application has set up a command queue of work to be completed.

Figure 4E:
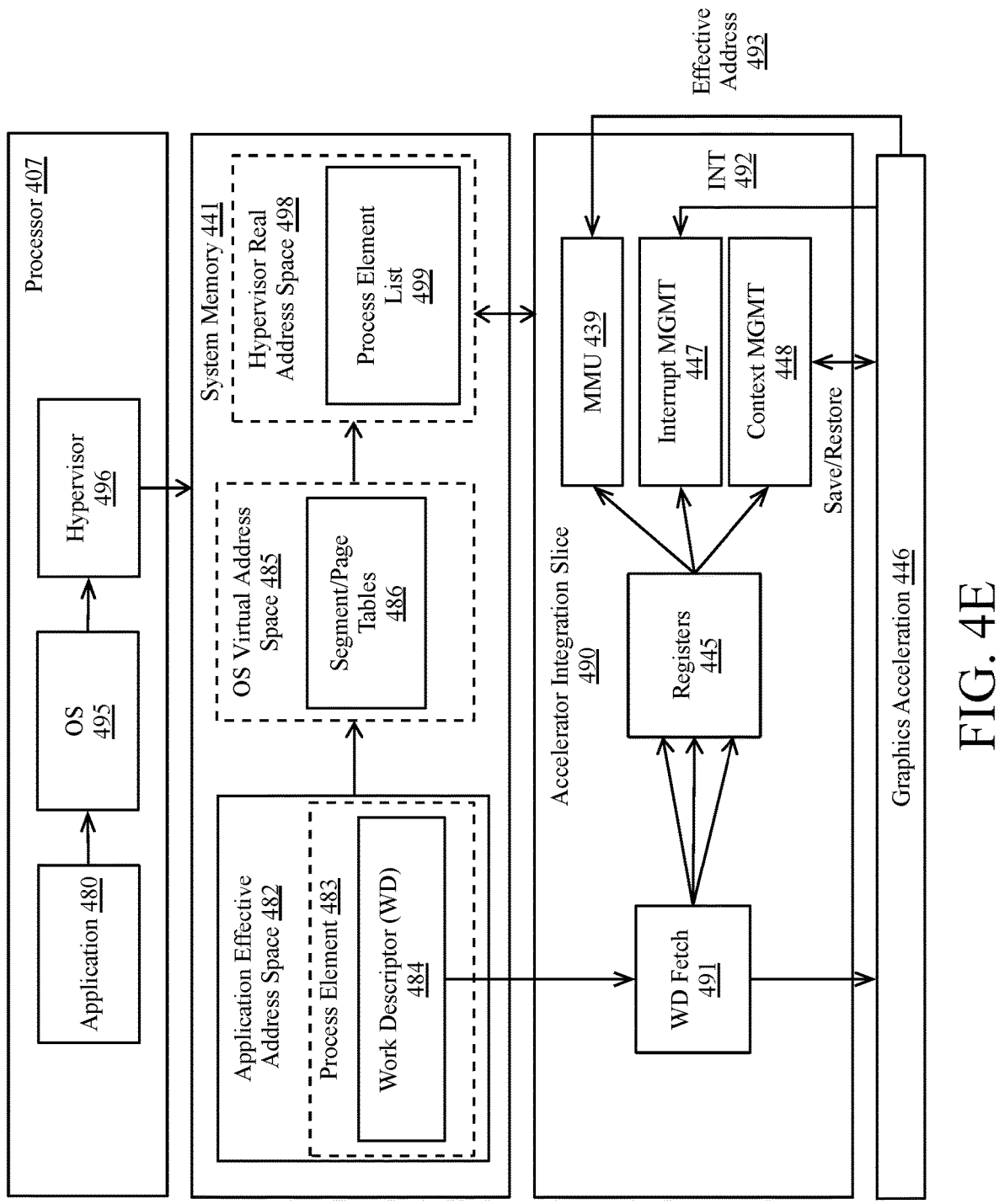

FIG. 4E illustrates additional details for one embodiment of a shared model. This embodiment includes a hypervisor real address space 498 in which a process element list 499 is stored. The hypervisor real address space 498 is accessible via a hypervisor 496 which virtualizes the graphics acceleration module engines for the operating system 495.

The shared programming models allow for all or a subset of processes from all or a subset of partitions in the system to use a graphics acceleration module 446. There are two programming models where the graphics acceleration module 446 is shared by multiple processes and partitions: time-sliced shared and graphics directed shared.

In this model, the system hypervisor 496 owns the graphics acceleration module 446 and makes its function available to all operating systems 495. For a graphics acceleration module 446 to support virtualization by the system hypervisor 496, the graphics acceleration module 446 may adhere to the following requirements: 1) An application's job request must be autonomous (that is, the state does not need to be maintained between jobs), or the graphics acceleration module 446 must provide a context save and restore mechanism. 2) An application's job request is guaranteed by the graphics acceleration module 446 to complete in a specified amount of time, including any translation faults, or the graphics acceleration module 446 provides the ability to preempt the processing of the job. 3) The graphics acceleration module 446 must be guaranteed fairness between processes when operating in the directed shared programming model.

In one embodiment, for the shared model, the application 480 is required to make an operating system 495 system call with a graphics acceleration module 446 type, a work descriptor (WD), an authority mask register (AMR) value, and a context save/restore area pointer (CSRP). The graphics acceleration module 446 type describes the targeted acceleration function for the system call. The graphics acceleration module 446 type may be a system-specific value. The WD is formatted specifically for the graphics acceleration module 446 and can be in the form of a graphics acceleration module 446 command, an effective address pointer to a user-defined structure, an effective address pointer to a queue of commands, or any other data structure to describe the work to be done by the graphics acceleration module 446. In one embodiment, the AMR value is the AMR state to use for the current process. The value passed to the operating system is similar to an application setting the AMR. If the accelerator integration circuit 436 and graphics acceleration module 446 implementations do not support a User Authority Mask Override Register (UAMOR), the operating system may apply the current UAMOR value to the AMR value before passing the AMR in the hypervisor call. The hypervisor 496 may optionally apply the current Authority Mask Override Register (AMOR) value before placing the AMR into the process element 483. In one embodiment, the CSRP is one of the registers 445 containing the effective address of an area in the application's address space 482 for the graphics acceleration module 446 to save and restore the context state. This pointer is optional if no state is required to be saved between jobs or when a job is preempted. The context save/restore area may be pinned system memory.

Upon receiving the system call, the operating system 495 may verify that the application 480 has registered and been given the authority to use the graphics acceleration module 446. The operating system 495 then calls the hypervisor 496 with the information shown in Table 3.

TABLE 3

OS to Hypervisor Call Parameters

| | |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | The virtual address of the storage segment table pointer (SSTP) |
| 7 | A logical interrupt service number (LISN) |

Upon receiving the hypervisor call, the hypervisor 496 verifies that the operating system 495 has registered and been given the authority to use the graphics acceleration module 446. The hypervisor 496 then puts the process element 483 into the process element linked list for the corresponding graphics acceleration module 446 type. The process element may include the information shown in Table 4.

TABLE 4

Process Element Information

| | |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | The virtual address of the storage segment table pointer (SSTP) |
| 7 | A logical interrupt service number (LISN) |
| 8 | Interrupt vector table, derived from the hypervisor call parameters. |
| 9 | A state register (SR) value |
| 10 | A logical partition ID (LPID) |
| 11 | A real address (RA) hypervisor accelerator utilization record pointer |
| 12 | The Storage Descriptor Register (SDR) |

In one embodiment, the hypervisor initializes a plurality of accelerator integration slice 490 registers 445.

Figure 4F:
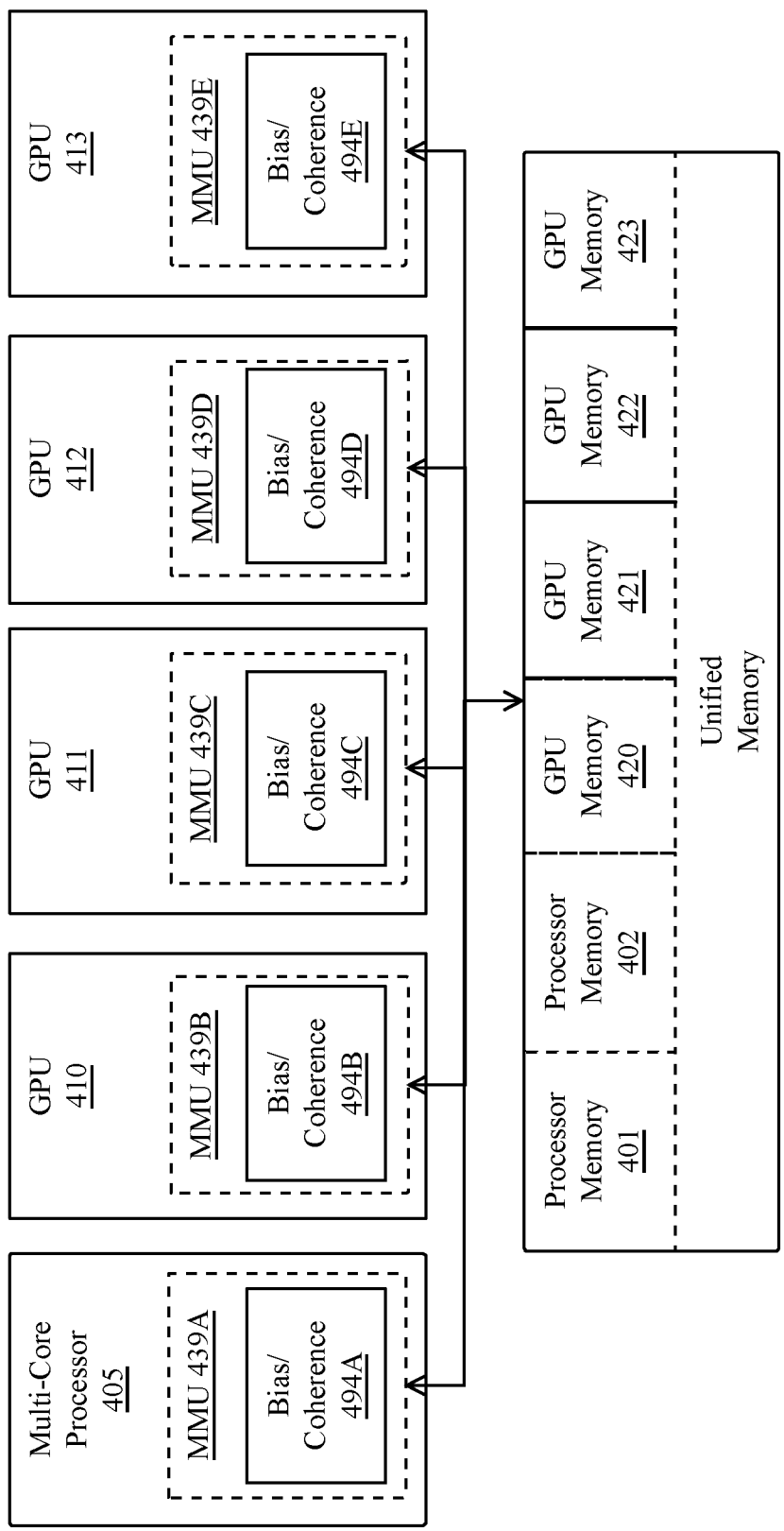

As illustrated in FIG. 4F, one embodiment of the invention employs a unified memory addressable via a common virtual memory address space used to access the physical processor memories 401-402 and GPU memories 420-423. In this implementation, operations executed on the GPUs 410-413 utilize the same virtual/effective memory address space to access the processors memories 401-402 and vice versa, thereby simplifying programmability. In one embodiment, a first portion of the virtual/effective address space is allocated to the processor memory 401, a second portion to the second processor memory 402, a third portion to the GPU memory 420, and so on. The entire virtual/effective memory space (sometimes referred to as the effective address space) is thereby distributed across each of the processor memories 401-402 and GPU memories 420-423, allowing any processor or GPU to access any physical memory with a virtual address mapped to that memory.

In one embodiment, bias/coherence management circuitry 494A-494E within one or more of the MMUs 439A-439E ensures cache coherence between the caches of the host processors (e.g., 405) and the GPUs 410-413 and implements biasing techniques indicating the physical memories in which certain types of data should be stored. While multiple instances of bias/coherence management circuitry 494A-494E are illustrated in FIG. 4F, the bias/coherence circuitry may be implemented within the MMU of one or more host processors 405 and/or within the accelerator integration circuit 436.

One embodiment allows GPU-attached memory 420-423 to be mapped as part of system memory, and accessed using shared virtual memory (SVM) technology, but without suffering the typical performance drawbacks associated with full system cache coherence. The ability to GPU-attached memory 420-423 to be accessed as system memory without onerous cache coherence overhead provides a beneficial operating environment for GPU offload. This arrangement allows the host processor 405 software to setup operands and access computation results, without the overhead of tradition I/O DMA data copies. Such traditional copies involve driver calls, interrupts and memory mapped I/O (MMIO) accesses that are all inefficient relative to simple memory accesses. At the same time, the ability to access GPU attached memory 420-423 without cache coherence overheads can be critical to the execution time of an offloaded computation. In cases with substantial streaming write memory traffic, for example, cache coherence overhead can significantly reduce the effective write bandwidth seen by a GPU 410-413. The efficiency of operand setup, the efficiency of results access, and the efficiency of GPU computation all play a role in determining the effectiveness of GPU offload.

In one implementation, the selection of between GPU bias and host processor bias is driven by a bias tracker data structure. A bias table may be used, for example, which may be a page-granular structure (i.e., controlled at the granularity of a memory page) that includes 1 or 2 bits per GPU-attached memory page. The bias table may be implemented in a stolen memory range of one or more GPU-attached memories 420-423, with or without a bias cache in the GPU 410-413 (e.g., to cache frequently/recently used entries of the bias table). Alternatively, the entire bias table may be maintained within the GPU.

In one implementation, the bias table entry associated with each access to the GPU-attached memory 420-423 is accessed prior the actual access to the GPU memory, causing the following operations. First, local requests from the GPU 410-413 that find their page in GPU bias are forwarded directly to a corresponding GPU memory 420-423. Local requests from the GPU that find their page in host bias are forwarded to the processor 405 (e.g., over a high-speed link as discussed above). In one embodiment, requests from the processor 405 that find the requested page in host processor bias complete the request like a normal memory read. Alternatively, requests directed to a GPU-biased page may be forwarded to the GPU 410-413. The GPU may then transition the page to a host processor bias if it is not currently using the page.

The bias state of a page can be changed either by a software-based mechanism, a hardware-assisted software-based mechanism, or, for a limited set of cases, a purely hardware-based mechanism.

One mechanism for changing the bias state employs an API call (e.g. OpenCL), which, in turn, calls the GPU's device driver which, in turn, sends a message (or enqueues a command descriptor) to the GPU directing it to change the bias state and, for some transitions, perform a cache flushing operation in the host. The cache flushing operation is required for a transition from host processor 405 bias to GPU bias, but is not required for the opposite transition.

In one embodiment, cache coherency is maintained by temporarily rendering GPU-biased pages uncacheable by the host processor 405. To access these pages, the processor 405 may request access from the GPU 410 which may or may not grant access right away, depending on the implementation. Thus, to reduce communication between the processor 405 and GPU 410 it is beneficial to ensure that GPU-biased pages are those which are required by the GPU but not the host processor 405 and vice versa.

Graphics Processing Pipeline

Figure 5:
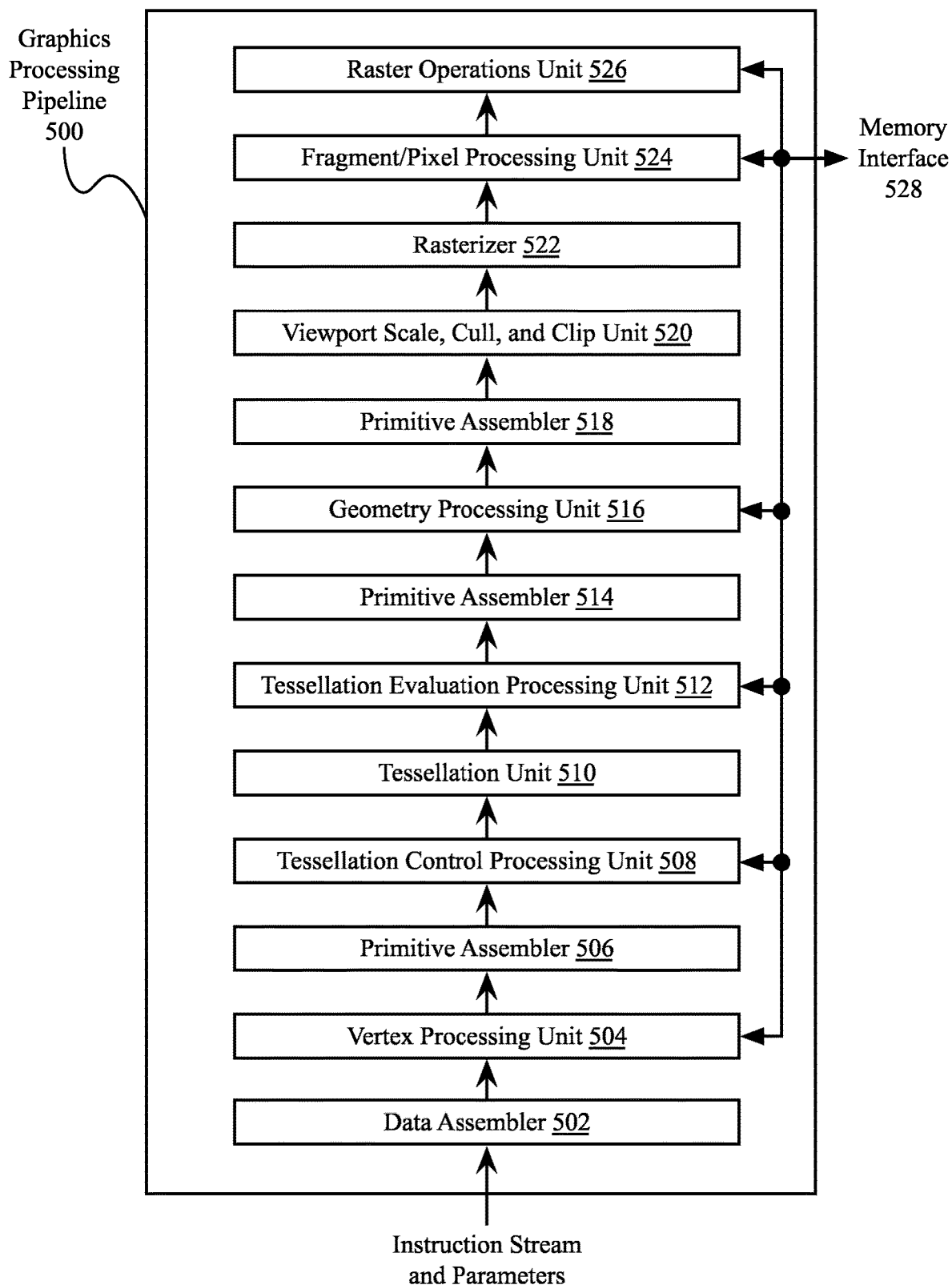
FIG. 5 illustrates a graphics processing pipeline, according to an embodiment.

FIG. 5 illustrates a graphics processing pipeline 500, according to an embodiment. In one embodiment a graphics processor can implement the illustrated graphics processing pipeline 500. The graphics processor can be included within the parallel processing subsystems as described herein, such as the parallel processor 200 of FIG. 2A, which, in one embodiment, is a variant of the parallel processor(s) 112 of FIG. 1. The various parallel processing systems can implement the graphics processing pipeline 500 via one or more instances of the parallel processing unit (e.g., parallel processing unit 202 of FIG. 2A) as described herein. For example, a shader unit (e.g., graphics multiprocessor 234 of FIG. 2C) may be configured to perform the functions of one or more of a vertex processing unit 504, a tessellation control processing unit 508, a tessellation evaluation processing unit 512, a geometry processing unit 516, and a fragment/pixel processing unit 524. The functions of data assembler 502, primitive assemblers 506, 514, 518, tessellation unit 510, rasterizer 522, and raster operations unit 526 may also be performed by other processing engines within a processing cluster (e.g., processing cluster 214 of FIG. 2A) and a corresponding partition unit (e.g., partition unit 220A-220N of FIG. 2A). The graphics processing pipeline 500 may also be implemented using dedicated processing units for one or more functions. In one embodiment, one or more portions of the graphics processing pipeline 500 can be performed by parallel processing logic within a general-purpose processor (e.g., CPU). In one embodiment, one or more portions of the graphics processing pipeline 500 can access on-chip memory (e.g., parallel processor memory 222 as in FIG. 2A) via a memory interface 528, which may be an instance of the memory interface 218 of FIG. 2A.

In one embodiment the data assembler 502 is a processing unit that collects vertex data for surfaces and primitives. The data assembler 502 then outputs the vertex data, including the vertex attributes, to the vertex processing unit 504. The vertex processing unit 504 is a programmable execution unit that executes vertex shader programs, lighting and transforming vertex data as specified by the vertex shader programs. The vertex processing unit 504 reads data that is stored in cache, local or system memory for use in processing the vertex data and may be programmed to transform the vertex data from an object-based coordinate representation to a world space coordinate space or a normalized device coordinate space.

A first instance of a primitive assembler 506 receives vertex attributes from the vertex processing unit 504. The primitive assembler 506 readings stored vertex attributes as needed and constructs graphics primitives for processing by tessellation control processing unit 508. The graphics primitives include triangles, line segments, points, patches, and so forth, as supported by various graphics processing application programming interfaces (APIs).

The tessellation control processing unit 508 treats the input vertices as control points for a geometric patch. The control points are transformed from an input representation from the patch (e.g., the patch's bases) to a representation that is suitable for use in surface evaluation by the tessellation evaluation processing unit 512. The tessellation control processing unit 508 can also compute tessellation factors for edges of geometric patches. A tessellation factor applies to a single edge and quantifies a view-dependent level of detail associated with the edge. A tessellation unit 510 is configured to receive the tessellation factors for edges of a patch and to tessellate the patch into multiple geometric primitives such as line, triangle, or quadrilateral primitives, which are transmitted to a tessellation evaluation processing unit 512. The tessellation evaluation processing unit 512 operates on parameterized coordinates of the subdivided patch to generate a surface representation and vertex attributes for each vertex associated with the geometric primitives.

A second instance of a primitive assembler 514 receives vertex attributes from the tessellation evaluation processing unit 512, reading stored vertex attributes as needed, and constructs graphics primitives for processing by the geometry processing unit 516. The geometry processing unit 516 is a programmable execution unit that executes geometry shader programs to transform graphics primitives received from primitive assembler 514 as specified by the geometry shader programs. In one embodiment the geometry processing unit 516 is programmed to subdivide the graphics primitives into one or more new graphics primitives and calculate parameters used to rasterize the new graphics primitives.

In some embodiments the geometry processing unit 516 can add or delete elements in the geometry stream. The geometry processing unit 516 outputs the parameters and vertices specifying new graphics primitives to primitive assembler 518. The primitive assembler 518 receives the parameters and vertices from the geometry processing unit 516 and constructs graphics primitives for processing by a viewport scale, cull, and clip unit 520. The geometry processing unit 516 reads data that is stored in parallel processor memory or system memory for use in processing the geometry data. The viewport scale, cull, and clip unit 520 performs clipping, culling, and viewport scaling and outputs processed graphics primitives to a rasterizer 522.

The rasterizer 522 can perform depth culling and other depth-based optimizations. The rasterizer 522 also performs scan conversion on the new graphics primitives to generate fragments and output those fragments and associated coverage data to the fragment/pixel processing unit 524. The fragment/pixel processing unit 524 is a programmable execution unit that is configured to execute fragment shader programs or pixel shader programs. The fragment/pixel processing unit 524 transforming fragments or pixels received from rasterizer 522, as specified by the fragment or pixel shader programs. For example, the fragment/pixel processing unit 524 may be programmed to perform operations included but not limited to texture mapping, shading, blending, texture correction and perspective correction to produce shaded fragments or pixels that are output to a raster operations unit 526. The fragment/pixel processing unit 524 can read data that is stored in either the parallel processor memory or the system memory for use when processing the fragment data. Fragment or pixel shader programs may be configured to shade at sample, pixel, tile, or other granularities depending on the sampling rate configured for the processing units.

The raster operations unit 526 is a processing unit that performs raster operations including, but not limited to stencil, z test, blending, and the like, and outputs pixel data as processed graphics data to be stored in graphics memory (e.g., parallel processor memory 222 as in FIG. 2A, and/or system memory 104 as in FIG. 1), to be displayed on the one or more display device(s) 110 or for further processing by one of the one or more processor(s) 102 or parallel processor (s) 112. In some embodiments the raster operations unit 526 is configured to compress z or color data that is written to memory and decompress z or color data that is read from memory.

Machine Learning Overview

A machine learning algorithm is an algorithm that can learn based on a set of data. Embodiments of machine learning algorithms can be designed to model high-level abstractions within a data set. For example, image recognition algorithms can be used to determine which of several categories to which a given input belong; regression algorithms can output a numerical value given an input; and pattern recognition algorithms can be used to generate translated text or perform text to speech and/or speech recognition.

An exemplary type of machine learning algorithm is a neural network. There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

The accuracy of a machine learning algorithm can be affected significantly by the quality of the data set used to train the algorithm. The training process can be computationally intensive and may require a significant amount of time on a conventional general-purpose processor. Accordingly, parallel processing hardware is used to train many types of machine learning algorithms. This is particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 6:
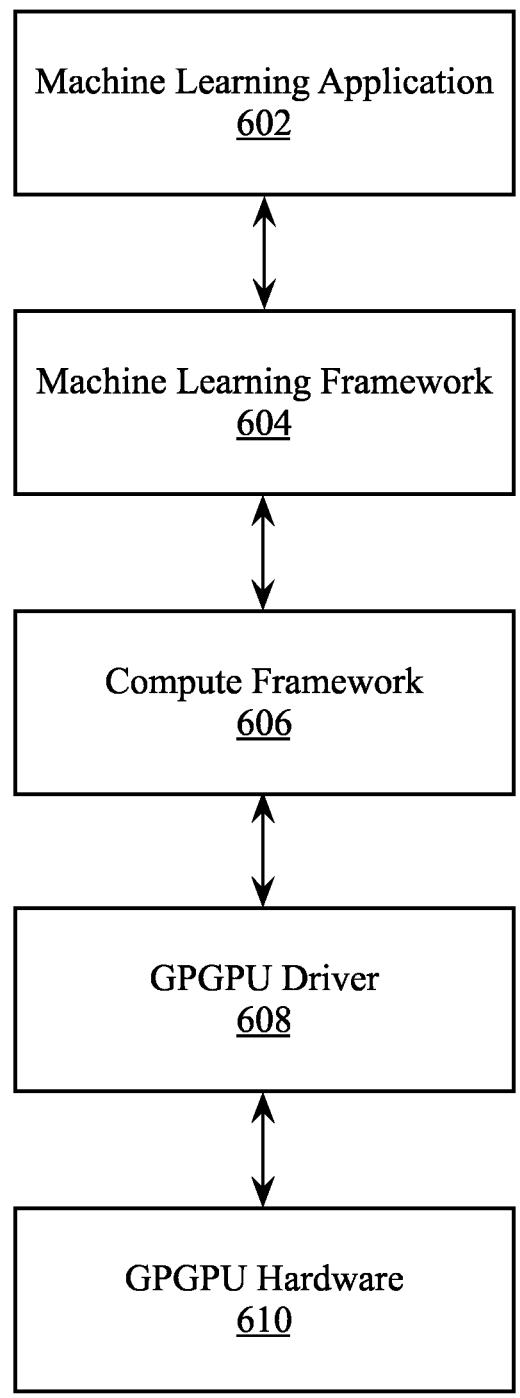
FIG. 6 illustrates a machine learning software stack, according to an embodiment.

FIG. 6 is a generalized diagram of a machine learning software stack 600. A machine learning application 602 can be configured to train a neural network using a training dataset or to use a trained deep neural network to implement machine intelligence. The machine learning application 602 can include training and inference functionality for a neural network and/or specialized software that can be used to train a neural network before deployment. The machine learning application 602 can implement any type of machine intelligence including but not limited to image recognition, mapping and localization, autonomous navigation, speech synthesis, medical imaging, or language translation.

Hardware acceleration for the machine learning application 602 can be enabled via a machine learning framework 604. The machine learning framework 604 can provide a library of machine learning primitives. Machine learning primitives are basic operations that are commonly performed by machine learning algorithms. Without the machine learning framework 604, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 604. Exemplary primitives include tensor convolutions, activation functions, and pooling, which are computational operations that are performed while training a convolutional neural network (CNN). The machine learning framework 604 can also provide primitives to implement basic linear algebra subprograms performed by many machine-learning algorithms, such as matrix and vector operations.

The machine learning framework 604 can process input data received from the machine learning application 602 and generate the appropriate input to a compute framework 606. The compute framework 606 can abstract the underlying instructions provided to the GPGPU driver 608 to enable the machine learning framework 604 to take advantage of hardware acceleration via the GPGPU hardware 610 without requiring the machine learning framework 604 to have intimate knowledge of the architecture of the GPGPU hardware 610. Additionally, the compute framework 606 can enable hardware acceleration for the machine learning framework 604 across a variety of types and generations of the GPGPU hardware 610.

GPGPU Machine Learning Acceleration

Figure 7:
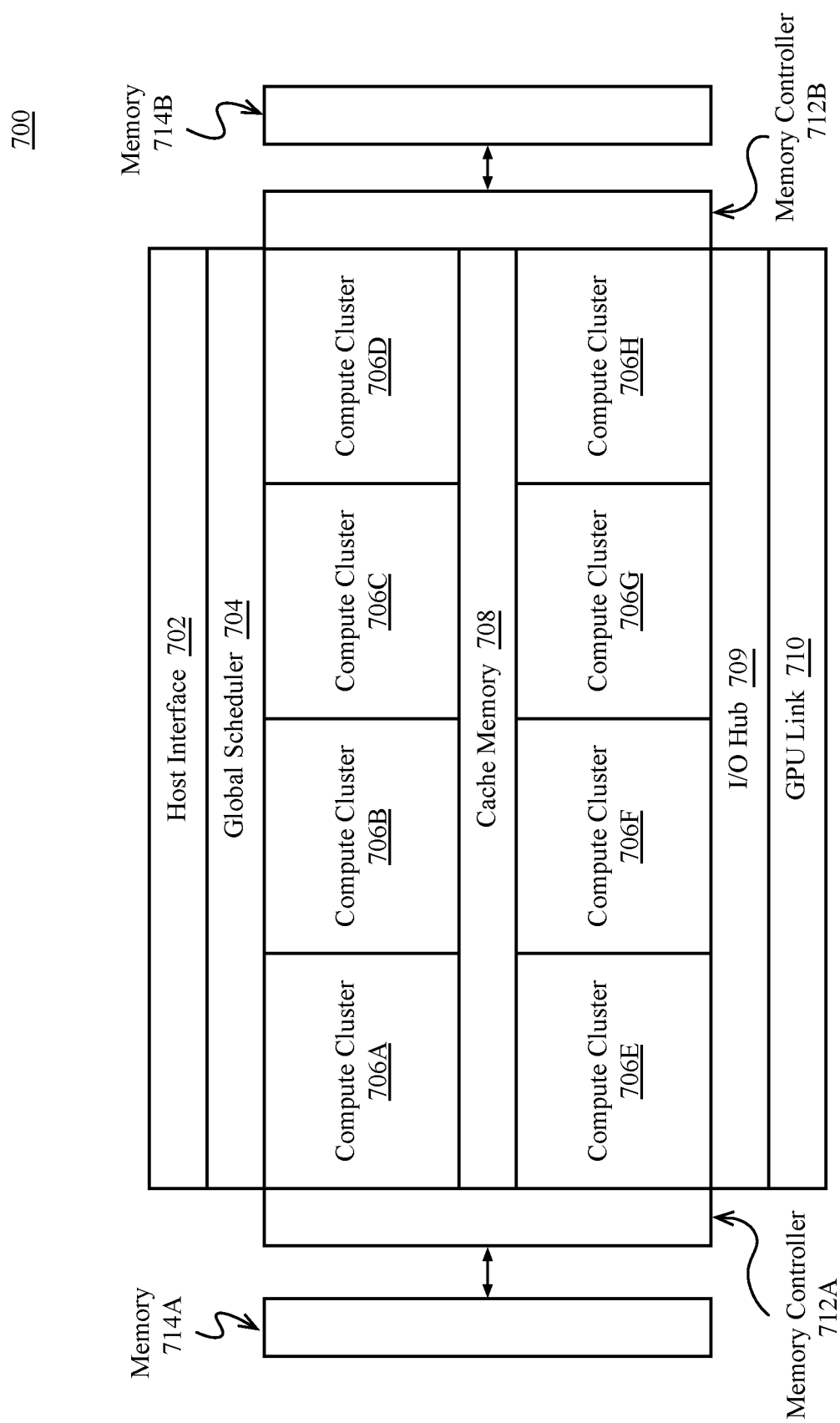
FIG. 7 illustrates a highly parallel general-purpose graphics processing unit, according to an embodiment.

FIG. 7 illustrates a highly-parallel general-purpose graphics processing unit 700, according to an embodiment. In one embodiment the general-purpose processing unit (GPGPU) 700 can be configured to be particularly efficient in processing the type of computational workloads associated with training deep neural networks. Additionally, the GPGPU 700 can be linked directly to other instances of the GPGPU to create a multi-GPU cluster to improve training speed for particularly deep neural networks.

The GPGPU 700 includes a host interface 702 to enable a connection with a host processor. In one embodiment the host interface 702 is a PCI Express interface. However, the host interface can also be a vendor specific communications interface or communications fabric. The GPGPU 700 receives commands from the host processor and uses a global scheduler 704 to distribute execution threads associated with those commands to a set of compute clusters 706A-706H. The compute clusters 706A-706H share a cache memory 708. The cache memory 708 can serve as a higher-level cache for cache memories within the compute clusters 706A-706H.

The GPGPU 700 includes memory 714A-714B coupled with the compute clusters 706A-706H via a set of memory controllers 712A-712B. In various embodiments, the memory 714A-714B can include various types of memory devices including dynamic random access memory (DRAM) or graphics random access memory, such as synchronous graphics random access memory (SGRAM), including graphics double data rate (GDDR) memory. In one embodiment, the memory units 224A-224N may also include 3D stacked memory, including but not limited to high bandwidth memory (HBM).

In one embodiment each compute cluster 706A-706H includes a set of graphics multiprocessors, such as the graphics multiprocessor 400 of FIG. 4A. The graphics multiprocessors of the compute cluster multiple types of integer and floating-point logic units that can perform computational operations at a range of precisions including suited for machine learning computations. For example and in one embodiment at least a subset of the floating-point units in each of the compute clusters 706A-706H can be configured to perform 16-bit or 32-bit floating-point operations, while a different subset of the floating point units can be configured to perform 64-bit floating-point operations.

Multiple instances of the GPGPU 700 can be configured to operate as a compute cluster. The communication mechanism used by the compute cluster for synchronization and data exchange varies across embodiments. In one embodiment the multiple instances of the GPGPU 700 communicate over the host interface 702. In one embodiment the GPGPU 700 includes an I/O hub 709 that couples the GPGPU 700 with a GPU link 710 that enables a direct connection to other instances of the GPGPU. In one embodiment the GPU link 710 is coupled to a dedicated GPU-to-GPU bridge that enables communication and synchronization between multiple instances of the GPGPU 700. In one embodiment the GPU link 710 couples with a high speed interconnect to transmit and receive data to other GPGPUs or parallel processors. In one embodiment the multiple instances of the GPGPU 700 are located in separate data processing systems and communicate via a network device that is accessible via the host interface 702. In one embodiment the GPU link 710 can be configured to enable a connection to a host processor in addition to or as an alternative to the host interface 702.

While the illustrated configuration of the GPGPU 700 can be configured to train neural networks, one embodiment provides alternate configuration of the GPGPU 700 that can be configured for deployment within a high performance or low power inferencing platform. In an inferencing configuration the GPGPU 700 includes fewer of the compute clusters 706A-H relative to the training configuration. Additionally memory technology associated with the memory 714A-714B may differ between inferencing and training configurations. In one embodiment the inferencing configuration of the GPGPU 700 can support inferencing specific instructions. For example, an inferencing configuration can provide support for one or more 8-bit integer dot product instructions, which are commonly used during inferencing operations for deployed neural networks.

Figure 8:
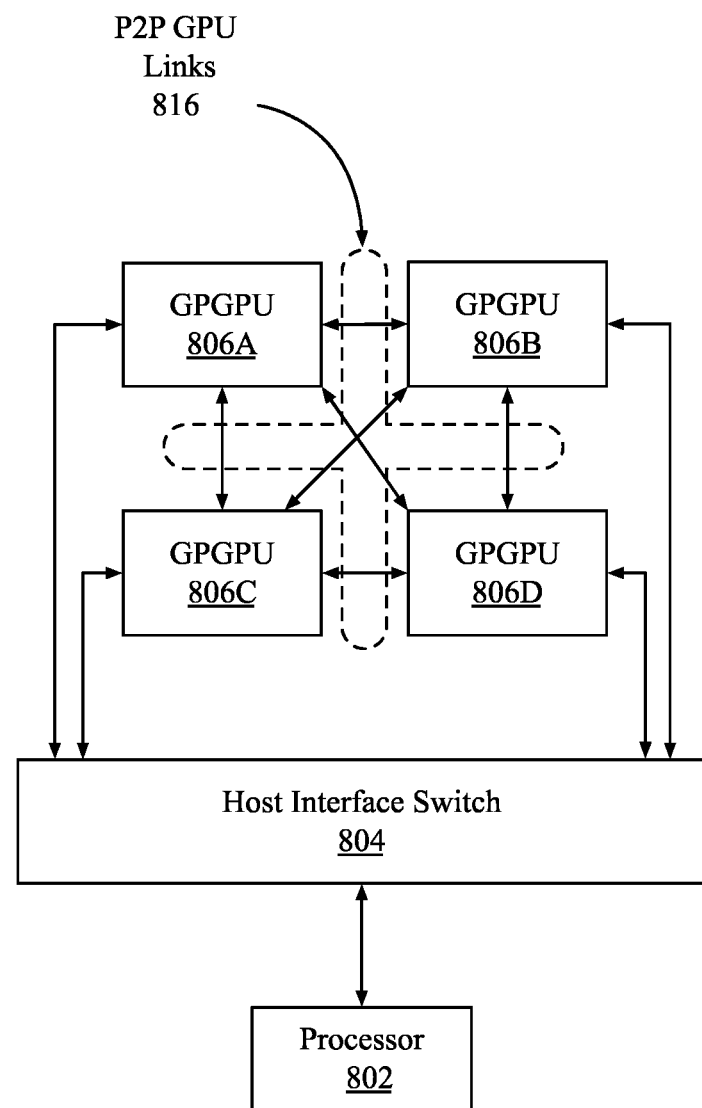
FIG. 8 illustrates a multi-GPU computing system, according to an embodiment.

FIG. 8 illustrates a multi-GPU computing system 800, according to an embodiment. The multi-GPU computing system 800 can include a processor 802 coupled to multiple GPGPUs 806A-D via a host interface switch 804. The host interface switch 804, in one embodiment, is a PCI express switch device that couples the processor 802 to a PCI express bus over which the processor 802 can communicate with the set of GPGPUs 806A-D. Each of the multiple GPGPUs 806A-806D can be an instance of the GPGPU 700 of FIG. 7. The GPGPUs 806A-D can interconnect via a set of high-speed point-to-point GPU to GPU links 816. The high-speed GPU to GPU links can connect to each of the GPGPUs 806A-806D via a dedicated GPU link, such as the GPU link 710 as in FIG. 7. The P2P GPU links 816 enable direct communication between each of the GPGPUs 806A-D without requiring communication over the host interface bus to which the processor 802 is connected. With GPU-to-GPU traffic directed to the P2P GPU links, the host interface bus remains available for system memory access or to communicate with other instances of the multi-GPU computing system 800, for example, via one or more network devices. While in the illustrated embodiment the GPGPUs 806A-D connect to the processor 802 via the host interface switch 804, in one embodiment the processor 802 includes direct support for the P2P GPU links 816 and can connect directly to the GPGPUs 806A-806D.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is well-known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 9A:
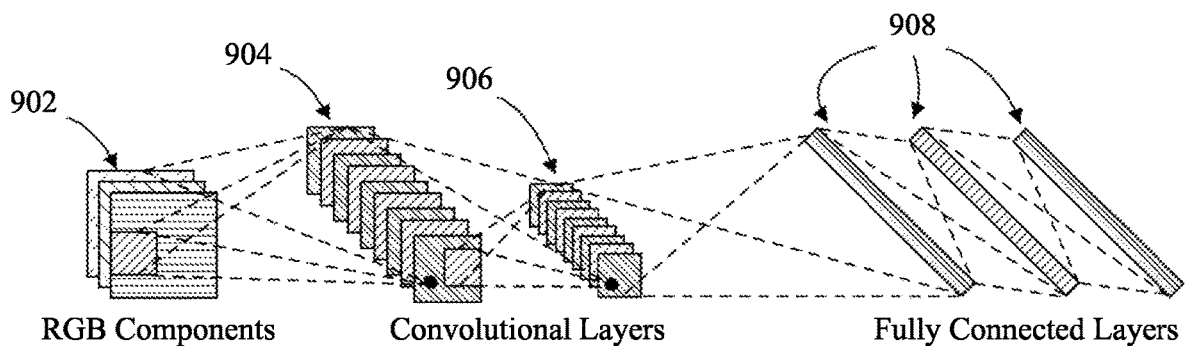
FIG. 9A-9B illustrate layers of exemplary deep neural networks.
Figure 9B:
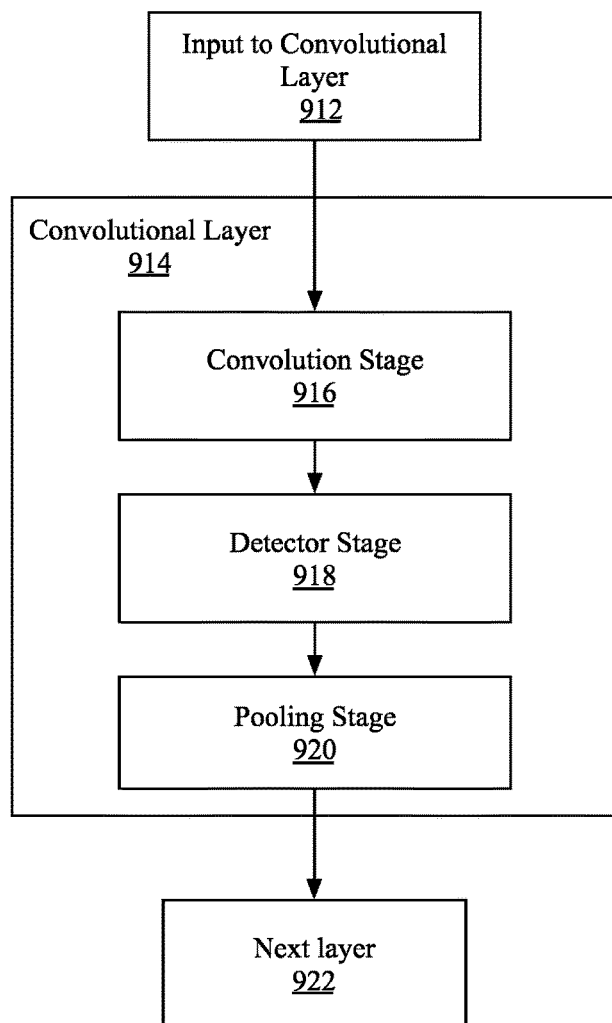

FIG. 9A-B illustrate an exemplary convolutional neural network. FIG. 9A illustrates various layers within a CNN. As shown in FIG. 9A, an exemplary CNN used to model image processing can receive input 902 describing the red, green, and blue (RGB) components of an input image. The input 902 can be processed by multiple convolutional layers (e.g., convolutional layer 904, convolutional layer 906). The output from the multiple convolutional layers may optionally be processed by a set of fully connected layers 908. Neurons in a fully connected layer have full connections to all activations in the previous layer, as previously described for a feedforward network. The output from the fully connected layers 908 can be used to generate an output result from the network. The activations within the fully connected layers 908 can be computed using matrix multiplication instead of convolution. Not all CNN implementations are make use of fully connected layers 908. For example, in some implementations the convolutional layer 906 can generate output for the CNN.

The convolutional layers are sparsely connected, which differs from traditional neural network configuration found in the fully connected layers 908. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 9B illustrates exemplary computation stages within a convolutional layer of a CNN. Input to a convolutional layer 912 of a CNN can be processed in three stages of a convolutional layer 914. The three stages can include a convolution stage 916, a detector stage 918, and a pooling stage 920. The convolutional layer 914 can then output data to a successive convolutional layer. The final convolutional layer of the network can generate output feature map data or provide input to a fully connected layer, for example, to generate a classification value for the input to the CNN.

In the convolution stage 916 performs several convolutions in parallel to produce a set of linear activations. The convolution stage 916 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 916 defines a set of linear activations that are processed by successive stages of the convolutional layer 914.

The linear activations can be processed by a detector stage 918. In the detector stage 918, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as $f(x)=\max(0, x)$, such that the activation is thresholded at zero.

The pooling stage 920 uses a pooling function that replaces the output of the convolutional layer 906 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 920, including max pooling, average pooling, and 12-norm pooling. Additionally, some CNN implementations do not include a pooling stage. Instead, such implementations substitute and additional convolution stage having an increased stride relative to previous convolution stages.

The output from the convolutional layer 914 can then be processed by the next layer 922. The next layer 922 can be an additional convolutional layer or one of the fully connected layers 908. For example, the first convolutional layer 904 of FIG. 9A can output to the second convolutional layer 906, while the second convolutional layer can output to a first layer of the fully connected layers 908.

Figure 10:
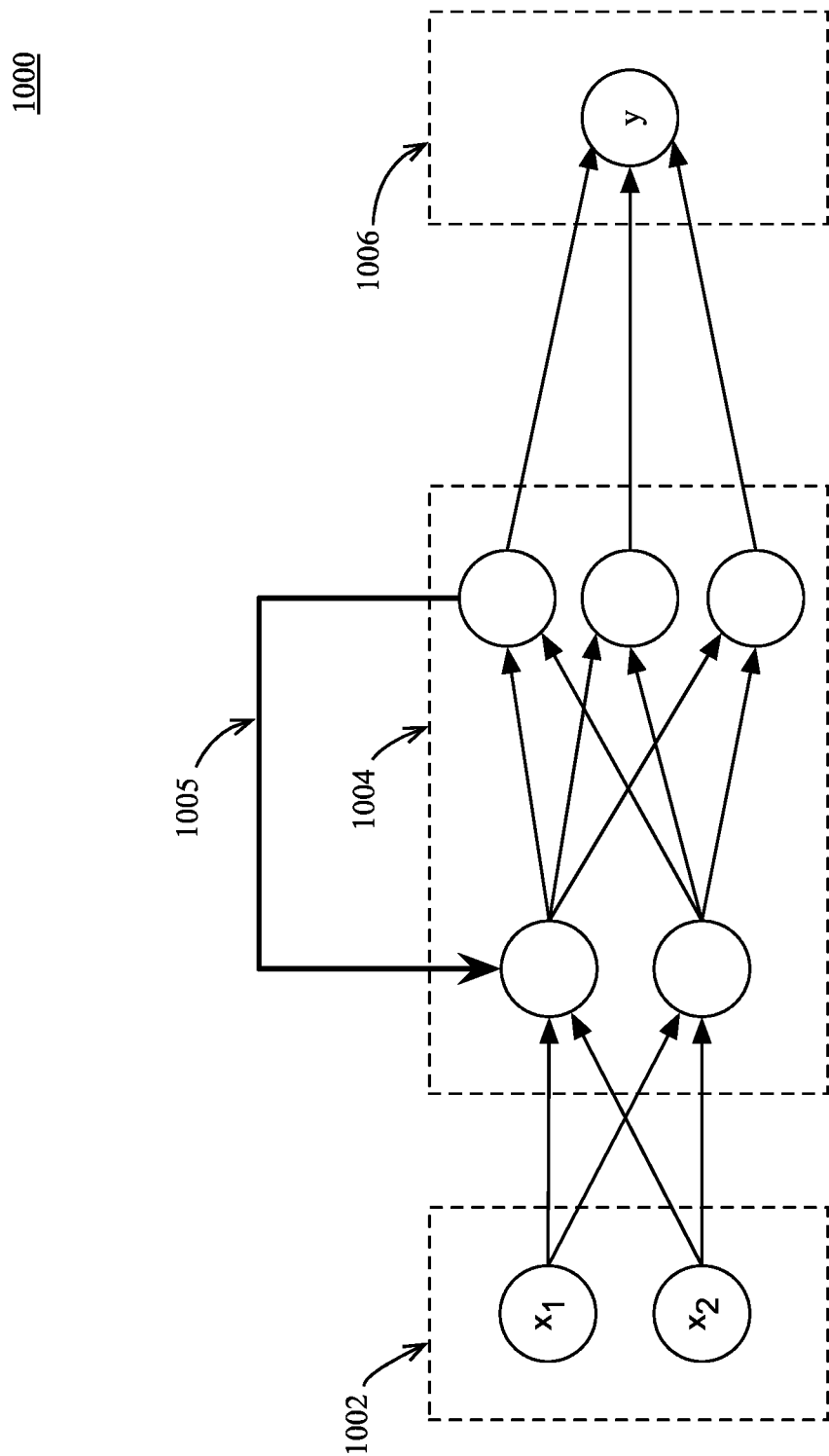
FIG. 10 illustrates an exemplary recurrent neural network.

FIG. 10 illustrates an exemplary recurrent neural network 1000. In a recurrent neural network (RNN), the previous state of the network influences the output of the current state of the network. RNNs can be built in a variety of ways using a variety of functions. The use of RNNs generally revolves around using mathematical models to predict the future based on a prior sequence of inputs. For example, an RNN may be used to perform statistical language modeling to predict an upcoming word given a previous sequence of words. The illustrated RNN 1000 can be described has having an input layer 1002 that receives an input vector, hidden layers 1004 to implement a recurrent function, a feedback mechanism 1005 to enable a 'memory' of previous states, and an output layer 1006 to output a result. The RNN 1000 operates based on time-steps. The state of the RNN at a given time step is influenced based on the previous time step via the feedback mechanism 1005. For a given time step, the state of the hidden layers 1004 is defined by the previous state and the input at the current time step. An initial input ($x_1$) at a first time step can be processed by the hidden layer 1004. A second input ($x_2$) can be processed by the hidden layer 1004 using state information that is determined during the processing of the initial input ($x_1$). A given state can be computed as $s_t=f(Ux_t+Ws_{t-1})$, where U and W are parameter matrices. The function $f$ is generally a non-linearity, such as the hyperbolic tangent function (Tanh) or a variant of the rectifier function $f(x)=\max(\theta, x)$. However, the specific mathematical function used in the hidden layers 1004 can vary depending on the specific implementation details of the RNN 1000.

In addition to the basic CNN and RNN networks described, variations on those networks may be enabled. One example RNN variant is the long short term memory (LSTM) RNN. LSTM RNNs are capable of learning long-term dependencies that may be necessary for processing longer sequences of language. A variant on the CNN is a convolutional deep belief network, which has a structure similar to a CNN and is trained in a manner similar to a deep belief network. A deep belief network (DBN) is a generative neural network that is composed of multiple layers of stochastic (random) variables. DBNs can be trained layer-by-layer using greedy unsupervised learning. The learned weights of the DBN can then be used to provide pre-train neural networks by determining an optimal initial set of weights for the neural network.

Figure 11:
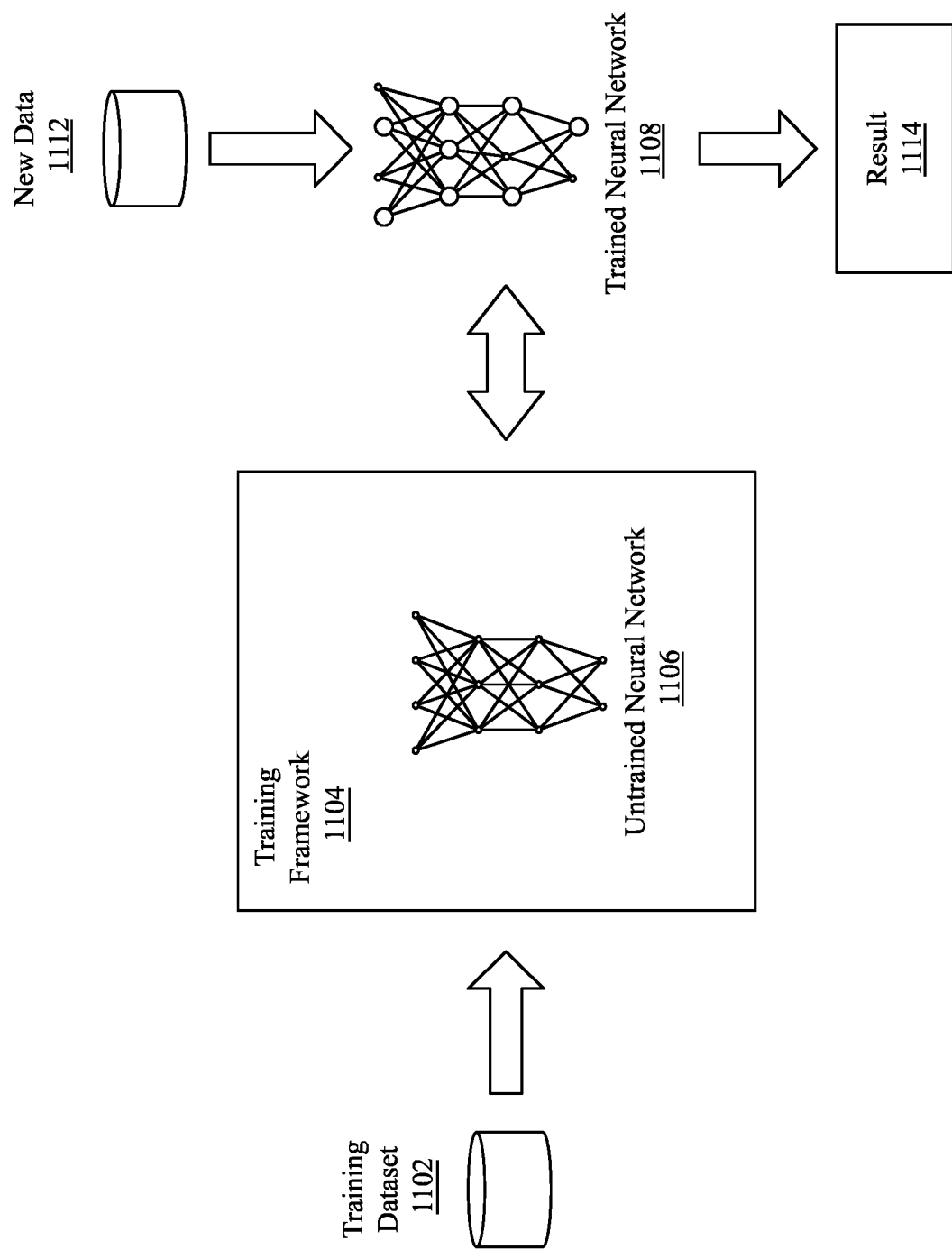
FIG. 11 illustrates training and deployment of a deep neural network.

FIG. 11 illustrates training and deployment of a deep neural network. Once a given network has been structured for a task the neural network is trained using a training dataset 1102. Various training frameworks 1104 have been developed to enable hardware acceleration of the training process. For example, the machine learning framework 604 of FIG. 6 may be configured as a training framework 1104. The training framework 1104 can hook into an untrained neural network 1106 and enable the untrained neural net to be trained using the parallel processing resources described herein to generate a trained neural network 1108.

To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 1102 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 1104 can adjust to adjust the weights that control the untrained neural network 1106. The training framework 1104 can provide tools to monitor how well the untrained neural network 1106 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural network 1108. The trained neural network 1108 can then be deployed to implement any number of machine learning operations to generate an inference result 1114 based on input of new data 1112.

Unsupervised learning is a learning method in which the network attempts to train itself using unlabeled data. Thus, for unsupervised learning the training dataset 1102 will include input data without any associated output data. The untrained neural network 1106 can learn groupings within the unlabeled input and can determine how individual inputs are related to the overall dataset. Unsupervised training can be used to generate a self-organizing map, which is a type of trained neural network 1108 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 1102 includes a mix of labeled and unlabeled data of the same distribution. Incremental learning is a variant of supervised learning in which input data is continuously used to further train the model. Incremental learning enables the trained neural network 1108 to adapt to the new data 1112 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

Figure 12:
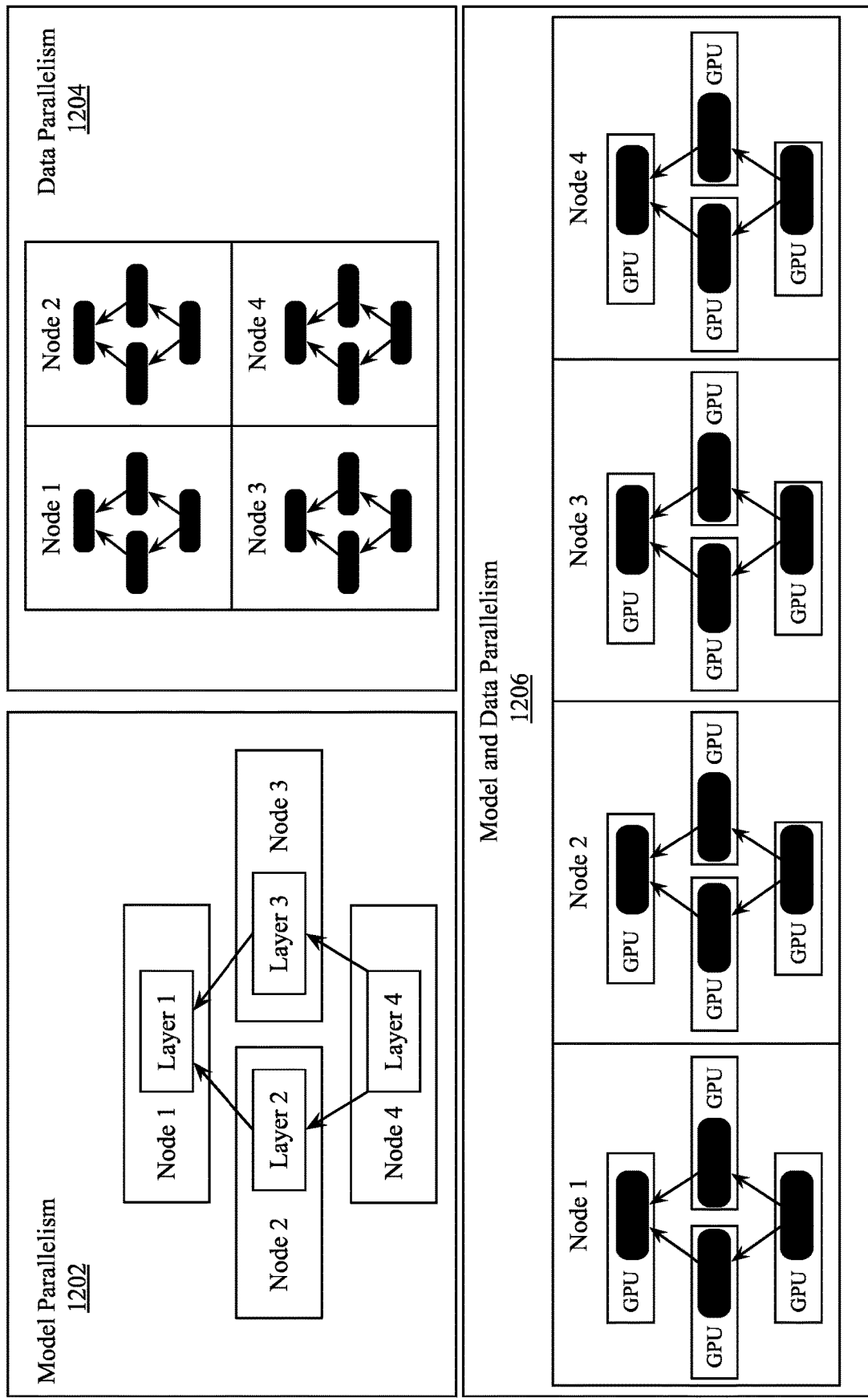
FIG. 12 is a block diagram illustrating distributed learning.

FIG. 12 is a block diagram illustrating distributed learning. Distributed learning is a training model that uses multiple distributed computing nodes to perform supervised or unsupervised training of a neural network. The distributed computational nodes can each include one or more host processors and one or more of the general-purpose processing nodes, such as the highly parallel general-purpose graphics processing unit 700 as in FIG. 7. As illustrated, distributed learning can be performed model parallelism 1202, data parallelism 1204, or a combination of model and data parallelism 1204.

In model parallelism 1202, different computational nodes in a distributed system can perform training computations for different parts of a single network. For example, each layer of a neural network can be trained by a different processing node of the distributed system. The benefits of model parallelism include the ability to scale to particularly large models. Splitting the computations associated with different layers of the neural network enables the training of very large neural networks in which the weights of all layers would not fit into the memory of a single computational node. In some instances, model parallelism can be particularly useful in performing unsupervised training of large neural networks.

In data parallelism 1204, the different nodes of the distributed network have a complete instance of the model and each node receives a different portion of the data. The results from the different nodes are then combined. While different approaches to data parallelism are possible, data parallel training approaches all require a technique of combining results and synchronizing the model parameters between each node. Exemplary approaches to combining data include parameter averaging and update based data parallelism. Parameter averaging trains each node on a subset of the training data and sets the global parameters (e.g., weights, biases) to the average of the parameters from each node. Parameter averaging uses a central parameter server that maintains the parameter data. Update based data parallelism is similar to parameter averaging except that instead of transferring parameters from the nodes to the parameter server, the updates to the model are transferred. Additionally, update based data parallelism can be performed in a decentralized manner, where the updates are compressed and transferred between nodes.

Combined model and data parallelism 1206 can be implemented, for example, in a distributed system in which each computational node includes multiple GPUs. Each node can have a complete instance of the model with separate GPUs within each node are used to train different portions of the model.

Distributed training has increased overhead relative to training on a single machine. However, the parallel processors and GPGPUs described herein can each implement various techniques to reduce the overhead of distributed training, including techniques to enable high bandwidth GPU-to-GPU data transfer and accelerated remote data synchronization.

Exemplary Machine Learning Applications

Machine learning can be applied to solve a variety of technological problems, including but not limited to computer vision, autonomous driving and navigation, speech recognition, and language processing. Computer vision has traditionally been one of the most active research areas for machine learning applications. Applications of computer vision range from reproducing human visual abilities, such as recognizing faces, to creating new categories of visual abilities. For example, computer vision applications can be configured to recognize sound waves from the vibrations induced in objects visible in a video. Parallel processor accelerated machine learning enables computer vision applications to be trained using significantly larger training dataset than previously feasible and enables inferencing systems to be deployed using low power parallel processors.

Parallel processor accelerated machine learning has autonomous driving applications including lane and road sign recognition, obstacle avoidance, navigation, and driving control. Accelerated machine learning techniques can be used to train driving models based on datasets that define the appropriate responses to specific training input. The parallel processors described herein can enable rapid training of the increasingly complex neural networks used for autonomous driving solutions and enables the deployment of low power inferencing processors in a mobile platform suitable for integration into autonomous vehicles.

Parallel processor accelerated deep neural networks have enabled machine learning approaches to automatic speech recognition (ASR). ASR includes the creation of a function that computes the most probable linguistic sequence given an input acoustic sequence. Accelerated machine learning using deep neural networks have enabled the replacement of the hidden Markov models (HMMs) and Gaussian mixture models (GMMs) previously used for ASR.

Parallel processor accelerated machine learning can also be used to accelerate natural language processing. Automatic learning procedures can make use of statistical inference algorithms to produce models that are robust to erroneous or unfamiliar input. Exemplary natural language processor applications include automatic machine translation between human languages.

The parallel processing platforms used for machine learning can be divided into training platforms and deployment platforms. Training platforms are generally highly parallel and include optimizations to accelerate multi-GPU single node training and multi-node, multi-GPU training. Exemplary parallel processors suited for training include the highly parallel general-purpose graphics processing unit 700 of FIG. 7 and the multi-GPU computing system 800 of FIG. 8. On the contrary, deployed machine learning platforms generally include lower power parallel processors suitable for use in products such as cameras, autonomous robots, and autonomous vehicles.

Figure 13:
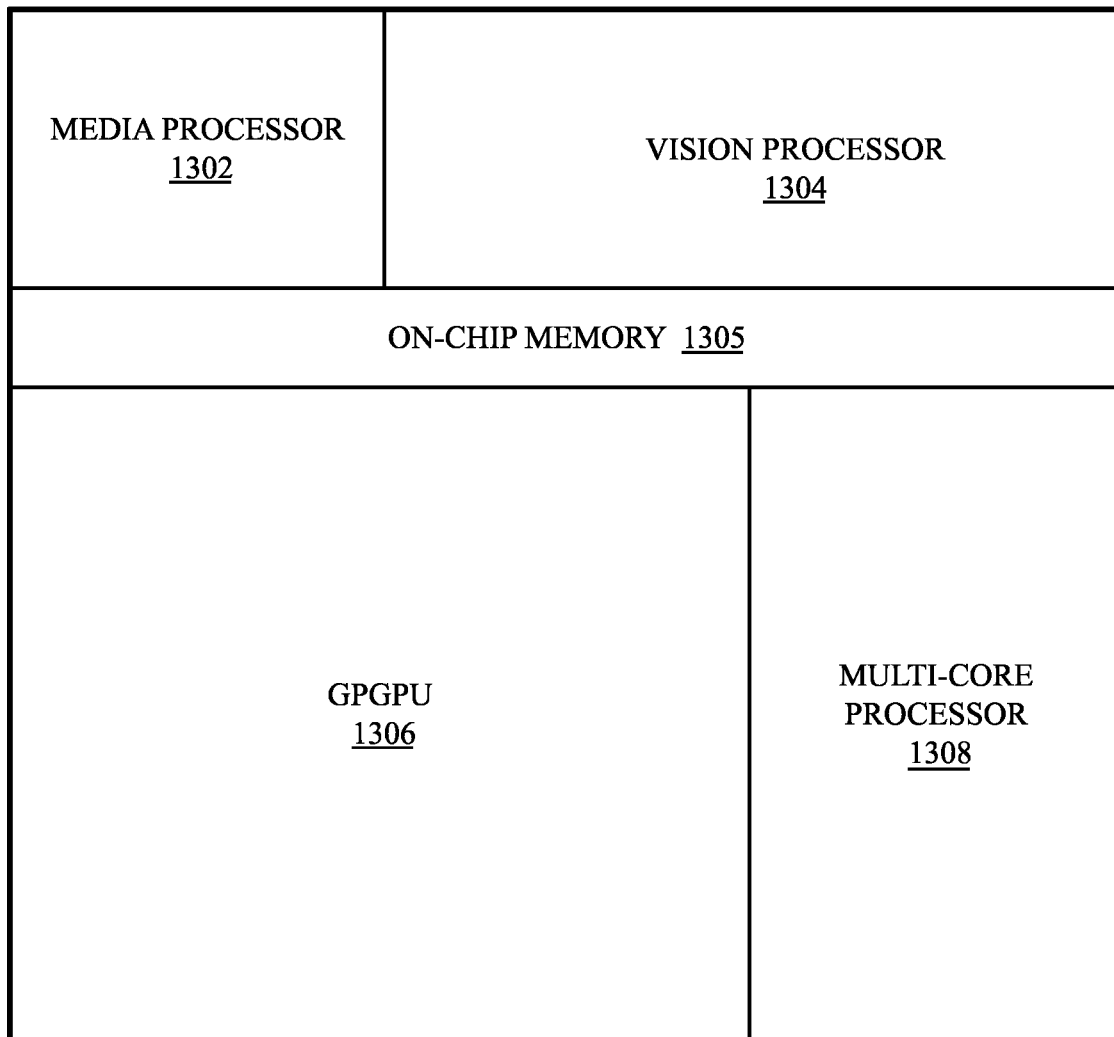
FIG. 13 illustrates an exemplary inferencing system on a chip (SOC) suitable for performing inferencing using a trained model.

FIG. 13 illustrates an exemplary inferencing system on a chip (SOC) 1300 suitable for performing inferencing using a trained model. The SOC 1300 can integrate processing components including a media processor 1302, a vision processor 1304, a GPGPU 1306 and a multi-core processor 1308. The SOC 1300 can additionally include on-chip memory 1305 that can enable a shared on-chip data pool that is accessible by each of the processing components. The processing components can be optimized for low power operation to enable deployment to a variety of machine learning platforms, including autonomous vehicles and autonomous robots. For example, one implementation of the SOC 1300 can be used as a portion of the main control system for an autonomous vehicle. Where the SOC 1300 is configured for use in autonomous vehicles the SOC is designed and configured for compliance with the relevant functional safety standards of the deployment jurisdiction.

During operation, the media processor 1302 and vision processor 1304 can work in concert to accelerate computer vision operations. The media processor 1302 can enable low latency decode of multiple high-resolution (e.g., 4K, 8K) video streams. The decoded video streams can be written to a buffer in the on-chip memory 1305. The vision processor 1304 can then parse the decoded video and perform preliminary processing operations on the frames of the decoded video in preparation of processing the frames using a trained image recognition model. For example, the vision processor 1304 can accelerate convolution operations for a CNN that is used to perform image recognition on the high-resolution video data, while back end model computations are performed by the GPGPU 1306.

The multi-core processor 1308 can include control logic to assist with sequencing and synchronization of data transfers and shared memory operations performed by the media processor 1302 and the vision processor 1304. The multi-core processor 1308 can also function as an application processor to execute software applications that can make use of the inferencing compute capability of the GPGPU 1306. For example, at least a portion of the navigation and driving logic can be implemented in software executing on the multi-core processor 1308. Such software can directly issue computational workloads to the GPGPU 1306 or the computational workloads can be issued to the multi-core processor 1308, which can offload at least a portion of those operations to the GPGPU 1306.

The GPGPU 1306 can include compute clusters such as a low power configuration of the compute clusters 706A-706H within the highly parallel general-purpose graphics processing unit 700. The compute clusters within the GPGPU 1306 can support instruction that are specifically optimized to perform inferencing computations on a trained neural network. For example, the GPGPU 1306 can support instructions to perform low precision computations such as 8-bit and 4-bit integer vector operations.

Specialized Hardware for Efficient Machine Learning Operations

Embodiments described herein provide high-level machine learning computational primitives that can be used to abstract many of the underlying computational details of performing machine learning calculations. The high-level primitives described herein enable software logic to request high-level machine learning operations while abstracting the underlying implementation details of those operations. For example and in one embodiment, software logic can request a convolution operation for an image using a given set of filters. A single high-level instruction can be executed that has operands to define input and output buffer addresses and addresses for buffers storing filter and/or kernel data. The GPGPU can then divide the high-level convolution instruction into multiple sub-operations that are performed by the underlying compute units of the GPGPU. In one embodiment direct hardware support for one or more subroutines of the basic linear algorithm subprograms (BLAS) is provided, although embodiments can provide hardware support for other libraries of subroutines. Compiler logic and associated runtime libraries can compile source code that make use of supported high-level compute subroutines and output compiled source code that calls into a machine learning macro-instruction unit.

Figure 14:
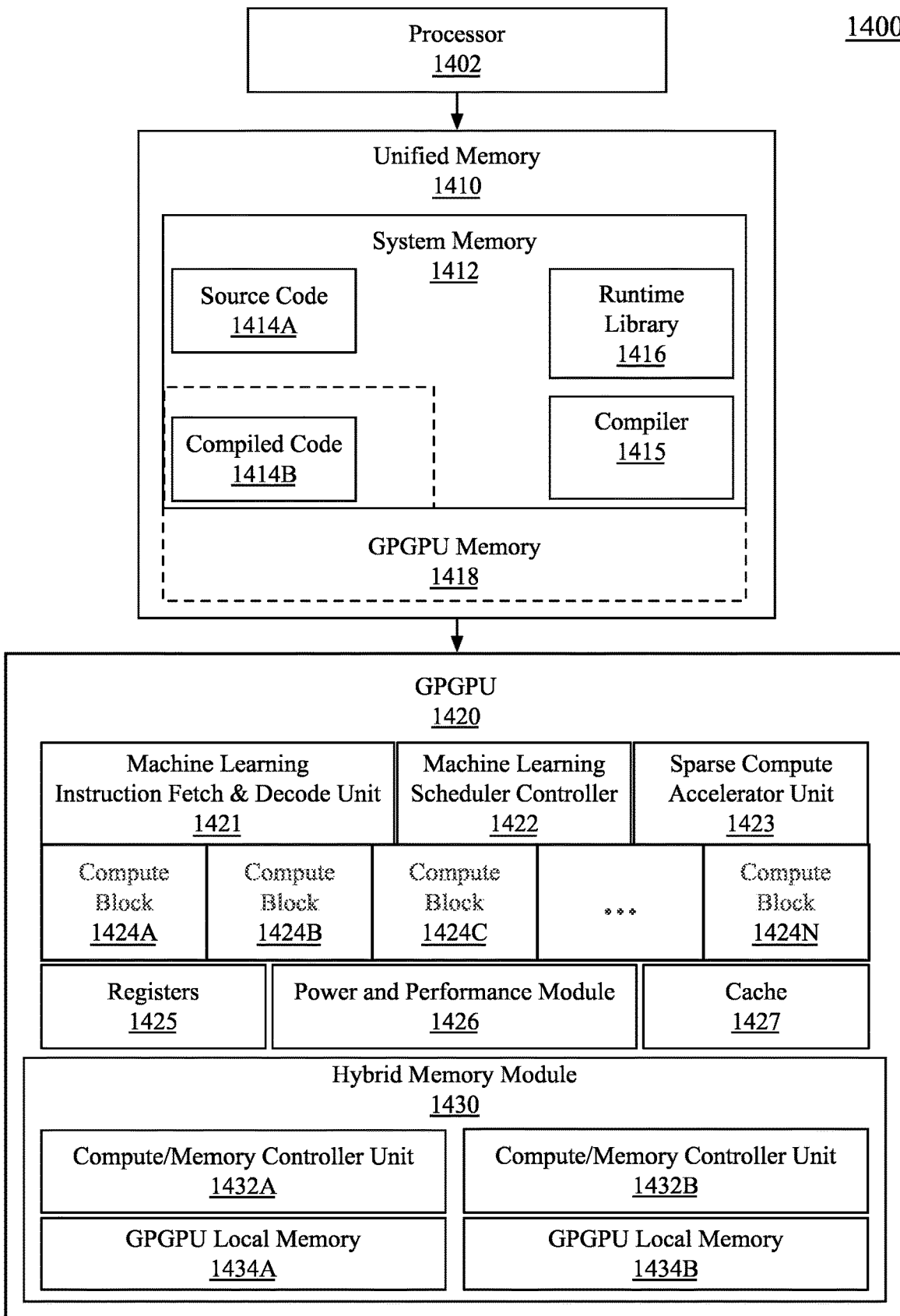
FIG. 14 is a block diagram of a data processing system, according to an embodiment.

Machine Learning Acceleration Logic with Custom Coarse Grained Pipeline Operations FIG. 14 is a block diagram of a data processing system 1400, according to an embodiment. The data processing system 1400 is a heterogeneous processing system having a processor 1402, unified memory 1410, and a GPGPU 1420 including machine learning acceleration logic. The processor 1402 and the GPGPU 1420 can be any of the processors and GPGPU/parallel processors as described herein. The processor 1402 can execute instructions for a compiler 1415 stored in system memory 1412. The compiler 1415 executes on the processor 1402 to compile source code 1414A into compiled code 1414B. The compiled code 1414B can include code that may be executed by the processor 1402 and/or code that may be executed by the GPGPU 1420. During compilation, the compiler 1415 can perform operations to insert metadata, including hints as to the level of data parallelism present in the compiled code 1414B and/or hints regarding the data locality associated with threads to be dispatched based on the compiled code 1414B. The compiler 1415 can include the information necessary to perform such operations or the operations can be performed with the assistance of a runtime library 1416. The runtime library 1416 can also facilitate the compiler 1415 in the compilation of the source code 1414A and can also include instructions that are linked at runtime with the compiled code 1414B to facilitate execution of the compiled instructions on the GPGPU 1420.

The unified memory 1410 represents a unified address space that may be accessed by the processor 1402 and the GPGPU 1420. The unified memory includes system memory 1412 as well as GPGPU memory 1418. The GPGPU memory 1418 includes GPGPU local memory 1434A-1434B within the GPGPU 1420 and can also include some or all of system memory 1412. For example, compiled code 1414B stored in system memory 1412 can also be mapped into GPGPU memory 1418 for access by the GPGPU 1420.

The GPGPU 1420 includes multiple compute blocks 1424A-1424N, which can be instances of the compute cluster 214A-214N of FIG. 2A. The GPGPU 1420 also includes a set of registers 1425, cache memory 1427, and a power and performance module 1426 that can be used as shared resources for the compute blocks 1424A-1424N. In one embodiment the registers 1425 include directly and indirectly accessible registers, where the indirectly accessible registers are optimized for use in sparse matrix compute operations. The power and performance module 1426 can be configured to adjust power delivery and clock frequencies for the compute blocks 1424A-1424N to power gate idle components within the compute blocks 1424A-1424N under heavy workloads. The GPGPU 1420 includes GPGPU local memory 1434A-1434B, which are physical memory modules that share a graphics card or multi-chip module with the GPGPU 1420.

In one embodiment the GPGPU local memory 1434A-1434B resides in a hybrid memory module 1430. The hybrid memory module 1430 includes a set of compute and memory controller units 1432A-1432B that provide both memory controller and compute functionality. The compute and memory controller units 1432A-1432B include logic modules that can perform near data compute operations on data directly within the GPGPU local memory 1434A-1434B. The compute and memory controller units 1432A-

1432B can receive direct scheduling of memory bound operations from the machine-learning scheduler controller 1422 or can receive offload of these operations from the sparse compute accelerator unit 1423 or the compute blocks 1424A-1424B. In one embodiment the compute and memory controllers 1432A-1432B include compute logic that is capable of performing a subset of the compute operations that can be performed by the compute blocks 1424A-1424N. For example and in one embodiment the compute and memory controller units 1432A-1432B, in addition to operations required to perform memory controller operations, can be configured to perform a subset of compute operations that are specifically useful for significantly memory bound operations, or operations in which memory bandwidth is more deterministic of performance than compute throughput. In one embodiment the compute logic of the compute and memory controller units 1432A-1432B can be processors having a different instruction set relative to the instruction set supported by the compute block 1424A-1424N. In one embodiment the hybrid memory module 1430 is implemented via 3D stacking technology to enable the GPGPU local memory 1434A-1434B to be vertically stacked on top of the compute/memory controller units 1432A-1432B, which are coupled via a high-bandwidth through-silicon interconnect. The high bandwidth connection between the compute and memory controller units 1432A-1432B and the GPGPU local memory 1434A-1434B can enable memory bound operations to be efficiently performed within the hybrid memory module 1430 using lower-power compute units, as opposed to cycling large amount of data from the GPGPU local memory 1434A-1434B into and out of the cache memory 1427 for processing via the compute blocks 1424A-1424N.

In one embodiment support for near-data compute offload is enabled via an extension to the ISA supported by the compute blocks 1424A-1424N. In one embodiment, support for near-data compute offload is enabled via firmware logic executed by the machine learning scheduler controller 1422. Before executing near-data compute operations, for example via a near-data compute kernel, the set of virtual addresses to be accessed by the near-data compute kernel can be translated into physical addresses that are recognizable by the compute and memory controller units 1432A-1432B. The address translation can be performed for the kernel before the kernel is dispatched or offloaded to the compute memory controller units 1432A-1432B.

In one embodiment the GPGPU 1420 includes machine learning acceleration logic including a machine learning instruction fetch and decode unit 1421, a machine learning scheduler controller 1422, and a sparse compute accelerator unit 1423. The machine learning instruction fetch and decode unit 1421 is a fetch and decode unit including logic to fetch and decode machine learning instructions that define complex, customizable behavior. The instructions can sequence and/or serialize, via the machine learning scheduler controller 1422, a set of instructions to be performed via one or more of the compute blocks 1424A-1424N. In one embodiment the machine learning scheduler controller 1422 is an ASIC configurable to perform advanced scheduling operations. In one embodiment the machine learning scheduler controller 1422 is a micro-controller or a low energy-per-instruction processing core capable of performing instructions loaded from a firmware module.

In one embodiment some functions to be performed by the compute blocks 1424A-1424N can be directly scheduled to or offloaded to the sparse compute accelerator unit 1423. The spare compute accelerator unit 1423 includes processing element logic configured to efficiently perform compute operations on sparse matrices. In one embodiment the sparse compute accelerator unit 1423 is configured to perform matrix multiplications for neural networks having sparse weight values. In one embodiment the sparse compute accelerator unit 1423 is an application specific integrated circuit explicitly configured to perform a parallel matrix multiplication operations in which one or more operands are sparse or very sparse matrices. In one embodiment the sparse compute accelerator unit 1423 is a field programmable gate array (FPGA) that provides fixed function logic that can updated between workloads.

Figure 15A:
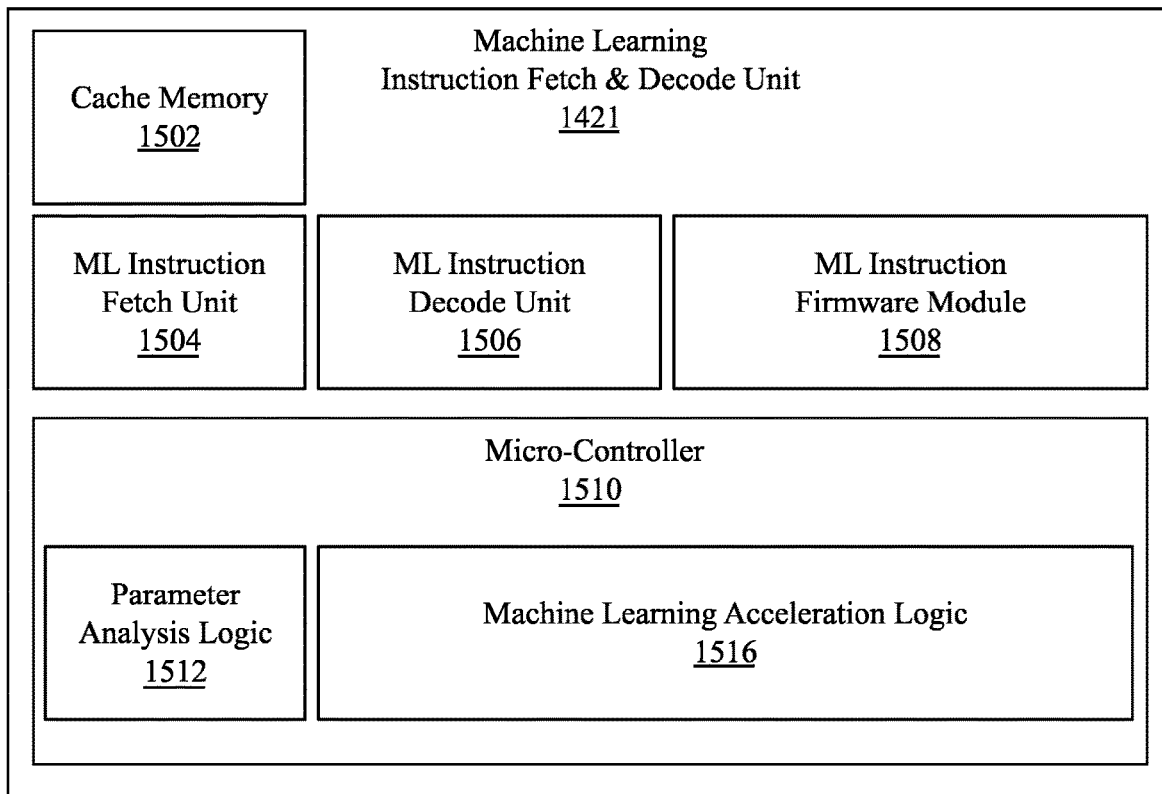
FIG. 15A illustrates details of a machine learning instruction and fetch unit, according to an embodiment.

FIG. 15A illustrates details of the machine learning instruction and fetch unit 1421, according to an embodiment. In one embodiment the machine learning instruction fetch & decode unit 1421 includes a cache memory 1502, a machine leaning instruction fetch unit 1504, and a machine learning instruction decode unit 1506. The machine learning instruction fetch unit 1504 can fetch one or more machine learning macroinstructions and store the macroinstructions in the cache memory 1502. The machine learning instruction decode unit 1506 can decode the machine learning macroinstructions and determine a set of operations to perform in response. In one embodiment the machine learning instruction fetch and decode unit 1421 includes a micro-controller 1510 to enable complex operations, such as selecting one of a plurality techniques to use to perform a specific machine learning operation, such as a convolution operation. The micro-controller 1510 can also determine whether to perform operations for a macroinstruction via programmable logic within the GPGPU or via special purpose machine learning logic within the GPGPU.

In one embodiment the micro-controller 1510 can load firmware logic from a machine learning firmware module 1508 to define the operations to perform in response to a machine learning macroinstruction. In one embodiment the machine learning firmware module 1508 can be updated via driver logic of the GPGPU to expand the set of operations that are supported via machine learning macroinstructions and/or to expand the capability of supported macroinstructions. In one embodiment the micro-controller 1510 enables explicit support for convolution operations or other matrix or neural network related operations via machine learning acceleration logic 1516.

The computations for a CNN include applying convolution mathematical operation to each filter to produce the output of that filter. Each filter is a kernel with trainable weights that is convolved across the width and height of an input volume to compute dot products between the entries of the filter and the input at any position. As the filter is convolved over the input volume, a two-dimensional activation map is generated to indicate the response of the filter at each spatial position. An activation map is generated for each filter applied to the input volume. Filter sizes used within a CNN can vary based on the implementation details of the neural network.

In one embodiment the parameter analysis logic 1512 can analyze the parameters for a requested convolution operation. A convolution operation has two inputs, the input data and the convolutional filter. The input data includes a batch of image data of H×W pixels and C number of input feature maps. The convolutional filter has R rows and S columns. In one embodiment the parameter analysis logic 1512 determines, based on the dimension R×S of the convolutional filter, whether to perform at least a portion of the convolution via special purpose convolution logic, for example, if the size of the convolutional filter indicates that convolution would be less efficiently performed via the GPGPU programmable logic. In one embodiment, based on convolutional parameters including the convolutional filter dimension, the input image or feature map dimension, and current operational metrics of the GPGPU, the machine learning acceleration logic 1516 can select an algorithm to use to perform a requested convolutional operation.

For example, the machine learning acceleration logic 1516 can be configured to select one of several possible algorithms to use to implement convolution. In one embodiment convolution is performed via Fast Fourier Transform (FFT) based convolution. FFT convolution uses the principle that multiplication in the frequency domain corresponds to convolution in the time domain. Thus, the Fourier transform of a convolution of two functions is the product of the Fourier transforms of those functions. The input data can be transformed into the frequency domain using a discreet Fourier Transform (DFT), multiplied by the frequency response of the filter, and then transformed back into the time domain using the Inverse DFT. For example and in one embodiment, for convolution using small filter sizes (e.g., 1×1, 3×3), Winograd's minimal filtering algorithm can be used to perform the convolution. Larger filter sizes (e.g., 4×4) can be performed via other FFT algorithms. Convolution for even larger filter sizes (5×5, 7×7) can be performed via specialized fixed function convolution hardware. Alternatively, direct convolution can be performed in the original domain of the data using batched matrix operations via hardware acceleration of general matrix to matrix multiplication (GEMM) subroutines.

Figure 15B:
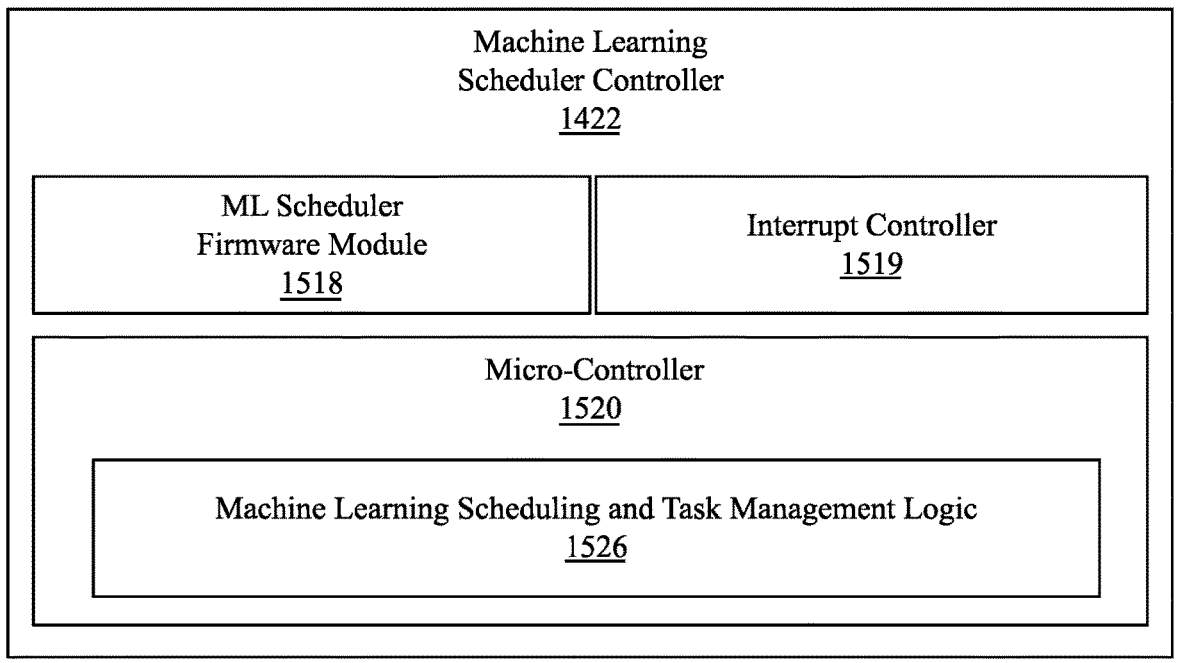
FIG. 15B illustrates details of a machine learning scheduler controller, according to an embodiment.

FIG. 15B illustrates details of a machine learning scheduler controller, according to an embodiment. The machine learning scheduler controller 1422, in one embodiment, includes a micro-controller 1520 configured to execute instructions or commands to enable machine learning scheduling and task management logic 1526. The machine learning scheduling and task management logic 1526 can facilitate the scheduling and preemption of the various pipeline commands and instructions that implement the complex machine-learning acceleration operations described herein. The machine learning scheduling and task management logic 1526 can be enabled via instructions stored in a machine learning scheduler firmware module 1518. The instructions stored in the machine learning scheduler firmware module 1518 may be field updatable to enable enhancement and expansion of the capability of the machine learning scheduler controller 1422. The machine learning scheduler controller 1422 can additionally include an interrupt controller 1519 to enable the machine learning scheduler controller 1422 to receive and process interrupts from compute elements within the general-purpose graphics processor. While the machine learning scheduler controller 1422 is illustrated as including a micro-controller 1520, in one embodiment the machine learning scheduling controller is implemented via an FPGA module embedded within the GPGPU.

Figure 16:
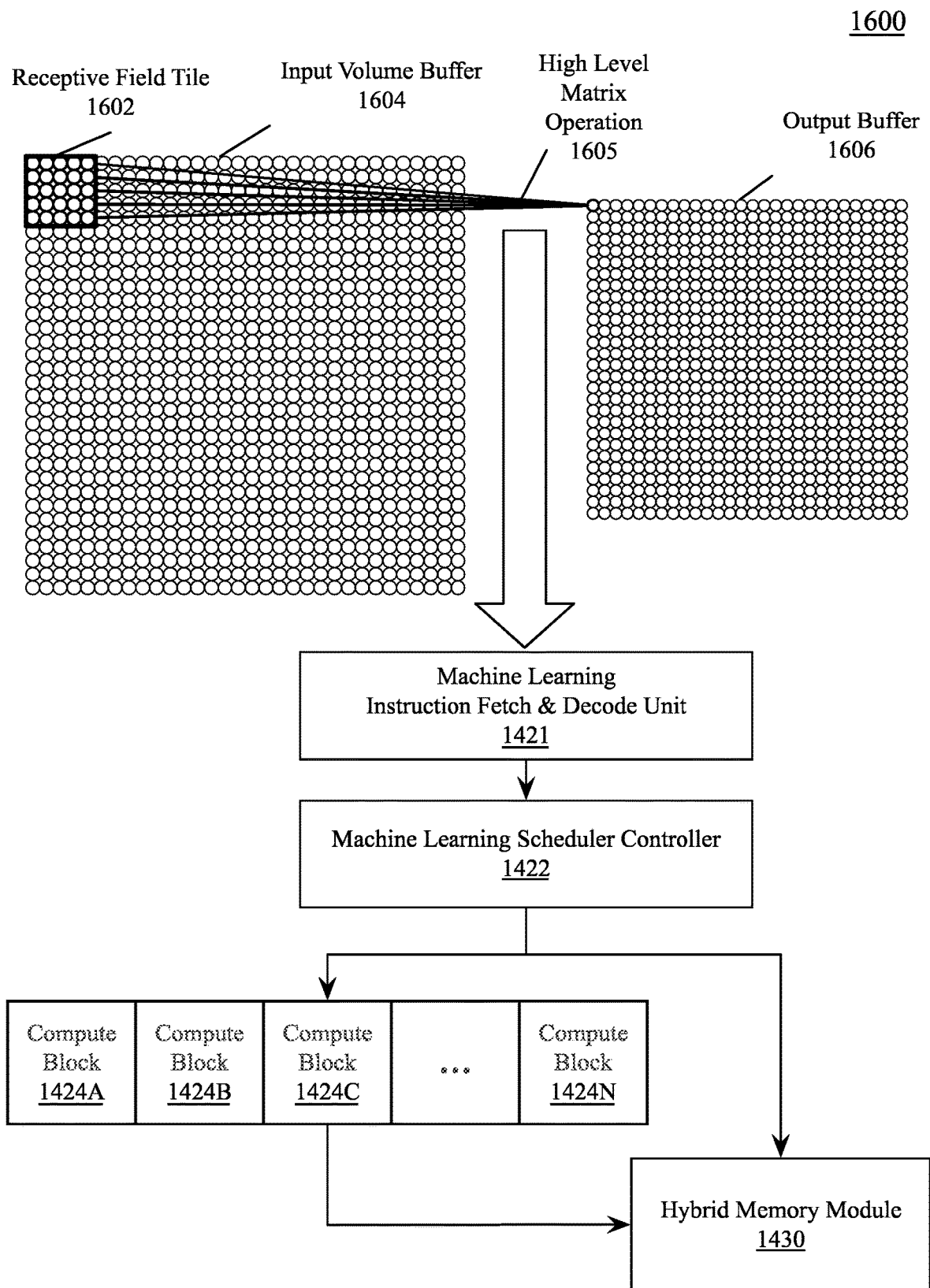
FIG. 16 illustrates exemplary convolution operations, according to embodiments.

FIG. 16 illustrates exemplary convolution operations, according to embodiments. An input volume buffer 1604 represents a 2D channel of input data. While 2D convolution is illustrated, convolution can also be performed on a three-dimensional volume of input using three dimensional filters. A receptive field tile 1602 highlights a portion of the input volume. A dot product is performed between the data within the receptive field tile 1602 and a convolutional filter to generate a data point within output buffer 1606. The combination of the data points within the output buffer 1606 represents an activation map generated by the convolution. Each point within the activation map is generated by sliding the receptive field tile across the input volume buffer 1604. The activation map data can be input to an activation function to determine an output activation value.

In one embodiment, convolution of the input volume buffer 1604 is performed via a set of high-level matrix operations 1605. The high-level matrix operations can be performed via primitive operations, such as a BLAS operation, that is accelerated via macroinstructions that can be decoded via the machine learning instruction fetch and decode unit 1421. The machine learning instruction fetch and decode unit 1421 can dispatch operations to the machine learning scheduler controller 1422 for scheduling. The operations can then be scheduled to the one or more compute blocks 1424A-1424N. The compute blocks 1424A-1424N can communicate with the hybrid memory module 1430 to store data into local graphics memory. The compute blocks 1424A-1424N can also offload memory intensive operations to near data compute processors within the hybrid memory module 1430. In one embodiment the machine learning scheduler controller 1422 can dispatch compute operations directly to the hybrid memory module 1430.

Figure 17:
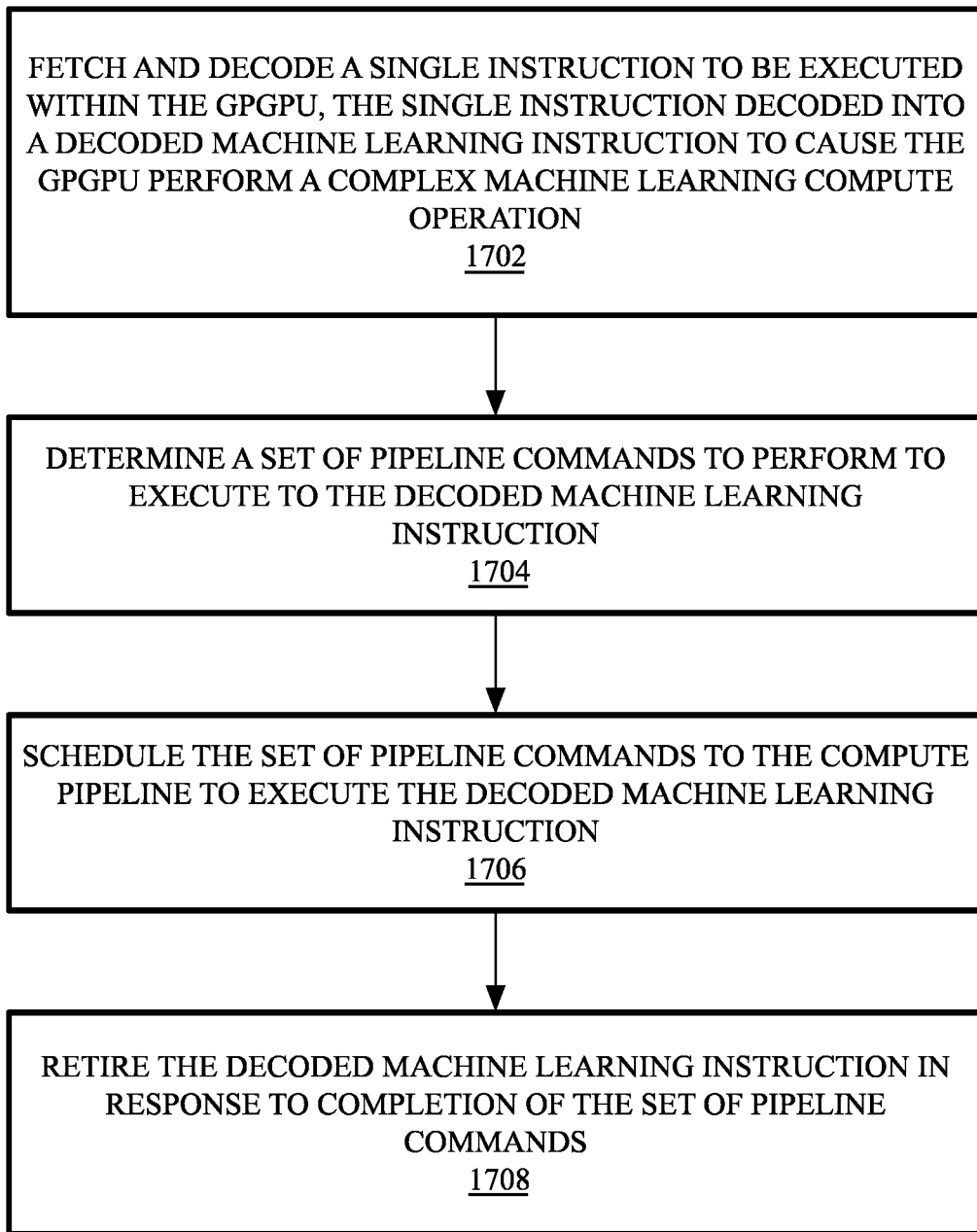
FIG. 17 is a flow diagram of logic to perform coarse grain scheduling of machine learning operations to a compute pipeline, according to an embodiment.

FIG. 17 is a flow diagram of logic 1700 to perform coarse grain scheduling of machine learning operations to a compute pipeline, according to an embodiment. In one embodiment the logic 1700 can be implemented via hardware within the machine learning instruction fetch and decode unit 1421 and the machine learning scheduler controller 1422 as in FIG. 14 and FIG. 15B. The logic 1700 can fetch and decode a machine learning compute instruction to be executed within the GPGPU, as shown at block 1702. The machine learning instruction is an instruction that specifies a set of multiple operations to be performed by a compute pipeline within a graphics processor described herein. The machine learning instruction is decoded into a decoded machine learning instruction that is associated with a set of machine learning related operations. The decoded machine learning instruction causes the GPGPU to perform a complex machine learning operation via the compute units and processing elements of the general-purpose graphics processor.

The logic 1700 can determine a set of pipeline commands to perform to execute the decoded machine learning instruction, as shown at block 1704. For example, the parameter analysis logic 1512 of FIG. 15A can determine a type or sub-type of machine learning operations to perform for the instruction, while machine learning acceleration logic 1516 can determine a precise set of operations to perform to execute the decoded machine learning instruction. For example and in one embodiment the logic 1700 can determine that the machine learning instruction is a convolution instruction for processing a CNN. The machine learning acceleration logic 1516 can then determine the required operations to perform to enable a specific convolution implementation, as well as the specific set of pipeline commands that may be used to implement such operations. For example, the set of operations can be a batch of matrix multiplication primitive operations to execute to perform a convolution operation across a set of matrices.

Based on the set of pipeline commands determined at block 1704, the logic 1700 can schedule the set of pipeline commands across a set of compute blocks to the compute pipeline of the general-purpose processing unit to enable execution of the decoded machine learning instruction, as shown at block 1706. The logic 1700 can schedule the set of pipeline commands via a scheduler unit, such as the machine learning scheduler controller 1422 of FIG. 14 and FIG. 15B.

The scheduling can include scheduling various commands or associated instructions to various compute elements within the compute pipeline. The commands can be implemented as instructions to be executed via compute elements within the compute blocks (e.g., compute blocks 1424A-1424N of FIG. 14) of the GPGPU. The commands can also be executed as instructions performed via a sparse compute accelerator unit 1423 or a hybrid memory module 1430 as in FIG. 14. Alternatively, commands or instructions performed via the compute blocks can trigger an offload of secondary instructions or command to one or more of the sparse compute accelerator unit 1423 and the hybrid memory module 1430, based on the type of operation to be performed. As shown at block 1708, the logic 1700 can then retire the decoded machine learning instruction in response to completion of the set of pipeline commands scheduled at block 1706.

Machine Learning Acceleration Using Near Data Compute

Near Data Compute is a computational paradigm that may be implemented on processing systems in which a subset of processing elements within the system are configured to have significantly higher memory bandwidth relative to other compute systems within the system. Performance for memory bound operations may be significantly improved by performing such operations on the compute elements that are 'near' the data in memory, even if the near data compute elements are less complex than other compute elements. In some embodiments, near data compute is enabled by enhancing memory controller logic with the ability to perform at least a subset of the compute operations supported by the primary compute elements within the system. In one embodiment, near data compute is enabled by augmenting memory controllers with efficient, low-power processor cores that provide a near data compute ISA. The low power processor cores can receive instructions from a scheduler unit and/or receive offload of instructions from other compute elements within the general-purpose graphics processor unit. In one embodiment the near-data compute paradigm may be particularly useful for performing or accelerating sparse matrix operations, which have low arithmetic intensity.

Figure 18:
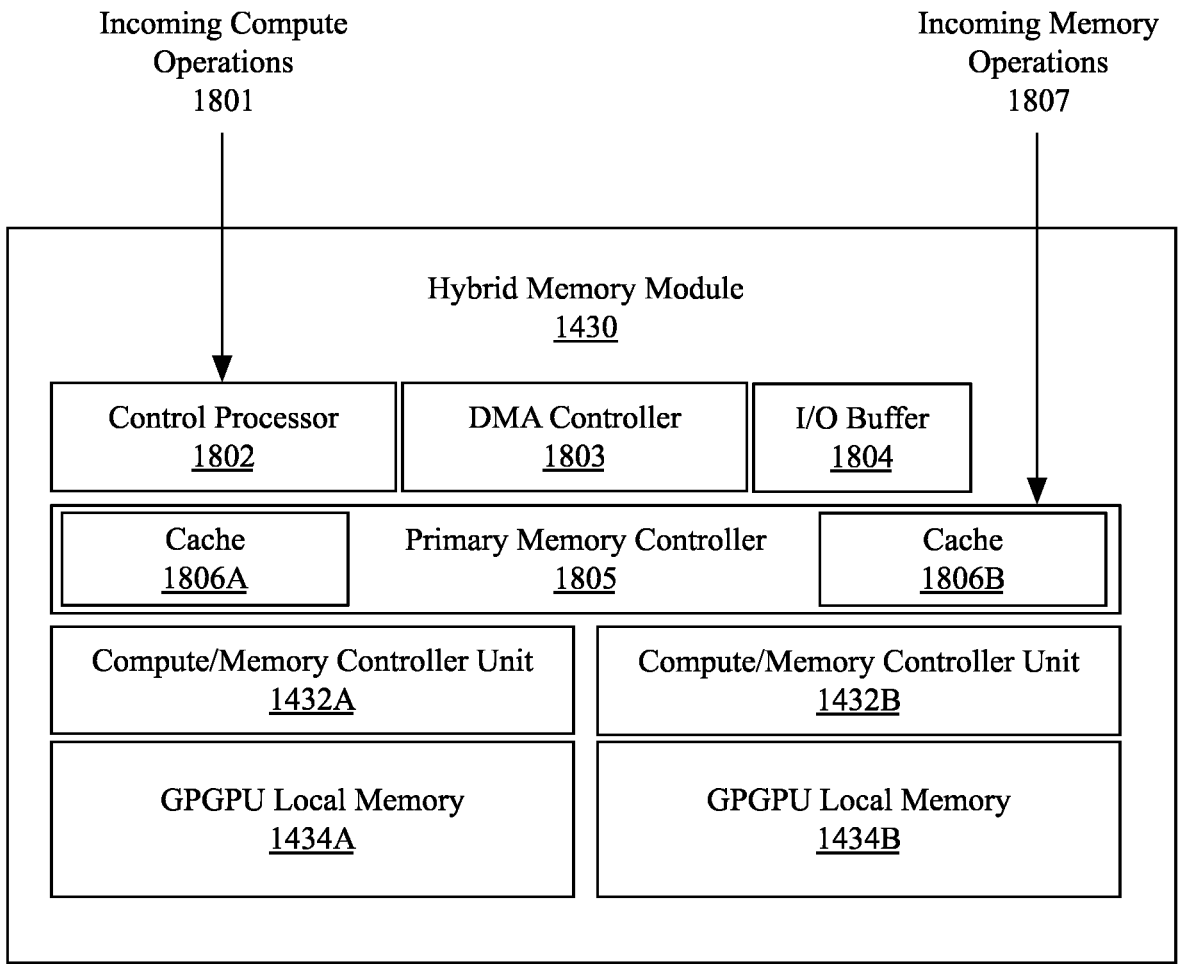
FIG. 18 is a block diagram illustrating a hybrid memory compute system, according to an embodiment.

FIG. 18 is a block diagram illustrating a hybrid memory compute system 1800, according to an embodiment. In one embodiment the hybrid memory compute system 1800 illustrates one implementation of the hybrid memory module 1430 of FIG. 14, which includes compute and memory controller units 1432A-1432B and GPGPU local memory 1432A-1432B. In the illustrated the hybrid memory compute system 1800, the hybrid memory module 1430 additionally includes a control processor 1802 and a primary memory controller 1805. The control processor 1802 and primary memory controller 1805 can work in concert with a DMA controller 1803 to enable a DMA memory transfer of data to, from, and between modules of the GPGPU local memory 1434A-1434B.

In one embodiment the control processor 1802 receives requests for incoming compute operations 1801 to be satisfied by the computational logic within one or more of the compute and memory controller units 1432A-1432B. The control processor 1802 can then dispatch the compute operations to the appropriate compute and memory controller unit 1432A-1432B based on the set of addresses to be accessed by the compute operations. Compute operations can be received in the form a near-data compute kernel. In one embodiment memory addresses to be accessed by a near-data compute kernel to be executed on the compute and memory controller units 1432A-1432B are translated from virtual addresses to a physical address before the kernel is received at the hybrid memory module 1430, as the compute and memory controller units 1432A-1432B are partitioned based on physical address, with different units associated with different address ranges. In one embodiment, where a compute operation is to be performed on a set of physical addresses that are handled by multiple memory controllers, the DMA controller 1803 can be used to transfer the data associated with the range of addresses from the different modules of the GPGPU local memory 1434A-1434B to a single module, with at least a portion of the data being stored in one or more cache memories 1806A-1806B within the primary memory controller 1805. The compute and memory controller units 1432A-1432B can then perform the required arithmetic operations to data stored in the cache memories 1806A-1806B, which may then be evicted back to the GPGPU local memory 1434A-1434B.

For memory access operations, the primary memory controller 1805 can receive incoming memory operations 1807 route the memory operations to the appropriate compute and memory controller unit 1432A-1432B based on the physical addresses to be accessed. When a request is received for a range of addresses that cross a physical address boundary dividing multiple compute and memory controller units 1432A-1432B, multiple memory requests can be dispatched and serviced in parallel. The compute and memory controller units 1432A-1432B can exchange data between associated modules of the GPGPU local memory 1434A-1434B and a set of buffers managed by the DMA controller 1803. For example and in one embodiment, for read and write operations a DMA operation can be configured by the DMA controller 1803 to transmit data from the GPGPU local memory 1434A-1434B via an I/O buffer 1804.

While separate interfaces are illustrated for incoming compute operations 1801 and incoming memory operations 1807, in one embodiment a unified memory and compute interface is provided in which memory access commands are a subset of compute operations. For example, a load or store operation can be received by the control processor 1802. The load or store command can then be executed by the primary memory controller. In such embodiments, complex memory accesses such as scatter/gather operations can be executed directly via the hybrid memory compute system 1800.

In one embodiment the hybrid memory module 1430 is implemented as a hybrid memory cube in which the GPGPU local memory 1434A-1434B is stacked on top of a logic layer that includes the compute and memory controller units 1432A-1432B, the control processor 1802, and the primary memory controller 1805. However, embodiments are not limited to hybrid memory cube implementations, as the hybrid memory module 1430 can be implemented via any memory system having one or more memory controllers capable of performing arithmetic operations.

Compute and processing elements of the general-purpose graphics processing units described herein can include various types of arithmetic logic units, including floating-point and integer logic units. A large array of such processing units can be included in in the compute blocks 1424A-1424N of a GPGPU 1420 as in FIG. 14. A smaller array of such processing units can be included in the compute and memory controller units 1432A-1432B shown, for example, in FIG. 14 and FIG. 18.

Memory bandwidth between memory and compute elements remains almost constant irrespective of memory capacity due to the pin count limitation per chip. Such bandwidth limitations can introduce a scalability problem for memory intensive workloads, such as neural network training. The scaling issue may become particularly exacerbated in when training sparse neural networks. Training sparse neural networks is not arithmetically intense, but may be severely limited by memory bandwidth without specialized hardware that is tailored for operation on sparse neural networks. The general-purpose graphics processing unit provided by embodiments described herein includes a sparse compute accelerator unit, such as the sparse compute accelerator unit 1423 of FIG. 14, which is described further in FIG. 21-22 below. Training of sparse neural networks can also be efficiently performed using near data compute resources provided by the hybrid memory module 1430.

An example of sparse conjugate gradient pseudo-code is shown in Table 5.

TABLE 5

| | Sparse conjugate gradient pseudo-code |
|---|---|
| 0 | for(. . . .){ |
| 1 | for(krow = 0; krow < 8; krow++ ){ |
| 2 | for(kcol = 0; kcol < 8; kcol++ ){ |
| 3 | a[node[krow] + node[kcol]*n] += coeff * em[krow+kcol*8]; |
| 4 | } |

TABLE 5-continued

| | Sparse conjugate gradient pseudo-code |
|---|---|
| 5 | } |
| 6 | } |

The pseudo-code illustrated in Table 5 performs a sparse conjugate gradient that is applicable to sparse matrix systems. The trip count for the two inner-most loops (iterating over "krow" and "kcol") are usually small. Accordingly, any parallelization or vectorization that may be performed would be more effective when applied to the outer-most loops. The operations performed at line 3 cause indirect load/stores (e.g., gather/scatter in vector code) and with little compute present in the inner most loop, it may be more efficient to offload the compute performed within the two inner-most loops to near-data compute processors within the memory controller. The offload of the near-data compute operations can be performed in a manner similar to offloading a compute operation from a general-purpose processor (e.g., CPU) to a GPU. However, instead of offloading the compute operations across devices, the near-data compute offload will offload compute operations to compute resources within a memory controller, as the compute resources within the memory controller will have significantly higher communication bandwidth to memory.

Table 6 below illustrates an inspector and executor kernel that can be used to enable near data compute offload.

TABLE 6

| | Inspector and Executor Kernels |
|---|---|
| 0 | for(. . . .){ |
| 1 | //inspector pins physical memory pages, packs the physical addresses |
| 2 | inspector_kernel(. . . .); //perform data copy from host to device |
| 3 | //executor is executed by the memory controller(s) — note data may have |
| 4 | //been partitioned across multiple memory controllers by the inspector kernel |
| 5 | <<< executor_kernel(. . . .)>>> //kernel invocation |
| 6 | } |

As shown in Table 6, the inspectorpints the physical memory pages and packs the physical memory addresses. The executor kernel is then invoked on the device. The operations performed by the inspector are similar to a data copy from the host to a device in the CUDA high-level parallel programming language. The executer kernel invocation can be analogized to a CUDA kernel invocation.

Table 7 illustrates an exemplary inspector kernel.

TABLE 7

| | Inspector Kernel |
|---|---|
| 0 | my_inspector_kernel(addr_a, addr_em, . . .){ |
| 1 | for(krow = 0; krow < 8; krow++ ){ |
| 2 | for(kcol = 0; kcol < 8; kcol++ ){ |
| 3 | //pin down pages and compute/pack physical addresses |
| 4 | get_pa(&a[node[krow]+node[kcol]*n], pa_addr_a, mem_ctrl_id_a); |
| 5 | addr_a[mem_ctrl_id].append(pa_addr_a); |
| 6 | get_pa(&em[krow+kcol*8], pa_addr_em, mem_ctrl_id_em); |
| 7 | //if physical addresses handled via diff memory controllers |
| 8 | //DMA and bring all data to the main memory controller |
| 9 | if(mem_ctrl_id_a == mem_ctrl_id_em){ |
| 10 | //here since mem_ctrl_a handles stores and loads the rest |
| 11 | //of loaded data is transferred to its memory region |
| 12 | pa_addr_em = dma_pa(buff[mem_ctrl_id_a], pa_addr_em); |
| 13 | } |
| 14 | addr_em[mem_ctrl_id].append(pa_addr_em); |
| 15 | } |
| 16 | } |
| 17 | } |

The inspector kernel determines the relevant physical memory addresses to be accessed by the computations shown in Table 5. Those addresses are then pinned and packed into a data structure. If the physical addresses are handled by different memory controllers, a DMA can be performed to move the data to a main memory controller, which is the memory controller that will be performing the computations.

Table 8 illustrates an exemplary executor kernel.

TABLE 8

Exemplary Executor Kernel

```
0   my_executor_kernel(my_addr_a, my_addr_em, coeff){
1     //each memory controller processes addresses in its vicinity
2     //my_addr_a is addr_a[mem_ctrl_id], etc.
3     for(i=0; i<len(my_addr_a);i++){
4       *(my_addr_a) += coeff * * (my_addr_em);
5     }
6   }
```

As shown in Table 8, the executor function of accepts two class of arguments: 1) those arguments that are computed/prepared by the inspector kernel/function (e.g., the addresses) and 2) arguments that are passed from the original kernel and are used by the inspector (e.g., coeff). The arguments that are passed from the original kernel are referred to as live-in values. The executor receives a list of arguments including live-in values (e.g., coeff) and addresses (my_addr_a, my_addr_em) to the near-memory compute function. Embodiments described herein provide support for a heterogeneous processing ISA that enables offload between processors. The executor kernel can be encapsulated within a function to enable kernel offload. An offload call provided by the heterogeneous processing ISA can be used to offload the compute to near memory compute elements from the general-purpose compute elements within the GPGPU.

Figure 19A:
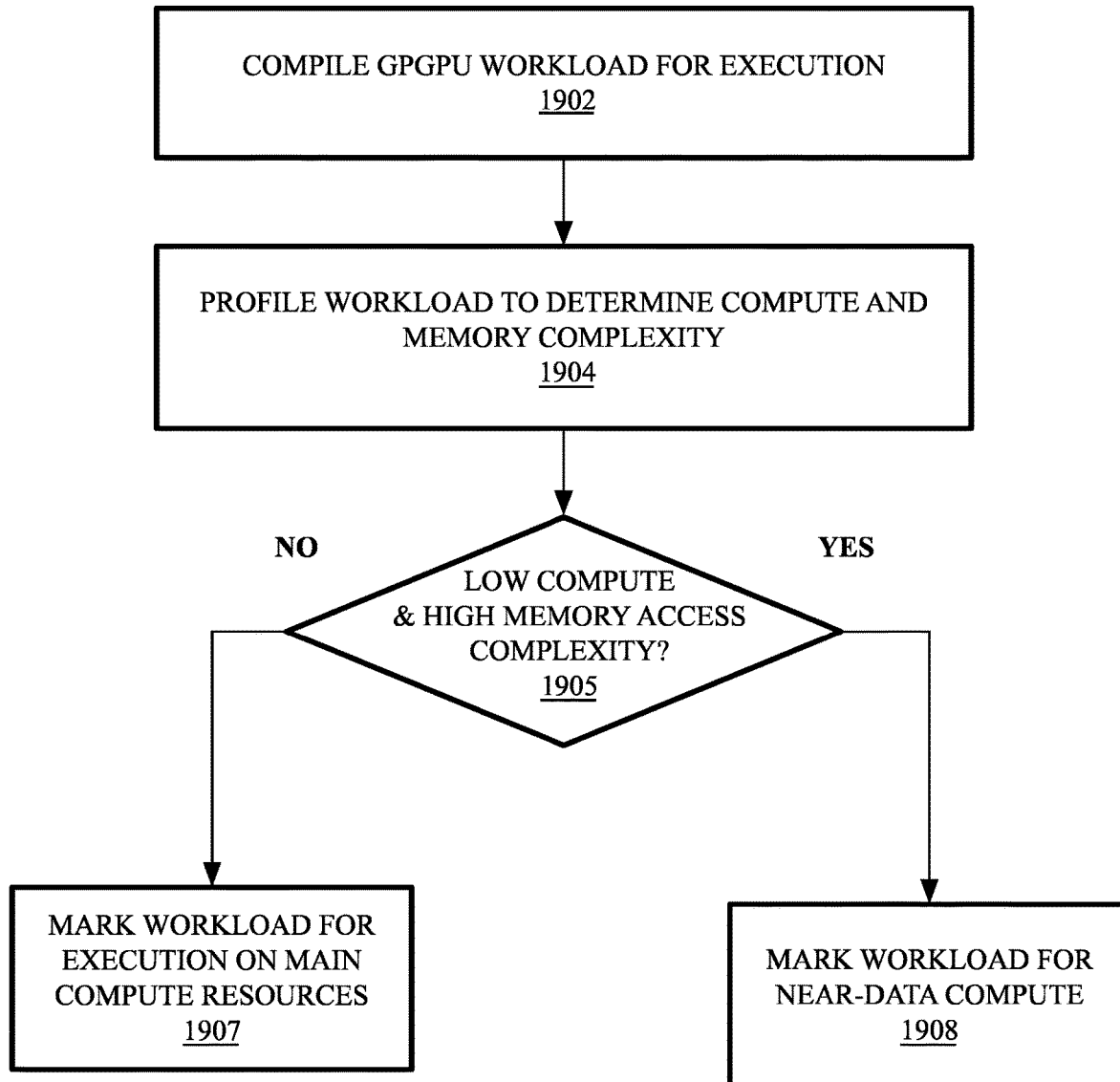
FIG. 19A-19B are flow diagrams illustrating logic to perform near-data compute operations via embodiments described herein.
Figure 19B:
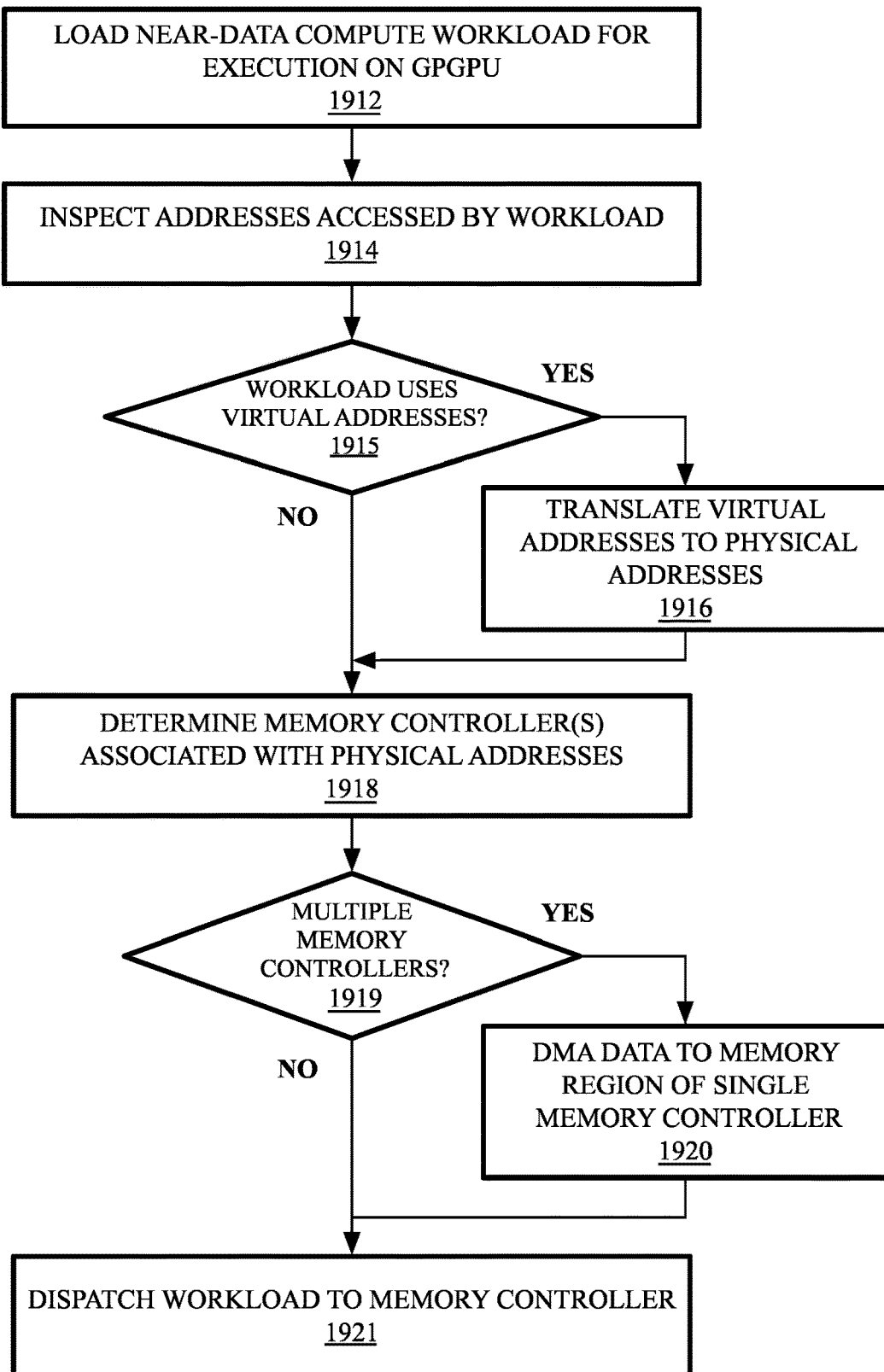

FIG. 19A-19B are flow diagrams illustrating logic to perform near-data compute operations via embodiments described herein. FIG. 19A illustrates logic 1900 to mark workloads that may be optimally performed via near-data compute logic. FIG. 19B illustrates logic 1910 to dispatch a near-data compute workload to a memory controller having compute logic. In various embodiments the illustrated logic 1900, 1910 can be provided by software or hardware units within a data processing system described herein, such as, but not limited to the data processing system 1400 as in FIG. 14.

As shown in FIG. 19A, one embodiment provides logic 1900 implemented via a data processing system including compilation logic to compile a GPGPU workload for execution, as shown at block 1902. The compilation logic can be provided by a compiler and one or more compile time and/or runtime libraries, such as the compiler 1415 and runtime library 1416 as in FIG. 14. During or after the compilation performed at block 1902, the logic 1900 can profile the workload to determine a compute and memory complexity of the workload, as shown at block 1904. Workloads that are most suitable for near-data compute are workloads that have high memory access complexity and low arithmetic or computational complexity. For example, the sparse conjugate gradient workload shown in Table 5 performs a limited number of mathematical operations (e.g., multiply, add), the memory access pattern is complex. For workloads that have low compute complexity and high memory access complexity, as determined at block 1905, the logic 1900 can mark those workloads for near-data compute, as shown at block 1908. For data with high compute complexity and/or low memory access complexity, the logic 1900 can mark the workload for execution on the main compute resources of the GPGPU.

In one embodiment marking the workload can be performed by marking hint or metadata information associated with the workload. For example and in one embodiment, the compiled data for compute kernels within the workload can have processor hints or metadata that identifies the compute kernel as a near-data compute kernel. In one embodiment near-data compute kernels can be scheduled directly to compute logic within the compute and memory controller units 1432A-1432B described herein. In one embodiment workloads are scheduled to the compute blocks 1424A-1424N described herein and may be offloaded to the near-data compute resources at runtime.

As shown in FIG. 19B, one embodiment provides logic 1910 implemented via a data processing system including workload execution logic to load a near-data compute workload for execution on the GPGPU, as shown at block 1912. In one embodiment the workload is a parallel compute kernel (e.g., executor kernel as in Table 8) for which multiple instances are executed via parallel processing logic. The logic 1910 can inspect the set of memory addresses that will be accessed by the workload at block 1914. Where the GPGPU hardware and programming model enables the use of virtual memory addresses, as determined at block 1915, the logic 1910 can translate the virtual addresses to physical addresses, as shown at block 1916. In one embodiment, for example, where the data to be accessed is sparse, the set of physical addresses to be accessed can be packed into a data structure. The logic 1910 can also determine the memory controller or memory controllers associated with the physical addresses. The memory to be accessed may span multiple memory regions that are controlled by multiple memory controllers. If the accessed memory is controlled by multiple memory controllers, as determined at block 1919, the logic 1910 can configure a DMA operation to transfer the data to a memory region that is controlled by a single memory controller, as shown at block 1920.

In various embodiments, different approaches to memory consolidation can be enabled to minimize the amount of data transfer or to minimize the latency associated with any data transfer to be performed prior to the near-memory compute. For example and in one embodiment the data is transferred to the memory region associated with the primary set of loads and stores to be performed by the workload, as shown in Table 7. When the dataset is properly positioned, the logic 1900 can dispatch the workload to a memory controller. The logic operations and memory accesses for the workloads can then be performed within the memory controller. In one embodiment, instead of consolidating data within a single memory region as shown in FIG. 19B and the pseudo code listed above, in some instances the logic operations can be divided among memory controllers. For example, certain perfectly parallel workloads can be partitioned and executed simultaneously on multiple memory controllers.

The compute logic implemented within the compute and memory controller units 1432A-1432B described herein can vary across embodiments. In one embodiment, architecturally simple and low power compute units can be incorporated into each memory controller and the ISA of the GPGPU is extended to enable scheduling or offload of a specific sub-set of operations to memory controllers for near-data compute. In one embodiment the memory controller logic can include ALUs and/or FPU logic 2000 configured to perform parallel fused multiply-add operations, as shown in FIG. 20.

Figure 20:
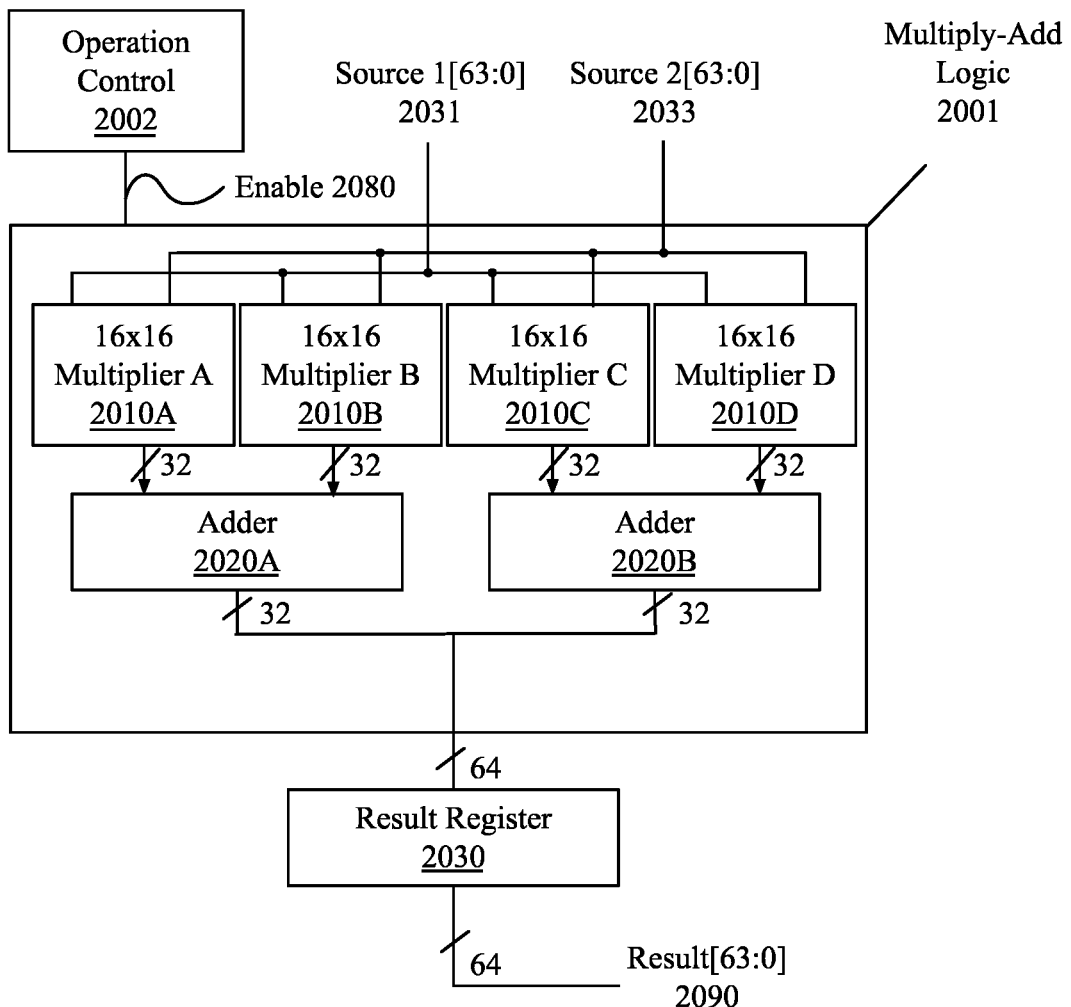
FIG. 20 illustrates exemplary multiply-add logic within embodiments described herein.

The exemplary multiply-add logic 2001 of FIG. 20 is generally described with respect to floating-point operations. However, the logic 2001 be configured to selectively perform integer and fixed point operations. The multiply-add operations can execute on multiple data elements in the same number of clock cycles as a single multiply on unpacked data. The multiply-add logic accepts multiple inputs including Source1 [63:0] 2031, Source2 [63:0] 2033, and Enable 2080. Operation control 2002 processes an input control signals for the multiply-add logic 2001 and provides the enable 2080 input to activate the multiply-add logic 2011. The multiply-add logic 2001 includes four 16×16 multiplier circuits (e.g., 16×16 multiplier A 2010A, 16×16 multiplier B 2010B, 16×16 multiplier C 2010C, 16×16 multiplier D 2010D). The 32-bit intermediate results generated by 16×16 multiplier A 2010A and 16×16 multiplier B 2010B are received by adder 2020A, while the 32-bit intermediate results generated by 16×16 multiplier C 2010C and 16×16 multiplier D 2010D are received by adder 2020B. The output of adder 2020B (i.e., bits 31 through 0 of the Result) and the output of adder 2020A (i.e., bits 63 through 32 of the Result) are combined into the 64-bit Result and communicated to Result Register 2030. In one embodiment, each of adder 2020A and adder 2020B are composed of four 8-bit adders with the appropriate propagation delays. However, alternative embodiments could implement adder 2020A-2020B in any number of ways (e.g., two 32-bit adders and/or redundant arithmetic compression circuitry).

Spare Compute Acceleration

Sparse matrix operations commonly found in many application domains, including machine learning. Accordingly, optimizations to hardware to enable more efficient processing of sparse matrix operations may be of particular use in GPGPU hardware that is optimized for machine learning operations. Sparse matrix datasets may have skewed distribution of non-zeros, where a portion of the matrix is sparse, with a reasonable number of non-zeros per column or row, while and other portions of the matrix are very sparse, with only a few non-zeros per column or row, or hyper sparse, with entire rows or columns being empty. In a hyper sparse matrix, the number of non-zeros may be less than the number of rows and columns in the matrix. A skewed distribution can arise from natural graphs that follow power law distribution, with a few popular nodes that have many edges to other nodes and many other nodes that only have few edges. In machine learning datasets, matrix columns and rows represent features and samples, respectively, with some features occurring more frequently than others, resulting in skewed non-zeros across columns.

Embodiments described herein provide a hardware accelerator architecture that can improve the processing efficiency of GPGPU hardware when processing skewed sparse matrix data. In one embodiment the hardware accelerator architecture is implemented within the sparse compute accelerator unit 1423 of FIG. 14. Elements of the sparse compute hardware accelerator architecture are illustrated in FIG. 21-22.

Figure 21:
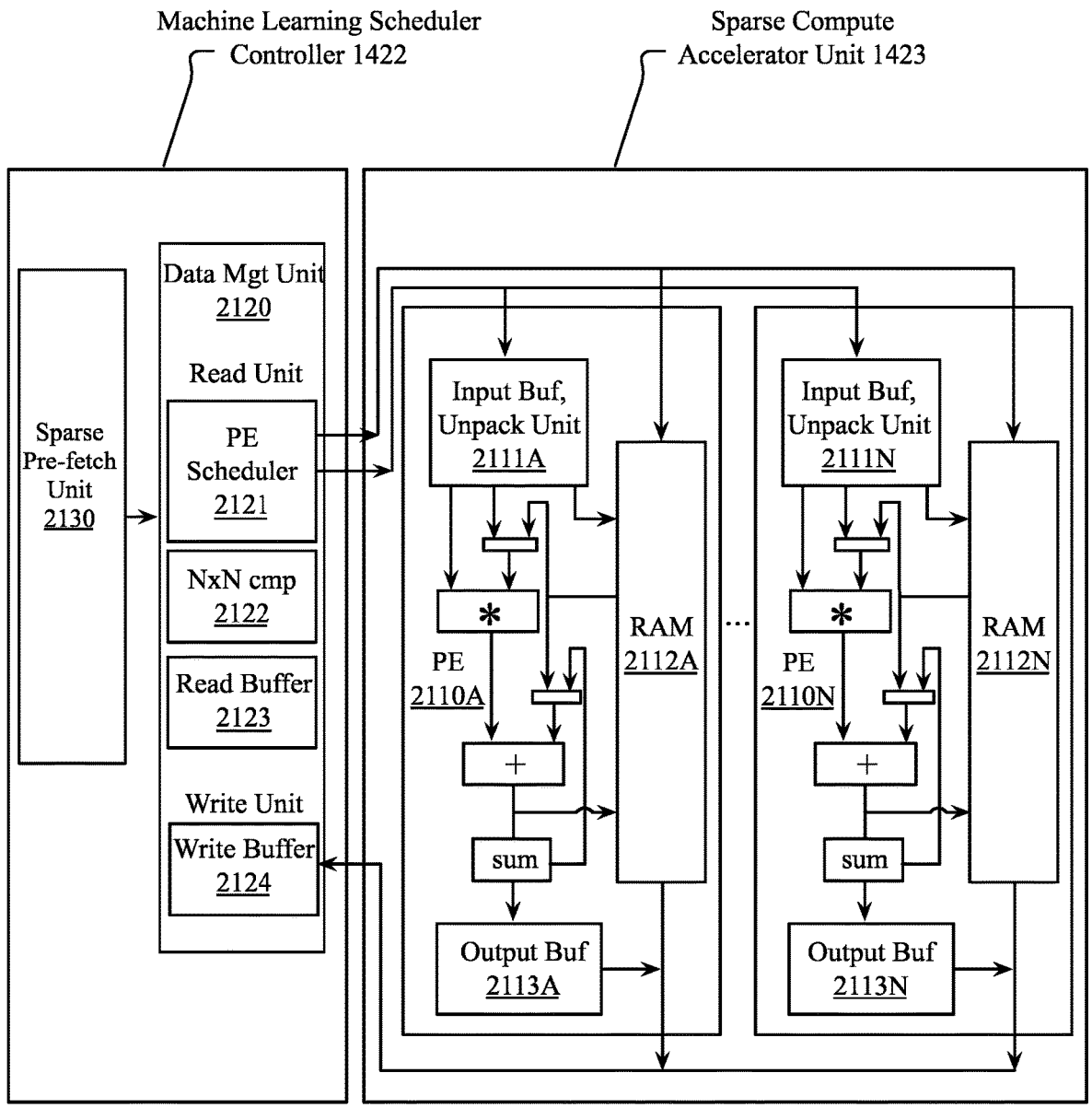
FIG. 21 illustrates a sparse compute accelerator architecture, according to one embodiment.
Figure 22:
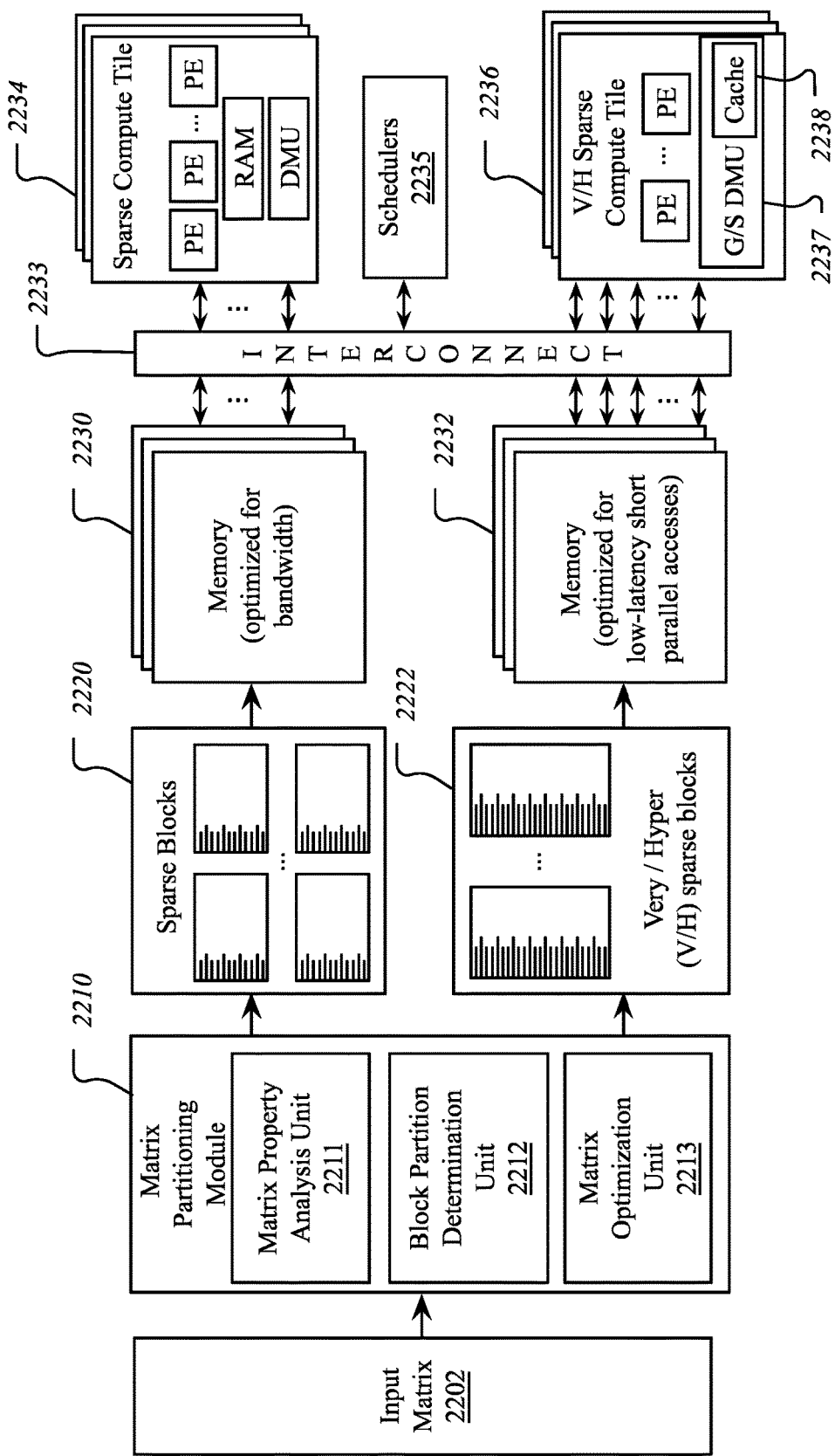
FIG. 22 illustrates an additional sparse compute architecture for sparse matrix operations, according to an embodiment.

FIG. 21 illustrates a sparse compute accelerator architecture 2100, according to one embodiment. In one embodiment the sparse compute accelerator architecture 2100 is configured to operate on an arbitrarily large set input data (e.g., matrix, vector) that resides in external (e.g., off-chip) memory, such as the GPGPU local memory 1434A-1434B as in FIG. 14. In one embodiment the sparse compute accelerator architecture 2100 can also directly operate on data stored in high-bandwidth non-volatile memory, such as 3D XPoint or Nano-RAM. The sparse compute accelerator architecture 2100 can independently communicate with memory to read input data and write back the results of the computation without requiring the use of the primary compute resources within a host GPGPU.

In one embodiment the sparse compute accelerator architecture 2100 includes the sparse compute accelerator unit 1423 and a portion of the machine learning scheduler unit 1422 of FIG. 14. The machine learning scheduler controller 1422 can include a sparse pre-fetch unit 2130 that is configured to pre-fetch addresses containing non-zero values of a sparse matrix. Pre-fetching and storing the limited number of non-zero values of the sparse matrix within cache memories and pre-fetch buffers of the sparse compute accelerator architecture 2100 may trigger page faults for any virtual memory addresses that are not resident in physical memory. Pre-triggering page faults will reduce the access latency for the pre-fetched addresses even if the data associated with those addresses is not stored in a cache memory within the sparse compute accelerator architecture 2100 when the memory address is accessed by a compute kernel executing on the architecture.

The sparse pre-fetch unit 2130, in one embodiment, couples with a data management unit 2120 within the machine learning scheduler controller 1422. In one embodiment the data management unit 2120 includes a read unit and a write unit, with the read unit including a processing element (PE) scheduler 2121, an N×N comparator 2122, and a read buffer 2123. The write unit, in one embodiment, includes a write buffer 2124, although the write unit can include other components in various embodiments depending upon the target use case of the sparse compute accelerator architecture 2100. Furthermore, while the data management unit 2120 is illustrated as a component of the machine learning scheduler controller 1422, not all embodiments are limited to such configuration, as the data management unit 2120 can be a separate module from the machine learning scheduler 1422 and/or may be integrated into the hardware logic of the sparse compute accelerator unit 1423.

The sparse compute accelerator unit 1423, in one embodiment, includes multiple processing elements (e.g., PE 2110A-2110N). In one embodiment, the processing elements 2110A-2110N can each include logic similar to the ALUs and/or FPU logic 2000 of FIG. 20, and may be configured to process vector operands for SIMD operation. In one embodiment the processing elements 2110A-2110N include input buffer and unpack units 2111A-2111N, random access memory 2112A-2112N, and an output buffer 2113A-2113N. The buffers within the processing elements 2110A-2110N can be static random access memory buffers, while the RAM 2112A-2112N may be any random access memory described herein, including static or dynamic RAM. The input buffer and unpack unit 2111A-2111N supports a dense matrix format, compressed sparse matrix formats (e.g., compressed sparse row, compressed sparse column), as well as further sparse matrix format optimizations, such as unique value compression. The processing elements 2110A-2110N can include multiply-add logic including a multiplier and an adder as described herein, where the multiply and add logic can be configured to perform fused or combined multiply-add operations. The multiply and add logic is configurable to accept input from the RAM 2112A-2112N or from external memory via the input buffer and unpack units 2111A-2111N. Output can be written to a sum register or the RAM 2112A-2112N. Data stored in the RAM 2112A-2112N or the output buffers 2113A-2113N can be output to a write buffer 2124 within the data management unit 2120.

While hardware architecture solutions exist to accelerate matrix and vector operations, such architecture solutions do not support matrix and vector operations for machine learning algorithms that operate on sparse datasets (e.g., text), such as multiplication against a sparse vector, support for both row-oriented and column-oriented matrix data formats, and scaling & update operations. The sparse compute accelerator architecture 2100 described herein supports both row-oriented and column-oriented matrix data formats, as well as other commonly used matrix and vector operations supported by existing accelerators. For example, one embodiment provides a sparse compute accelerator architecture 2100 configured to efficiently perform operations including multiply(matrix, vector) operation in both row-oriented and column-oriented formats for any combination of a sparse or dense matrix and a sparse or dense vector (e.g., sparse matrix, sparse vector; sparse matrix, dense vector; dense matrix, sparse vector; dense matrix, dense vector. The sparse compute accelerator architecture 2100 can additionally support vector dot product operations (e.g., vector, vector) including sparse vector, sparse vector, sparse vector, dense vector; and dense vector, dense vector operations. The sparse compute accelerator architecture 2100 can additionally support a ScaleAndUpdate operations having sparse matrix and dense vector operands. The sparse compute accelerator architecture 2100 is generally intended to operate on large matrix data, where performance is typically limited by the memory bandwidth available to access such data. Accordingly, the accelerator architecture has been designed to scale and take the most advantage of all available memory bandwidth. In one embodiment, available memory bandwidth is maximized by implementing the sparse compute accelerator architecture 2100 as a near-data compute architecture, such as in the hybrid memory compute system 1800 of FIG. 18.

A key challenge presented to development of a sparse matrix vector accelerator is the development of logic to reduce the latency associated with random and/or irregular accesses to a dense vector. The random and/or irregular accesses can lead to performance issues when the dense vector is in memory. For example, the access may require a gather or a scatter operation to be performed to read or write the irregularly patterned data to and from memory. To address such issue, the accelerator described herein is configured to operate on matrix data that is packed and consolidated, such that that the dense vector corresponding to each matrix block fits in the PE RAM. During operation, the sparse compute accelerator unit 1423 can stream non-zero matrix data into the processing elements for processing against vector data stored in the internal RAM 2112A-2112N of each processing element 2110A-2110N. Random accesses to the stored vector data is performed on the local RAM 2112A-2112N inside the processing elements 2110A-2110N, avoiding irregular accesses to memory during compute workload execution.

FIG. 22 illustrates an additional sparse compute architecture 2200 for sparse matrix operations, according to an embodiment. One embodiment provides a heterogeneous architecture that enables efficient processing of skewed matrices that contain sparse matrix blocks as well as very sparse and/or hyper sparse matrix blocks. Input matrix data 2202 stored in memory is read by a matrix partitioning module 2210, which outputs a set of sparse blocks 2220 and, if present, a set of very sparse or hyper sparse blocks 2222. Sparse blocks 2220 are stored in memory 2230 that is optimized for raw bandwidth, while very sparse or hyper sparse blocks 2222 are stored in memory 2232 that is optimized to enable low latency for short bursts of parallel accesses. The various types of memory 2230, 2232, couple via an interconnect 2233 to compute resources of the sparse compute architecture 2200.

In some embodiments the computing resources of the sparse compute architecture 2200 include a sparse compute tile 2234 and a very/hyper sparse compute tile 2236. A set of schedulers 2235 are configured to schedule tasks for execution on the sparse compute tiles 2234 and very or hyper sparse compute tiles 2236. The sparse compute tile 2234 can include elements illustrated in the sparse compute accelerator unit 1423 of FIG. 14 and FIG. 21, excepting that in one embodiment the data management unit (DMU) is integrated within the sparse compute tile 2234 instead of the machine learning scheduler controller 1422. Non-zero data in the sparse blocks 2220 stored in memory 2230 can be streamed into the on-chip RAM of the sparse compute tile 2234. The techniques that enable the sparse compute tile 2234 to efficiently process sparse data are less effective on very sparse and hyper sparse matrices. A very/hyper sparse matrix has very few non-zeros. Accordingly, processing such matrices incurs relatively higher blocking overhead (e.g., row or column pointers). The higher blocking overhead means that more compute time and memory bandwidth consumed processing bookkeeping data relative to the processing of the actual non-zero matrix elements. Additionally, very/hyper sparse matrices have very few non-zeros per column or row and accessing the columns and rows involve smaller and shorter memory accesses. Furthermore, a smaller amount of the accessed data is reused during processing. The very/hyper sparse compute tile 2236 overcomes these inefficiencies by via adjustments to the architecture of the sparse compute tile 2234.

To increase the efficiency of the very/hyper sparse compute tile 2236, the matrix partitioning module 2210 generates larger blocks of the sparse matrix. The larger blocks result in a reduced blocking overhead relative to the non-zero data to be processed. The larger matrix block has a larger associated vector subset that will be processed against the very/hyper sparse blocks 2222. Instead of storing the vector subset in on-chip RAM, as in the sparse compute tile 2234, the vector subset is stored in the parallel optimized memory 2232. The very/hyper sparse compute tile 2236 uses a data management unit optimized for gather/scatter operations (e.g., G/S DMU 2237). In one embodiment the G/S DMU 2237 includes a cache 2238 to capture the modest data re-use available for the vector subset data. In some embodiments the very/hyper sparse compute tile 2236 may also include fewer processing elements relative to the sparse compute tile 2234. In some embodiments, either or both the sparse compute tile 2234 and/or very/hyper sparse compute tile 2236 can be integrated into the compute or memory controller units 1432A-1432B of the hybrid memory module 1430 described herein to optimize the sparse compute capability of the near-data compute modules.

In one embodiment the matrix partitioning module 2210 includes a matrix property analysis unit 2211, a block partition determination unit 2212, and a matrix optimization unit 2213. The matrix property analysis unit 2211 is configured to analyze various properties of the matrix, such as the number of non-zeros per columns or rows. Metrics determined by the matrix property analysis unit 2211 is provided to the block partition determination unit, which determines the proper technique to use to partition the matrix into blocks. The block partition determination unit then determines matrix block boundaries, such that parts of the matrix with similar properties are placed within the same block. The matrix optimization unit 2213 then applies various optimizations to improve the processing efficiency of compute units when processing the blocks. For example and in one embodiment the matrix optimization unit 2213 can optimize the matrix format for each block, such that hyper sparse block uses a doubly compressed format, while a skinny tall matrix block uses a row-oriented format to avoid memory scatter. The matrix optimization unit 2213 can also optimize the scheduling of the blocks for processing by the schedulers 2235 by producing scheduling hints for use when scheduling workloads to the processing elements.

Figure 23A:
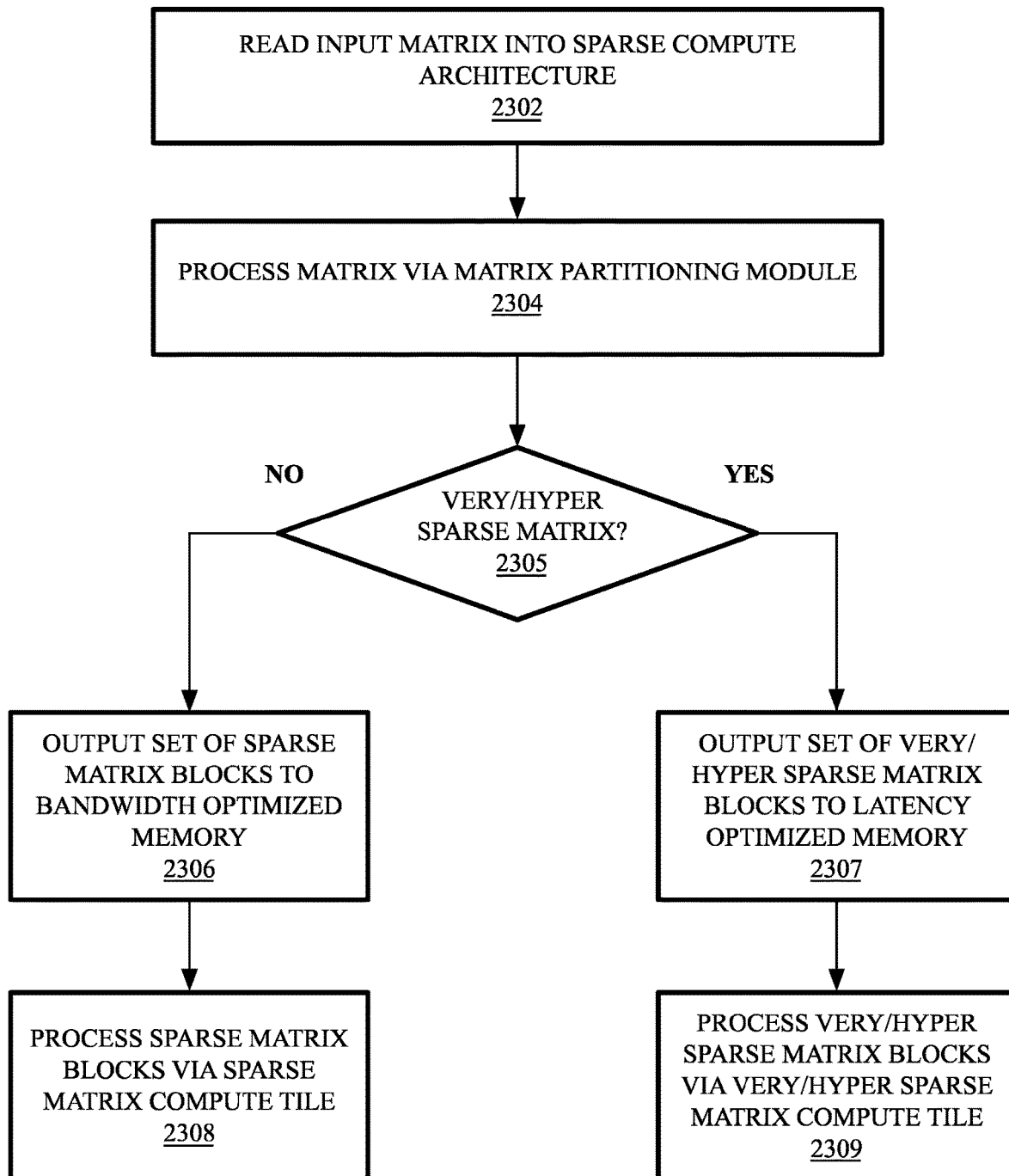
FIG. 23A-23B are flow diagrams illustrating logic to perform sparse compute operations within a GPGPU provided by embodiments described herein.
Figure 23B:
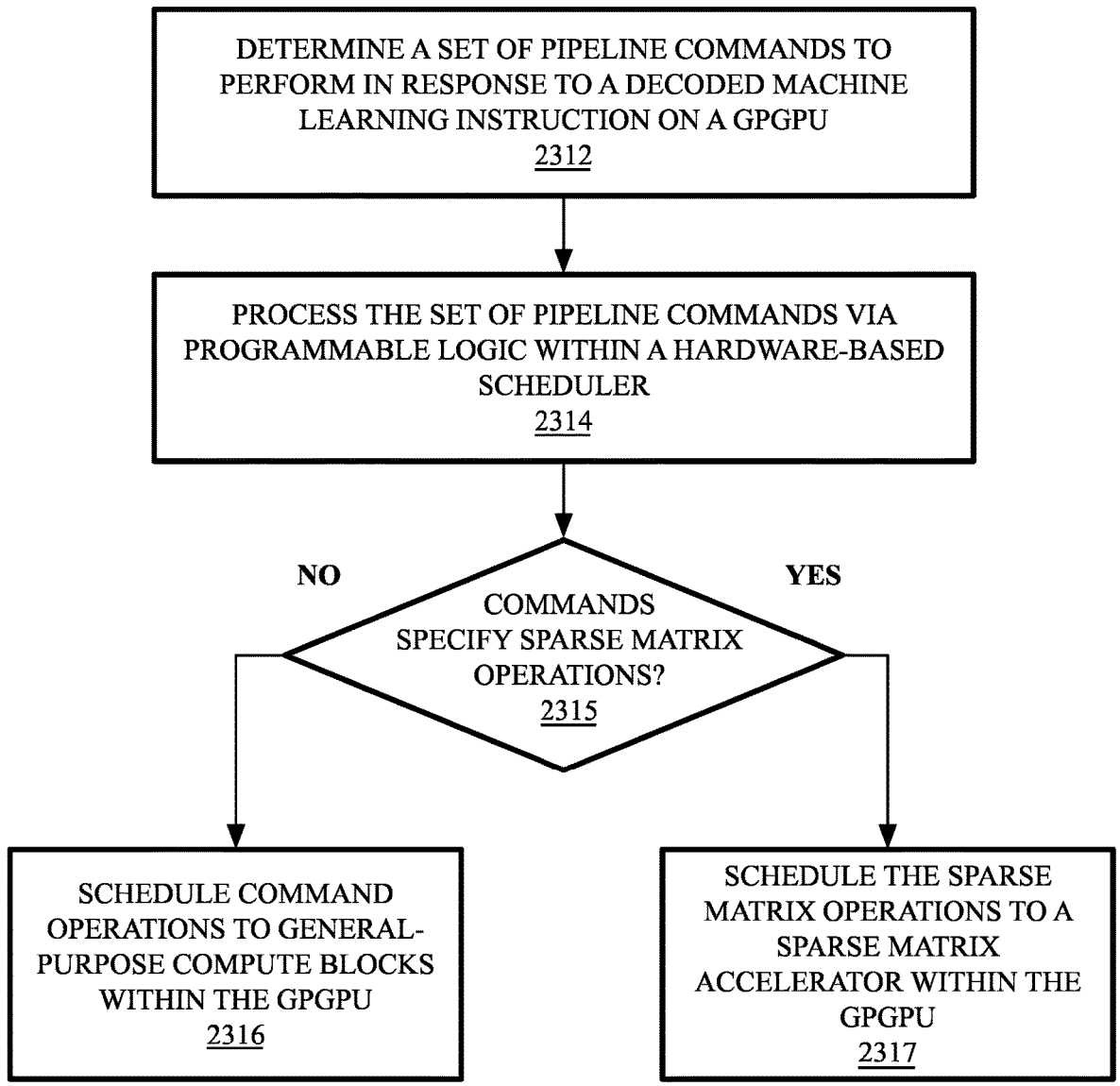

FIG. 23A-23B are flow diagrams illustrating logic 2300, 2310 to perform sparse compute operations within a GPGPU provided by embodiments described herein. Logic 2300 can be implemented by a sparse compute accelerator unit 1423 as in FIG. 14 and FIG. 21. In one embodiment the sparse compute accelerator unit 1423 includes aspects of the sparse compute architecture 2200 of FIG. 22. Logic 2310 can be implemented via hardware within the machine learning instruction fetch and decode unit 1421 and the machine learning scheduler controller 1422 as in FIG. 14 and FIG. 15B. In one embodiment at least a portion of logic 2310 can be implemented within compute elements of a hybrid memory module, such as the hybrid memory module 1430 of FIG. 14 and/or FIG. 18.

As shown in FIG. 23A, logic 2300 causes hardware within the GPGPU to read an input matrix into a sparse compute architecture, as shown at block 2302. The logic 2300 can then process the matrix via a partitioning module, as shown at block 2304. The partitioning module can be an instance of the matrix partitioning module 2210 of FIG. 22, and can perform operations including matrix analysis, partition determination, and matrix optimization. Processing the matrix at block 2304 provides the logic 2300 with information to determine if the matrix is a very sparse or hyper sparse matrix at block 2305, where a very sparse has few non-zero data values per column or row and a hyper sparse matrix has entire rows or columns of zero data values. As shown at block 2306, where the input matrix is only sparse and not very or hyper sparse, logic 2300 can output a set of sparse matrix blocks to bandwidth optimized memory, such as memory 2230 of FIG. 22. As shown at block 2308, logic 2300 can then process the sparse matrix block via a sparse matrix compute tile, such as the sparse compute tile 2234 of FIG. 22. As shown at block 2307, where the input matrix is very sparse or hyper sparse, the logic 2300 can output a set of very sparse of hyper sparse matrix blocks to latency optimized memory, such as the memory 2232 of FIG. 22. As shown at block 2309, logic 2300 can then process the very sparse or hyper matrix block via a very/hyper sparse matrix compute tile, such as the very/hyper sparse compute tile 2236 of FIG. 22

As shown in FIG. 23B, logic 2310 enables a sparse compute architecture described herein to be integrated into a machine-learning optimized microarchitecture within a GPGPU. The logic 2310 can determine a set of pipeline commands to perform in response to a decoded machine learning instruction on a GPGPU, as shown at block 2312. The decoded machine learning instruction can be the decoded machine learning instruction of block 1702 in FIG. 17. As shown at block 2314, in one embodiment the logic 2310 can process the set of pipeline commands via programmable logic within a hardware-based scheduler, such as the machine learning scheduler controller 1422 described herein. The logic 2310 can then determine, at block 2315, whether the pipeline commands specify any sparse matrix operations. If sparse matrix operations are to be performed, the logic 2310 can schedule the sparse matrix operations to a sparse matrix accelerator within the GPGPU, as shown at block 2317, where the sparse matrix accelerator is a sparse compute accelerator such as the sparse compute accelerator unit 1423 as in FIG. 14 and FIG. 21 or the sparse compute tile 2234 and/or very/hyper sparse compute tile 2236 of FIG. 22. If sparse operations are not specified the logic 2310 can schedule command operations to general-purpose compute blocks within the GPGPU, as shown at block 2316. In some embodiments, sparse matrix and a subset of the general-purpose operations can also be performed via near-data compute elements, where the compute operations are memory bandwidth sensitive.

Additional Exemplary Graphics Processing System

Details of the embodiments described above can be incorporated within graphics processing systems and devices described below. The graphics processing system and devices of FIG. 24 through FIG. 37 illustrate alternative systems and graphics processing hardware that can implement any and all of the techniques described above.

Additional Exemplary Graphics Processing System Overview

Figure 24:
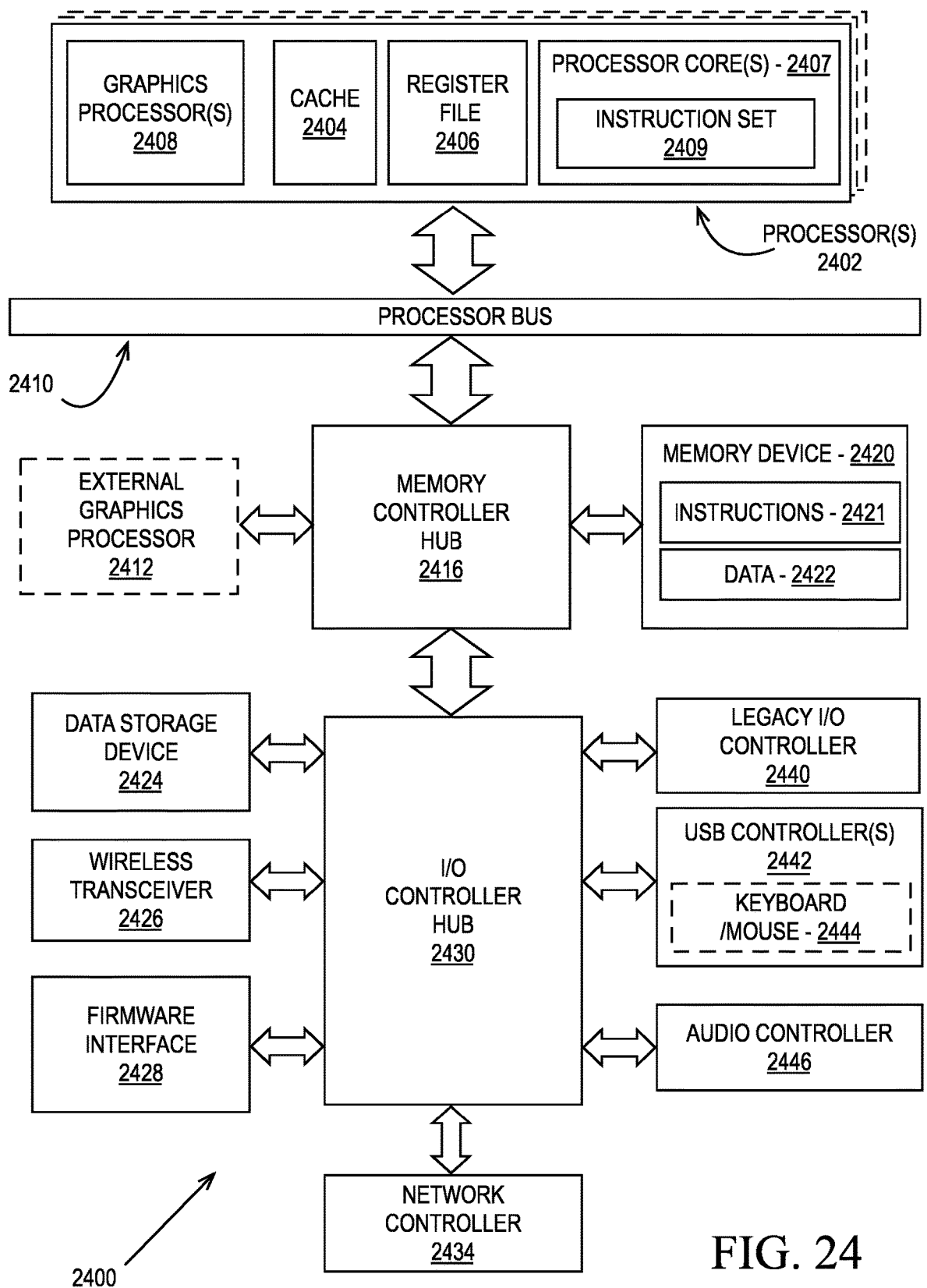
FIG. 24 is a block diagram of a processing system, according to an embodiment.

FIG. 24 is a block diagram of a processing system 2400, according to an embodiment. In various embodiments the system 2400 includes one or more processors 2402 and one or more graphics processors 2408, and may be a single processor desktop system, a multiprocessor workstation system, or a server system having a large number of processors 2402 or processor cores 2407. In one embodiment, the system 2400 is a processing platform incorporated within a system-on-a-chip (SoC) integrated circuit for use in mobile, handheld, or embedded devices.

An embodiment of system 2400 can include or be incorporated within a server-based gaming platform, a game console, including a game and media console, a mobile gaming console, a handheld game console, or an online game console. In some embodiments system 2400 is a mobile phone, smart phone, tablet computing device or mobile Internet device. Data processing system 2400 can also include, couple with, or be integrated within a wearable device, such as a smart watch wearable device, smart eyewear device, augmented reality device, or virtual reality device. In some embodiments, data processing system 2400 is a television or set top box device having one or more processors 2402 and a graphical interface generated by one or more graphics processors 2408.

In some embodiments, the one or more processors 2402 each include one or more processor cores 2407 to process instructions which, when executed, perform operations for system and user software. In some embodiments, each of the one or more processor cores 2407 is configured to process a specific instruction set 2409. In some embodiments, instruction set 2409 may facilitate Complex Instruction Set Computing (CISC), Reduced Instruction Set Computing (RISC), or computing via a Very Long Instruction Word (VLIW). Multiple processor cores 2407 may each process a different instruction set 2409, which may include instructions to facilitate the emulation of other instruction sets. Processor core 2407 may also include other processing devices, such a Digital Signal Processor (DSP).

In some embodiments, the processor 2402 includes cache memory 2404. Depending on the architecture, the processor 2402 can have a single internal cache or multiple levels of internal cache. In some embodiments, the cache memory is shared among various components of the processor 2402. In some embodiments, the processor 2402 also uses an external cache (e.g., a Level-3 (L3) cache or Last Level Cache (LLC)) (not shown), which may be shared among processor cores 2407 using known cache coherency techniques. A register file 2406 is additionally included in processor 2402 which may include different types of registers for storing different types of data (e.g., integer registers, floating-point registers, status registers, and an instruction pointer register). Some registers may be general-purpose registers, while other registers may be specific to the design of the processor 2402.

In some embodiments, processor 2402 is coupled with a processor bus 2410 to transmit communication signals such as address, data, or control signals between processor 2402 and other components in system 2400. In one embodiment the system 2400 uses an exemplary 'hub' system architecture, including a memory controller hub 2416 and an Input Output (I/O) controller hub 2430. A memory controller hub 2416 facilitates communication between a memory device and other components of system 2400, while an I/O Controller Hub (ICH) 2430 provides connections to I/O devices via a local I/O bus. In one embodiment, the logic of the memory controller hub 2416 is integrated within the processor.

Memory device 2420 can be a dynamic random-access memory (DRAM) device, a static random-access memory (SRAM) device, flash memory device, phase-change memory device, or some other memory device having suitable performance to serve as process memory. In one embodiment the memory device 2420 can operate as system memory for the system 2400, to store data 2422 and instructions 2421 for use when the one or more processors 2402 executes an application or process. Memory controller hub 2416 also couples with an optional external graphics processor 2412, which may communicate with the one or more graphics processors 2408 in processors 2402 to perform graphics and media operations.

In some embodiments, ICH 2430 enables peripherals to connect to memory device 2420 and processor 2402 via a high-speed I/O bus. The I/O peripherals include, but are not limited to, an audio controller 2446, a firmware interface 2428, a wireless transceiver 2426 (e.g., Wi-Fi, Bluetooth), a data storage device 2424 (e.g., hard disk drive, flash memory, etc.), and a legacy I/O controller 2440 for coupling legacy (e.g., Personal System 2 (PS/2)) devices to the system. One or more Universal Serial Bus (USB) controllers 2442 connect input devices, such as keyboard and mouse 2444 combinations. A network controller 2434 may also couple with ICH 2430. In some embodiments, a high-performance network controller (not shown) couples with processor bus 2410. It will be appreciated that the system 2400 shown is exemplary and not limiting, as other types of data processing systems that are differently configured may also be used. For example, the I/O controller hub 2430 may be integrated within the one or more processor 2402, or the memory controller hub 2416 and I/O controller hub 2430 may be integrated into a discreet external graphics processor, such as the external graphics processor 2412.

Figure 25:
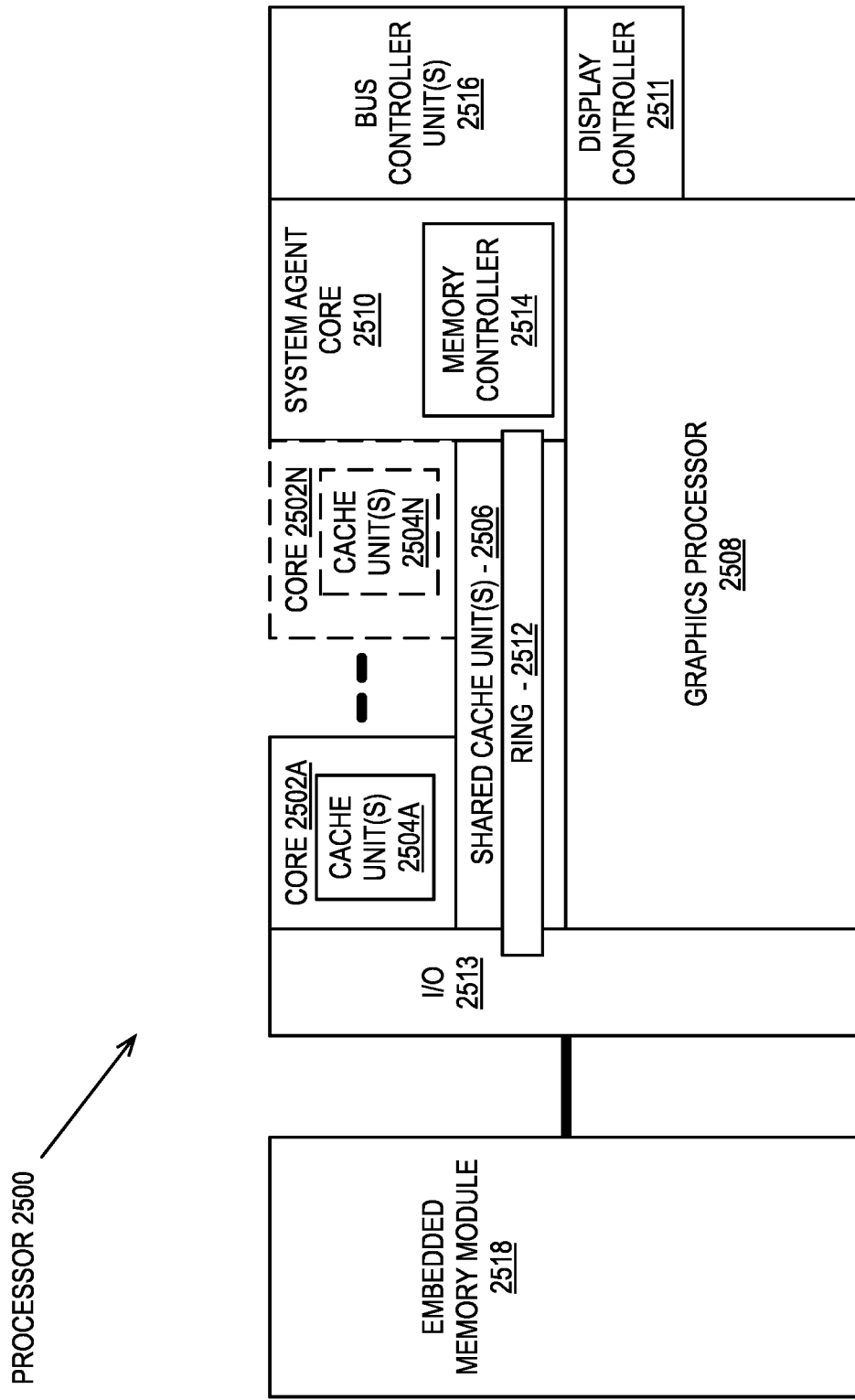
FIG. 25 is a block diagram of a processor according to an embodiment.

FIG. 25 is a block diagram of an embodiment of a processor 2500 having one or more processor cores 2502A-2502N, an integrated memory controller 2514, and an integrated graphics processor 2508. Those elements of FIG. 25 having the same reference numbers (or names) as the elements of any other figure herein can operate or function in any manner similar to that described elsewhere herein, but are not limited to such. Processor 2500 can include additional cores up to and including additional core 2502N represented by the dashed lined boxes. Each of processor cores 2502A-2502N includes one or more internal cache units 2504A-2504N. In some embodiments each processor core also has access to one or more shared cached units 2506.

The internal cache units 2504A-2504N and shared cache units 2506 represent a cache memory hierarchy within the processor 2500. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 2506 and 2504A-2504N.

In some embodiments, processor 2500 may also include a set of one or more bus controller units 2516 and a system agent core 2510. The one or more bus controller units 2516 manage a set of peripheral buses, such as one or more Peripheral Component Interconnect buses (e.g., PCI, PCI Express). System agent core 2510 provides management functionality for the various processor components. In some embodiments, system agent core 2510 includes one or more integrated memory controllers 2514 to manage access to various external memory devices (not shown).

In some embodiments, one or more of the processor cores 2502A-2502N include support for simultaneous multi-threading. In such embodiment, the system agent core 2510 includes components for coordinating and operating cores 2502A-2502N during multi-threaded processing. System agent core 2510 may additionally include a power control unit (PCU), which includes logic and components to regulate the power state of processor cores 2502A-2502N and graphics processor 2508.

In some embodiments, processor 2500 additionally includes graphics processor 2508 to execute graphics processing operations. In some embodiments, the graphics processor 2508 couples with the set of shared cache units 2506, and the system agent core 2510, including the one or more integrated memory controllers 2514. In some embodiments, a display controller 2511 is coupled with the graphics processor 2508 to drive graphics processor output to one or more coupled displays. In some embodiments, display controller 2511 may be a separate module coupled with the graphics processor via at least one interconnect or may be integrated within the graphics processor 2508 or system agent core 2510.

In some embodiments, a ring-based interconnect 2512 is used to couple the internal components of the processor 2500. However, an alternative interconnect unit may be used, such as a point-to-point interconnect, a switched interconnect, or other techniques, including techniques well known in the art. In some embodiments, graphics processor 2508 couples with the ring-based interconnect 2512 via an I/O link 2513.

The exemplary I/O link 2513 represents at least one of multiple varieties of I/O interconnects, including an on package I/O interconnect which facilitates communication between various processor components and a high-performance embedded memory module 2518, such as an eDRAM module. In some embodiments, each of the processor cores 2502A-2502N and graphics processor 2508 use embedded memory modules 2518 as a shared Last Level Cache.

In some embodiments, processor cores 2502A-2502N are homogenous cores executing the same instruction set architecture. In another embodiment, processor cores 2502A-

2502N are heterogeneous in terms of instruction set architecture (ISA), where one or more of processor cores 2502A-2502N execute a first instruction set, while at least one of the other cores executes a subset of the first instruction set or a different instruction set. In one embodiment processor cores 2502A-2502N are heterogeneous in terms of microarchitecture, where one or more cores having a relatively higher power consumption couple with one or more power cores having a lower power consumption. Additionally, processor 2500 can be implemented on one or more chips or as an SoC integrated circuit having the illustrated components, in addition to other components.

Figure 26:
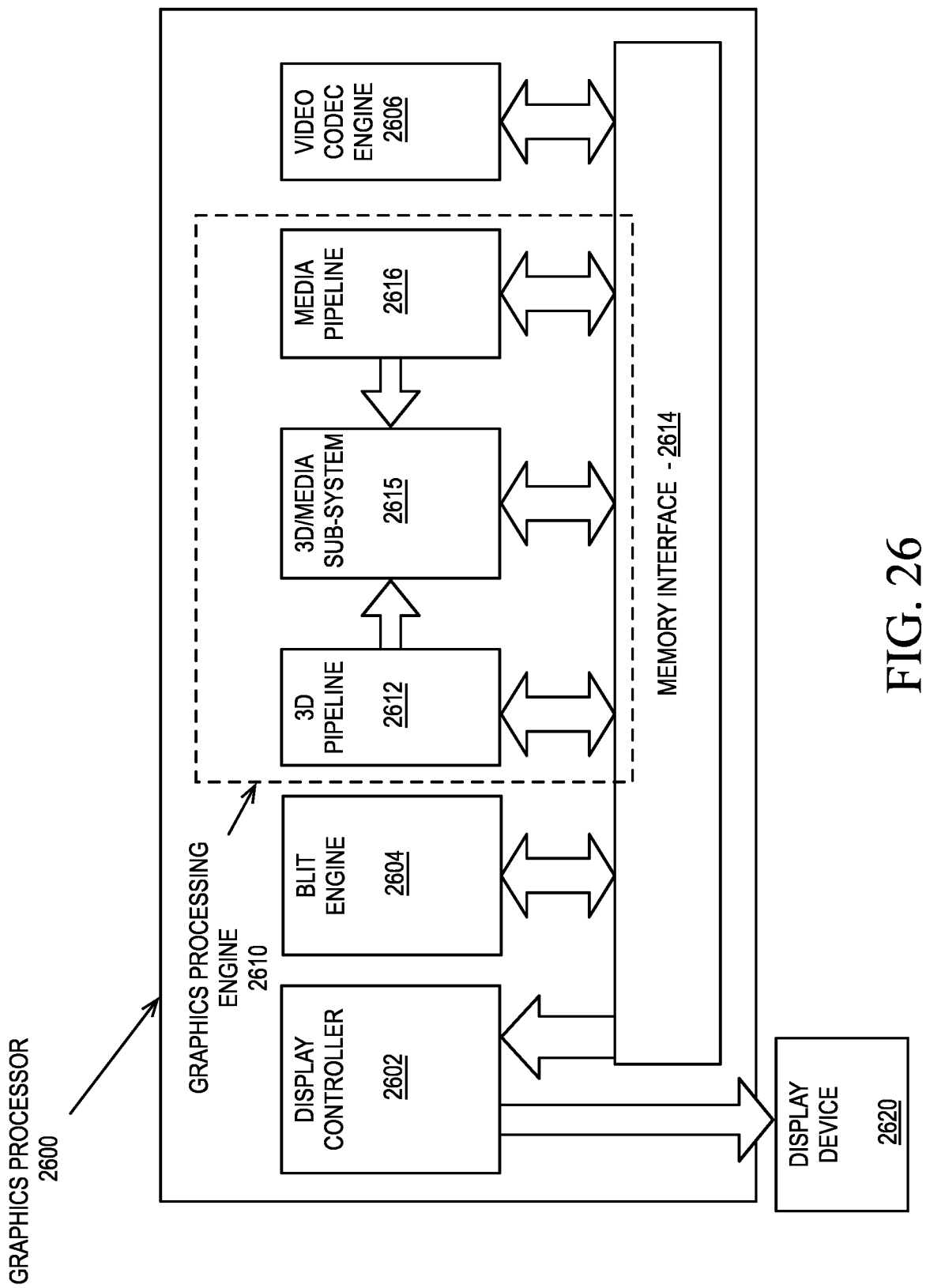
FIG. 26 is a block diagram of a graphics processor, according to an embodiment.

FIG. 26 is a block diagram of a graphics processor 2600, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 2600 includes a memory interface 2614 to access memory. Memory interface 2614 can be an interface to local memory, one or more internal caches, one or more shared external caches, and/or to system memory.

In some embodiments, graphics processor 2600 also includes a display controller 2602 to drive display output data to a display device 2620. Display controller 2602 includes hardware for one or more overlay planes for the display and composition of multiple layers of video or user interface elements. In some embodiments, graphics processor 2600 includes a video codec engine 2606 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 2600 includes a block image transfer (BLIT) engine 2604 to perform two-dimensional (2D) rasterizer operations including, for example, bit-boundary block transfers. However, in one embodiment, 2D graphics operations are performed using one or more components of graphics processing engine (GPE) 2610. In some embodiments, GPE 2610 is a compute engine for performing graphics operations, including three-dimensional (3D) graphics operations and media operations.

In some embodiments, GPE 310 includes a 3D pipeline 2612 for performing 3D operations, such as rendering three-dimensional images and scenes using processing functions that act upon 3D primitive shapes (e.g., rectangle, triangle, etc.). The 3D pipeline 2612 includes programmable and fixed function elements that perform various tasks within the element and/or spawn execution threads to a 3D/Media sub-system 2615. While 3D pipeline 2612 can be used to perform media operations, an embodiment of GPE 2610 also includes a media pipeline 2616 that is specifically used to perform media operations, such as video post-processing and image enhancement.

In some embodiments, media pipeline 2616 includes fixed function or programmable logic units to perform one or more specialized media operations, such as video decode acceleration, video de-interlacing, and video encode acceleration in place of, or on behalf of video codec engine 2606. In some embodiments, media pipeline 2616 additionally includes a thread spawning unit to spawn threads for execution on 3D/Media sub-system 2615. The spawned threads perform computations for the media operations on one or more graphics execution units included in 3D/Media subsystem 2615.

In some embodiments, 3D/Media subsystem 2615 includes logic for executing threads spawned by 3D pipeline 2612 and media pipeline 2616. In one embodiment, the pipelines send thread execution requests to 3D/Media subsystem 2615, which includes thread dispatch logic for arbitrating and dispatching the various requests to available thread execution resources. The execution resources include an array of graphics execution units to process the 3D and media threads. In some embodiments, 3D/Media subsystem 2615 includes one or more internal caches for thread instructions and data. In some embodiments, the subsystem also includes shared memory, including registers and addressable memory, to share data between threads and to store output data.

Additional Exemplary Graphics Processing Engine

Figure 27:
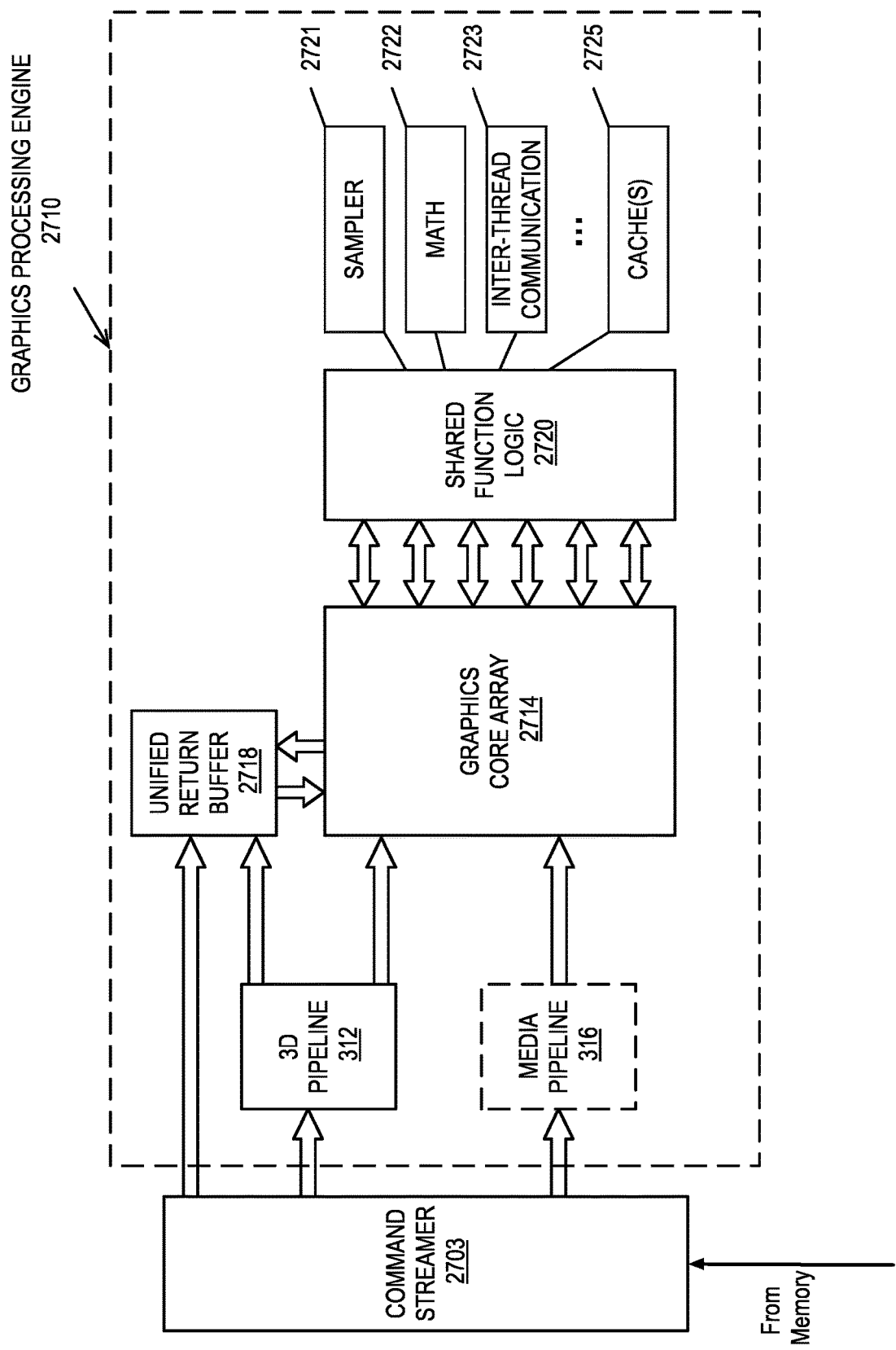
FIG. 27 is a block diagram of a graphics processing engine of a graphics processor in accordance with some embodiments.

FIG. 27 is a block diagram of a graphics processing engine 2710 of a graphics processor in accordance with some embodiments. In one embodiment, the graphics processing engine (GPE) 2710 is a version of the GPE 2610 shown in FIG. 26. Elements of FIG. 27 having the same reference numbers (or names) as the elements of any other figure herein can operate or function in any manner similar to that described elsewhere herein, but are not limited to such. For example, the 3D pipeline 2612 and media pipeline 2616 of FIG. 26 are illustrated. The media pipeline 2616 is optional in some embodiments of the GPE 2710 and may not be explicitly included within the GPE 2710. For example, in at least one embodiment a separate media and/or image processor is coupled to the GPE 2710.

In some embodiments, GPE 2710 couples with or includes a command streamer 2703, which provides a command stream to the 3D pipeline 2612 and/or media pipelines 2616. In some embodiments, command streamer 2703 is coupled with memory, which can be system memory, or one or more of internal cache memory and shared cache memory. In some embodiments, command streamer 2703 receives commands from the memory and sends the commands to 3D pipeline 2612 and/or media pipeline 2616. The commands are directives fetched from a ring buffer, which stores commands for the 3D pipeline 2612 and media pipeline 2616. In one embodiment, the ring buffer can additionally include batch command buffers storing batches of multiple commands. The commands for the 3D pipeline 2612 can also include references to data stored in memory, such as but not limited to vertex and geometry data for the 3D pipeline 2612 and/or image data and memory objects for the media pipeline 2616. The 3D pipeline 2612 and media pipeline 2616 process the commands and data by performing operations via logic within the respective pipelines or by dispatching one or more execution threads to a graphics core array 2714.

In various embodiments the 3D pipeline 2612 can execute one or more shader programs, such as vertex shaders, geometry shaders, pixel shaders, fragment shaders, compute shaders, or other shader programs, by processing the instructions and dispatching execution threads to the graphics core array 2714. The graphics core array 2714 provides a unified block of execution resources. Multi-purpose execution logic (e.g., execution units) within the graphics core array 2714 includes support for various 3D API shader languages and can execute multiple simultaneous execution threads associated with multiple shaders.

In some embodiments the graphics core array 2714 also includes execution logic to perform media functions, such as video and/or image processing. In one embodiment, the execution units additionally include general-purpose logic that is programmable to perform parallel general-purpose computational operations, in addition to graphics processing operations. The general-purpose logic can perform processing operations in parallel or in conjunction with general-purpose logic within the processor core(s) 2407 of FIG. 24 or core 2502A-2502N as in FIG. 25.

Output data generated by threads executing on the graphics core array 2714 can output data to memory in a unified return buffer (URB) 2718. The URB 2718 can store data for multiple threads. In some embodiments the URB 2718 may be used to send data between different threads executing on the graphics core array 2714. In some embodiments the URB 2718 may additionally be used for synchronization between threads on the graphics core array and fixed function logic within the shared function logic 2720.

In some embodiments, graphics core array 2714 is scalable, such that the array includes a variable number of graphics cores, each having a variable number of execution units based on the target power and performance level of GPE 2710. In one embodiment the execution resources are dynamically scalable, such that execution resources may be enabled or disabled as needed.

The graphics core array 2714 couples with shared function logic 2720 that includes multiple resources that are shared between the graphics cores in the graphics core array. The shared functions within the shared function logic 2720 are hardware logic units that provide specialized supplemental functionality to the graphics core array 2714. In various embodiments, shared function logic 2720 includes but is not limited to sampler 2721, math 2722, and inter-thread communication (ITC) 2723 logic. Additionally, some embodiments implement one or more cache(s) 2725 within the shared function logic 2720. A shared function is implemented where the demand for a given specialized function is insufficient for inclusion within the graphics core array 2714. Instead a single instantiation of that specialized function is implemented as a stand-alone entity in the shared function logic 2720 and shared among the execution resources within the graphics core array 2714. The precise set of functions that are shared between the graphics core array 2714 and included within the graphics core array 2714 varies between embodiments.

Figure 28:
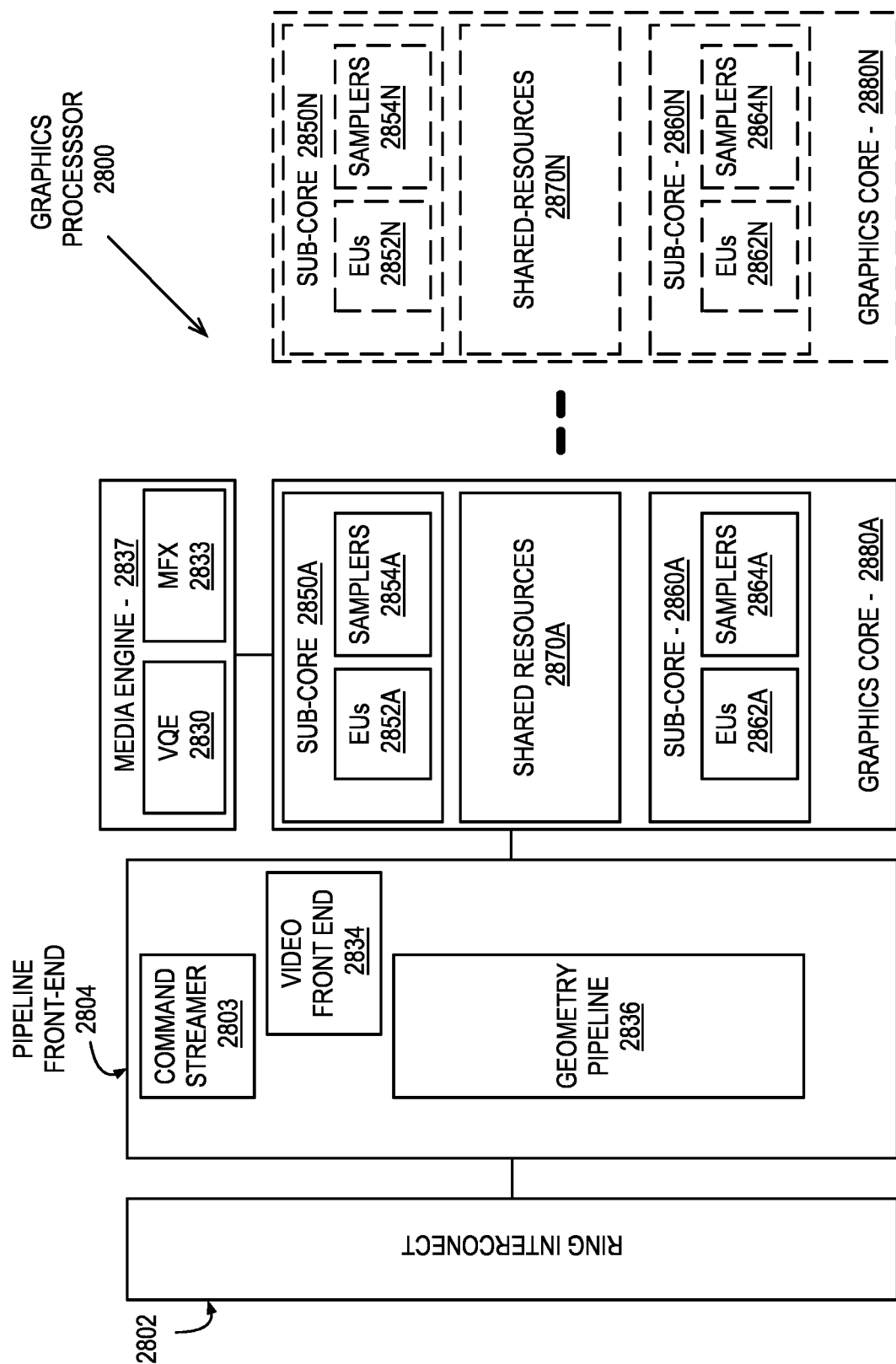
FIG. 28 is a block diagram of a graphics processor provided by an additional embodiment.

FIG. 28 is a block diagram of another embodiment of a graphics processor 2800.

Elements of FIG. 28 having the same reference numbers (or names) as the elements of any other figure herein can operate or function in any manner similar to that described elsewhere herein, but are not limited to such.

In some embodiments, graphics processor 2800 includes a ring interconnect 2802, a pipeline front-end 2804, a media engine 2837, and graphics cores 2880A-2880N. In some embodiments, ring interconnect 2802 couples the graphics processor to other processing units, including other graphics processors or one or more general-purpose processor cores. In some embodiments, the graphics processor is one of many processors integrated within a multi-core processing system.

In some embodiments, graphics processor 2800 receives batches of commands via ring interconnect 2802. The incoming commands are interpreted by a command streamer 2803 in the pipeline front-end 2804. In some embodiments, graphics processor 2800 includes scalable execution logic to perform 3D geometry processing and media processing via the graphics core(s) 2880A-2880N. For 3D geometry processing commands, command streamer 2803 supplies commands to geometry pipeline 2836. For at least some media processing commands, command streamer 2803 supplies the commands to a video front end 2834, which couples with a media engine 2837. In some embodiments, media engine 2837 includes a Video Quality Engine (VQE) 2830 for video and image post-processing and a multi-format encode/decode (MFX) 2833 engine to provide hardware-accelerated media data encode and decode. In some embodiments, geometry pipeline 2836 and media engine 2837 each generate execution threads for the thread execution resources provided by at least one graphics core 2880A.

In some embodiments, graphics processor 2800 includes scalable thread execution resources featuring modular cores 2880A-2880N (sometimes referred to as core slices), each having multiple sub-cores 2850A-550N, 2860A-2860N (sometimes referred to as core sub-slices). In some embodiments, graphics processor 2800 can have any number of graphics cores 2880A through 2880N. In some embodiments, graphics processor 2800 includes a graphics core 2880A having at least a first sub-core 2850A and a second sub-core 2860A. In other embodiments, the graphics processor is a low power processor with a single sub-core (e.g., 2850A). In some embodiments, graphics processor 2800 includes multiple graphics cores 2880A-2880N, each including a set of first sub-cores 2850A-2850N and a set of second sub-cores 2860A-2860N. Each sub-core in the set of first sub-cores 2850A-2850N includes at least a first set of execution units 2852A-2852N and media/texture samplers 2854A-2854N. Each sub-core in the set of second sub-cores 2860A-2860N includes at least a second set of execution units 2862A-2862N and samplers 2864A-2864N. In some embodiments, each sub-core 2850A-2850N, 2860A-2860N shares a set of shared resources 2870A-2870N. In some embodiments, the shared resources include shared cache memory and pixel operation logic. Other shared resources may also be included in the various embodiments of the graphics processor.

Additional Exemplary Execution Units

Figure 29:
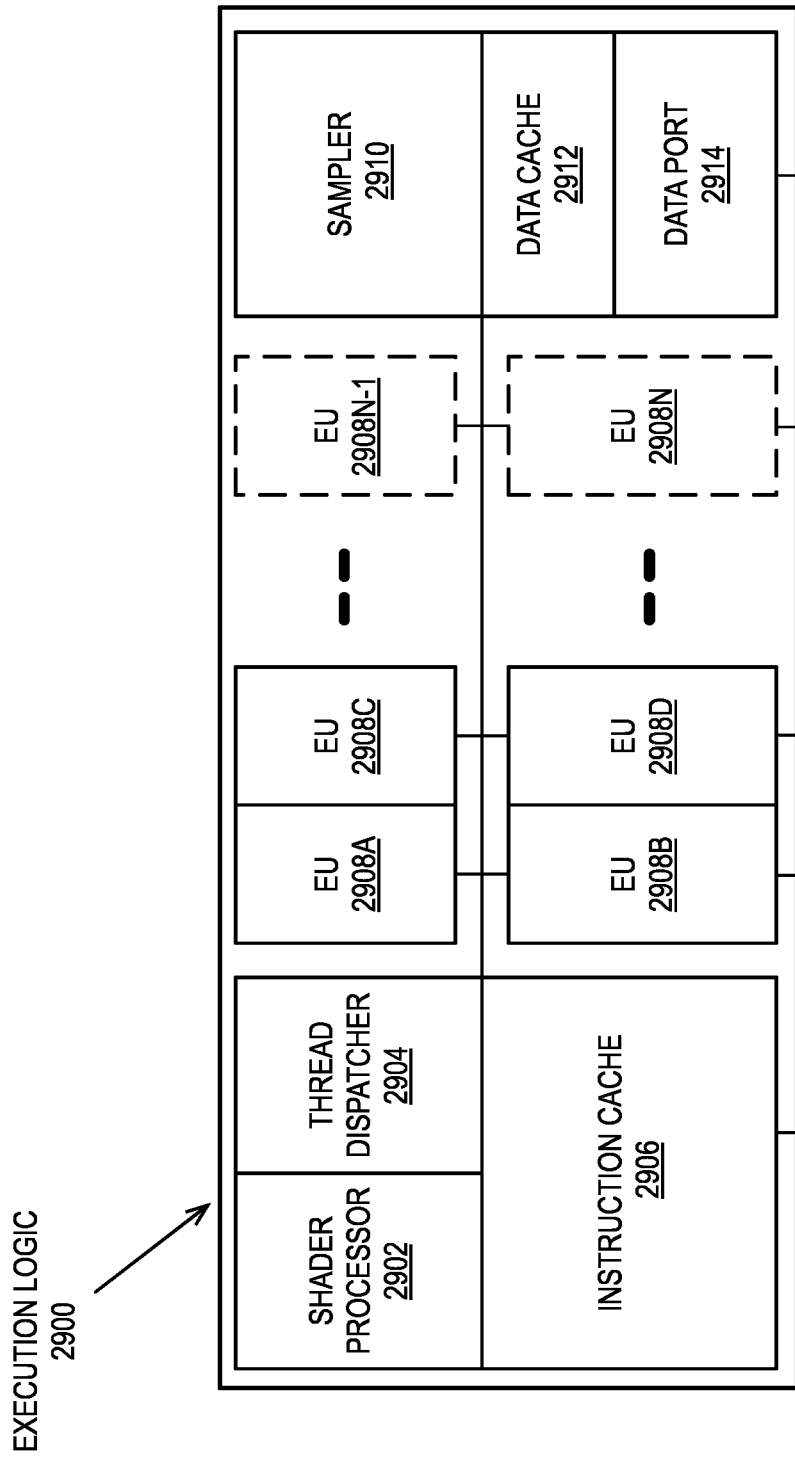
FIG. 29 illustrates thread execution logic including an array of processing elements employed in some embodiments.

FIG. 29 illustrates thread execution logic 2900 including an array of processing elements employed in some embodiments of a GPE. Elements of FIG. 29 having the same reference numbers (or names) as the elements of any other figure herein can operate or function in any manner similar to that described elsewhere herein but are not limited to such.

In some embodiments, thread execution logic 2900 includes a shader processor 2902, a thread dispatcher 2904, instruction cache 2906, a scalable execution unit array including a plurality of execution units 2908A-2908N, a sampler 2910, a data cache 2912, and a data port 2914. In one embodiment the scalable execution unit array can dynamically scale by enabling or disabling one or more execution units (e.g., any of execution unit 2908A, 2908B, 2908C, 2908D, through 2908N-1 and 2908N) based on the computational requirements of a workload. In one embodiment the included components are interconnected via an interconnect fabric that links to each of the components. In some embodiments, thread execution logic 2900 includes one or more connections to memory, such as system memory or cache memory, through one or more of instruction cache 2906, data port 2914, sampler 2910, and execution units 2908A-2908N. In some embodiments, each execution unit (e.g. 2908A) is a stand-alone programmable general-purpose computational unit that is capable of executing multiple simultaneous hardware threads while processing multiple data elements in parallel for each thread. In various embodiments, the array of execution units 2908A-2908N is scalable to include any number individual execution units.

In some embodiments, the execution units 2908A-2908N are primarily used to execute shader programs. A shader processor 2902 can process the various shader programs and dispatch execution threads associated with the shader programs via a thread dispatcher 2904. In one embodiment the thread dispatcher includes logic to arbitrate thread initiation requests from the graphics and media pipelines and instantiate the requested threads on one or more execution unit in the execution units 2908A-2908N. For example, the geometry pipeline (e.g., 2836 of FIG. 28) can dispatch vertex, tessellation, or geometry shaders to the thread execution logic 2900 (FIG. 29) for processing. In some embodiments, thread dispatcher 2904 can also process runtime thread spawning requests from the executing shader programs.

In some embodiments, the execution units 2908A-2908N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 2908A-2908N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating-point operations, SIMD branch capability, logical operations, transcendental operations, and other miscellaneous operations. While waiting for data from memory or one of the shared functions, dependency logic within the execution units 2908A-2908N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 2908A-2908N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 2908A-2908N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 2906) are included in the thread execution logic 2900 to cache thread instructions for the execution units. In some embodiments, one or more data caches (e.g., 2912) are included to cache thread data during thread execution. In some embodiments, a sampler 2910 is included to provide texture sampling for 3D operations and media sampling for media operations. In some embodiments, sampler 2910 includes specialized texture or media sampling functionality to process texture or media data during the sampling process before providing the sampled data to an execution unit.

During execution, the graphics and media pipelines send thread initiation requests to thread execution logic 2900 via thread spawning and dispatch logic. Once a group of geometric objects has been processed and rasterized into pixel data, pixel processor logic (e.g., pixel shader logic, fragment shader logic, etc.) within the shader processor 2902 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 2902 then executes an application programming interface (API)-supplied pixel or fragment shader program. To execute the shader program, the shader processor 2902 dispatches threads to an execution unit (e.g., 2908A) via thread dispatcher 2904. In some embodiments, shader processor 2902 uses texture sampling logic in the sampler 2910 to access texture data in texture maps stored in memory. Arithmetic operations on the texture data and the input geometry data compute pixel color data for each geometric fragment, or discards one or more pixels from further processing.

In some embodiments, the data port 2914 provides a memory access mechanism for the thread execution logic 2900 output processed data to memory for processing on a graphics processor output pipeline. In some embodiments, the data port 2914 includes or couples to one or more cache memories (e.g., data cache 2912) to cache data for memory access via the data port.

FIG. 30 is a block diagram illustrating a graphics processor instruction formats 3000 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 3000 described and illustrated are macroinstructions, in that they are instructions supplied to the execution unit, as opposed to micro-operations resulting from instruction decode once the instruction is processed.

In some embodiments, the graphics processor execution units natively support instructions in a 128-bit instruction format 3010. A 64-bit compacted instruction format 3030 is available for some instructions based on the selected instruction, instruction options, and number of operands. The native 128-bit instruction format 710 provides access to all instruction options, while some options and operations are restricted in the 64-bit format 3030. The native instructions available in the 64-bit format 3030 vary by embodiment. In some embodiments, the instruction is compacted in part using a set of index values in an index field 3013. The execution unit hardware references a set of compaction tables based on the index values and uses the compaction table outputs to reconstruct a native instruction in the 128-bit instruction format 3010.

For each format, instruction opcode 3012 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 3014 enables control over certain execution options, such as channels selection (e.g., predication) and data channel order (e.g., swizzle). For instructions in the 128-bit instruction format 3010 an exec-size field 3016 limits the number of data channels that will be executed in parallel. In some embodiments, exec-size field 3016 is not available for use in the 64-bit compact instruction format 3030.

Some execution unit instructions have up to three operands including two source operands, src0 3020, src1 3022, and one destination 3018. In some embodiments, the execution units support dual destination instructions, where one of the destinations is implied. Data manipulation instructions can have a third source operand (e.g., SRC2 3024), where the instruction opcode 3012 determines the number of source operands. An instruction's last source operand can be an immediate (e.g., hard-coded) value passed with the instruction.

In some embodiments, the 128-bit instruction format 3010 includes an access/address mode field 3026 specifying, for example, whether direct register addressing mode or indirect register addressing mode is used. When direct register addressing mode is used, the register address of one or more operands is directly provided by bits in the instruction.

In some embodiments, the 128-bit instruction format 3010 includes an access/address mode field 3026, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 3026 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 3012 bit-fields to simplify Opcode decode 3040. For an 8-bit opcode, bits 4, 5, and 6 allow the execution unit to determine the type of opcode. The precise opcode grouping shown is merely an example. In some embodiments, a move and logic opcode group 3042 includes data movement and logic instructions (e.g., move (mov), compare (cmp)). In some embodiments, move and logic group 3042 shares the five most significant bits (MSB), where move (mov) instructions are in the form of 0000xxxxb and logic instructions are in the form of 0001xxxxb. A flow control instruction group 3044 (e.g., call, jump (jmp)) includes instructions in the form of 0010xxxxb (e.g., 0x20). A miscellaneous instruction group 3046 includes a mix of instructions, including synchronization instructions (e.g., wait, send) in the form of 0011xxxxb (e.g., 0x30). A parallel math instruction group 3048 includes component-wise arithmetic instructions (e.g., add, multiply (mul)) in the form of 0100xxxxb (e.g., 0x40). The parallel math group 3048 performs the arithmetic operations in parallel across data channels. The vector math group 3050 includes arithmetic instructions (e.g., dp4) in the form of 0101xxxxb (e.g., 0x50). The vector math group performs arithmetic such as dot product calculations on vector operands.

Additional Exemplary Graphics Pipeline

Figure 31:
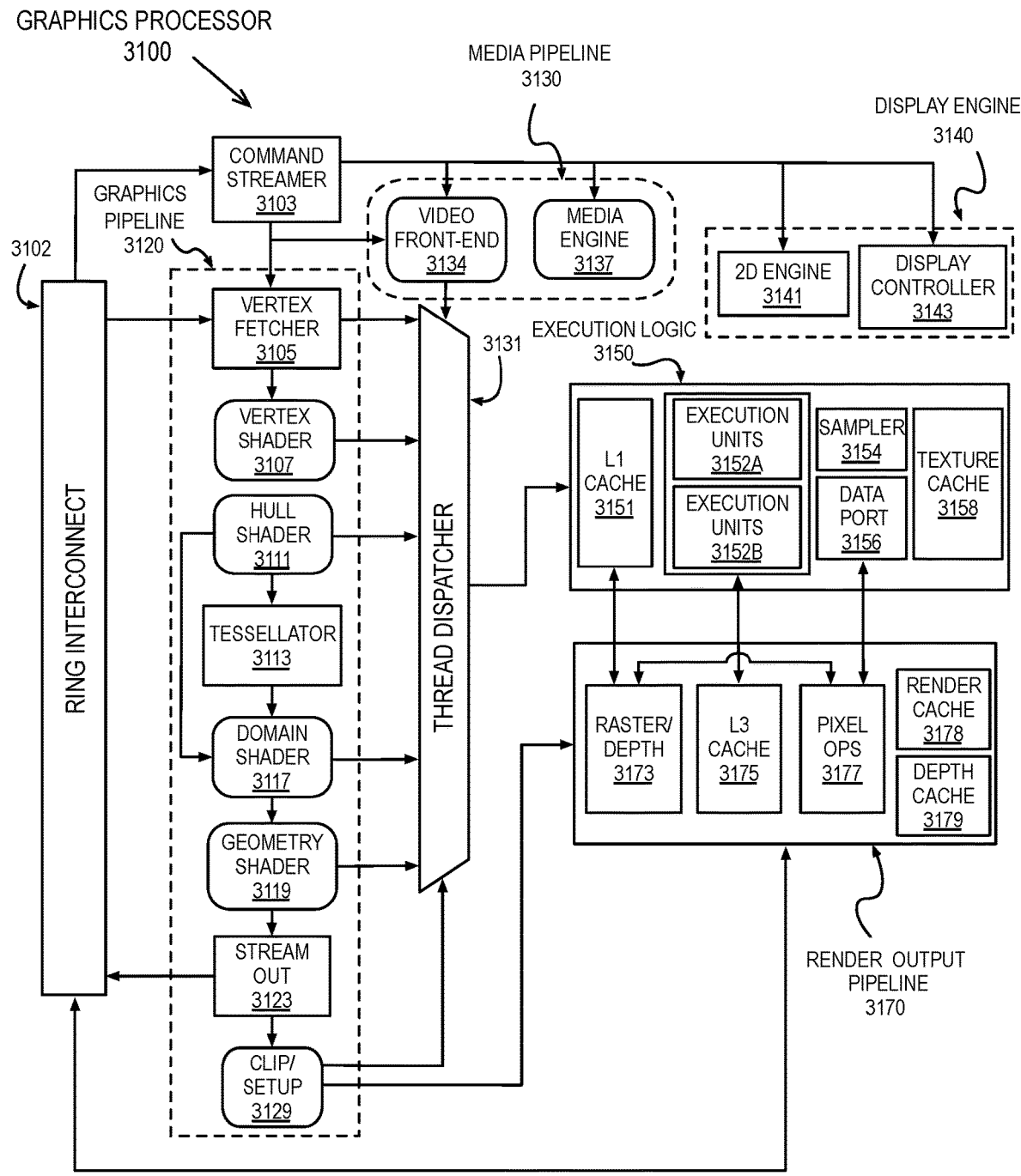
FIG. 31 is a block diagram of a graphics processor according to another embodiment.

FIG. 31 is a block diagram of another embodiment of a graphics processor 3100. Elements of FIG. 31 having the same reference numbers (or names) as the elements of any other figure herein can operate or function in any manner similar to that described elsewhere herein, but are not limited to such.

In some embodiments, graphics processor 3100 includes a graphics pipeline 3120, a media pipeline 3130, a display engine 3140, thread execution logic 3150, and a render output pipeline 3170. In some embodiments, graphics processor 3100 is a graphics processor within a multi-core processing system that includes one or more general-purpose processing cores. The graphics processor is controlled by register writes to one or more control registers (not shown) or via commands issued to graphics processor 3100 via a ring interconnect 3102. In some embodiments, ring interconnect 3102 couples graphics processor 3100 to other processing components, such as other graphics processors or general-purpose processors. Commands from ring interconnect 3102 are interpreted by a command streamer 3103, which supplies instructions to individual components of graphics pipeline 3120 or media pipeline 3130.

In some embodiments, command streamer 3103 directs the operation of a vertex fetcher 3105 that reads vertex data from memory and executes vertex-processing commands provided by command streamer 3103. In some embodiments, vertex fetcher 3105 provides vertex data to a vertex shader 3107, which performs coordinate space transformation and lighting operations to each vertex. In some embodiments, vertex fetcher 3105 and vertex shader 3107 execute vertex-processing instructions by dispatching execution threads to execution units 3152A-3152B via a thread dispatcher 3131.

In some embodiments, execution units 3152A-3152B are an array of vector processors having an instruction set for performing graphics and media operations. In some embodiments, execution units 3152A-3152B have an attached L1 cache 3151 that is specific for each array or shared between the arrays. The cache can be configured as a data cache, an instruction cache, or a single cache that is partitioned to contain data and instructions in different partitions.

In some embodiments, graphics pipeline 3120 includes tessellation components to perform hardware-accelerated tessellation of 3D objects. In some embodiments, a programmable hull shader 811 configures the tessellation operations. A programmable domain shader 817 provides backend evaluation of tessellation output. A tessellator 3113 operates at the direction of hull shader 3111 and contains special purpose logic to generate a set of detailed geometric objects based on a coarse geometric model that is provided as input to graphics pipeline 3120. In some embodiments, if tessellation is not used, tessellation components (e.g., hull shader 3111, tessellator 3113, and domain shader 3117) can be bypassed.

In some embodiments, complete geometric objects can be processed by a geometry shader 3119 via one or more threads dispatched to execution units 3152A-3152B, or can proceed directly to the clipper 3129. In some embodiments, the geometry shader operates on entire geometric objects, rather than vertices or patches of vertices as in previous stages of the graphics pipeline. If the tessellation is disabled the geometry shader 3119 receives input from the vertex shader 3107. In some embodiments, geometry shader 3119 is programmable by a geometry shader program to perform geometry tessellation if the tessellation units are disabled.

Before rasterization, a clipper 3129 processes vertex data. The clipper 3129 may be a fixed function clipper or a programmable clipper having clipping and geometry shader functions. In some embodiments, a rasterizer and depth test component 3173 in the render output pipeline 3170 dispatches pixel shaders to convert the geometric objects into their per pixel representations. In some embodiments, pixel shader logic is included in thread execution logic 3150. In some embodiments, an application can bypass the rasterizer and depth test component 3173 and access un-rasterized vertex data via a stream out unit 3123.

The graphics processor 3100 has an interconnect bus, interconnect fabric, or some other interconnect mechanism that allows data and message passing amongst the major components of the processor. In some embodiments, execution units 3152A-3152B and associated cache(s) 3151, texture and media sampler 3154, and texture/sampler cache 3158 interconnect via a data port 3156 to perform memory access and communicate with render output pipeline components of the processor. In some embodiments, sampler 3154, caches 3151, 3158 and execution units 3152A-3152B each have separate memory access paths.

In some embodiments, render output pipeline 3170 contains a rasterizer and depth test component 3173 that converts vertex-based objects into an associated pixel-based representation. In some embodiments, the rasterizer logic includes a windower/masker unit to perform fixed function triangle and line rasterization. An associated render cache 3178 and depth cache 3179 are also available in some embodiments. A pixel operations component 3177 performs pixel-based operations on the data, though in some instances, pixel operations associated with 2D operations (e.g. bit block image transfers with blending) are performed by the 2D engine 3141, or substituted at display time by the display controller 3143 using overlay display planes. In some embodiments, a shared L3 cache 3175 is available to all graphics components, allowing the sharing of data without the use of main system memory.

In some embodiments, graphics processor media pipeline 3130 includes a media engine 3137 and a video front end 3134. In some embodiments, video front end 3134 receives pipeline commands from the command streamer 3103. In some embodiments, media pipeline 3130 includes a separate command streamer. In some embodiments, video front-end 3134 processes media commands before sending the command to the media engine 3137. In some embodiments, media engine 3137 includes thread spawning functionality to spawn threads for dispatch to thread execution logic 3150 via thread dispatcher 3131.

In some embodiments, graphics processor 3100 includes a display engine 3140. In some embodiments, display engine 3140 is external to processor 3100 and couples with the graphics processor via the ring interconnect 3102, or some other interconnect bus or fabric. In some embodiments, display engine 3140 includes a 2D engine 3141 and a display controller 3143. In some embodiments, display engine 3140 contains special purpose logic capable of operating independently of the 3D pipeline. In some embodiments, display controller 3143 couples with a display device (not shown), which may be a system integrated display device, as in a laptop computer, or an external display device attached via a display device connector.

In some embodiments, graphics pipeline 3120 and media pipeline 3130 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 32A is a block diagram illustrating a graphics processor command format 3200 according to some embodiments. FIG. 32B is a block diagram illustrating a graphics processor command sequence 3210 according to an embodiment. The solid lined boxes in FIG. 32A illustrate the components that are generally included in a graphics command while the dashed lines include components that are optional or that are only included in a sub-set of the graphics commands. The exemplary graphics processor command format 3200 of FIG. 32A includes data fields to identify a target client 3202 of the command, a command operation code (opcode) 3204, and the relevant data 3206 for the command. A sub-opcode 3205 and a command size 3208 are also included in some commands.

In some embodiments, client 3202 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 3204 and, if present, sub-opcode 3205 to determine the operation to perform. The client unit performs the command using information in data field 3206. For some commands an explicit command size 3208 is expected to specify the size of the command. In some embodiments, the command parser automatically determines the size of at least some of the commands based on the command opcode. In some embodiments commands are aligned via multiples of a double word.

The flow diagram in FIG. 32B shows an exemplary graphics processor command sequence 3210. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 3210 may begin with a pipeline flush command 3212 to cause any active graphics pipeline to complete the currently pending commands for the pipeline. In some embodiments, the 3D pipeline 3222 and the media pipeline 3224 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 3212 can be used for pipeline synchronization or before placing the graphics processor into a low power state.

In some embodiments, a pipeline select command 3213 is used when a command sequence requires the graphics processor to explicitly switch between pipelines. In some embodiments, a pipeline select command 3213 is required only once within an execution context before issuing pipeline commands unless the context is to issue commands for both pipelines. In some embodiments, a pipeline flush command 3212 is required immediately before a pipeline switch via the pipeline select command 3213.

In some embodiments, a pipeline control command 3214 configures a graphics pipeline for operation and is used to program the 3D pipeline 3222 and the media pipeline 3224. In some embodiments, pipeline control command 3214 configures the pipeline state for the active pipeline. In one embodiment, the pipeline control command 3214 is used for pipeline synchronization and to clear data from one or more cache memories within the active pipeline before processing a batch of commands.

In some embodiments, return buffer state commands 3216 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 3216 includes selecting the size and number of return buffers to use for a set of pipeline operations.

The remaining commands in the command sequence differ based on the active pipeline for operations. Based on a pipeline determination 3220, the command sequence is tailored to the 3D pipeline 3222 beginning with the 3D pipeline state 3230 or the media pipeline 3224 beginning at the media pipeline state 3240.

The commands to configure the 3D pipeline state 3230 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 3230 commands are also able to selectively disable or bypass certain pipeline elements if those elements will not be used.

In some embodiments, 3D primitive 3232 command is used to submit 3D primitives to be processed by the 3D pipeline. Commands and associated parameters that are passed to the graphics processor via the 3D primitive 3232 command are forwarded to the vertex fetch function in the graphics pipeline. The vertex fetch function uses the 3D primitive 3232 command data to generate vertex data structures. The vertex data structures are stored in one or more return buffers. In some embodiments, 3D primitive 3232 command is used to perform vertex operations on 3D primitives via vertex shaders. To process vertex shaders, 3D pipeline 3222 dispatches shader execution threads to graphics processor execution units.

In some embodiments, 3D pipeline 3222 is triggered via an execute 3234 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 3210 follows the media pipeline 3224 path when performing media operations. In general, the specific use and manner of programming for the media pipeline 3224 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 3224 is configured in a similar manner as the 3D pipeline 3222. A set of commands to configure the media pipeline state 3240 are dispatched or placed into a command queue before the media object commands 3242. In some embodiments, media pipeline state commands 3240 include data to configure the media pipeline elements that will be used to process the media objects. This includes data to configure the video decode and video encode logic within the media pipeline, such as encode or decode format. In some embodiments, media pipeline state commands 3240 also support the use of one or more pointers to "indirect" state elements that contain a batch of state settings.

In some embodiments, media object commands 3242 supply pointers to media objects for processing by the media pipeline. The media objects include memory buffers containing video data to be processed. In some embodiments, all media pipeline states must be valid before issuing a media object command 3242. Once the pipeline state is configured and media object commands 3242 are queued, the media pipeline 3224 is triggered via an execute command 3244 or an equivalent execute event (e.g., register write). Output from media pipeline 3224 may then be post processed by operations provided by the 3D pipeline 3222 or the media pipeline 3224. In some embodiments, GPGPU operations are configured and executed in a similar manner as media operations.

Graphics Software Architecture

Figure 33:
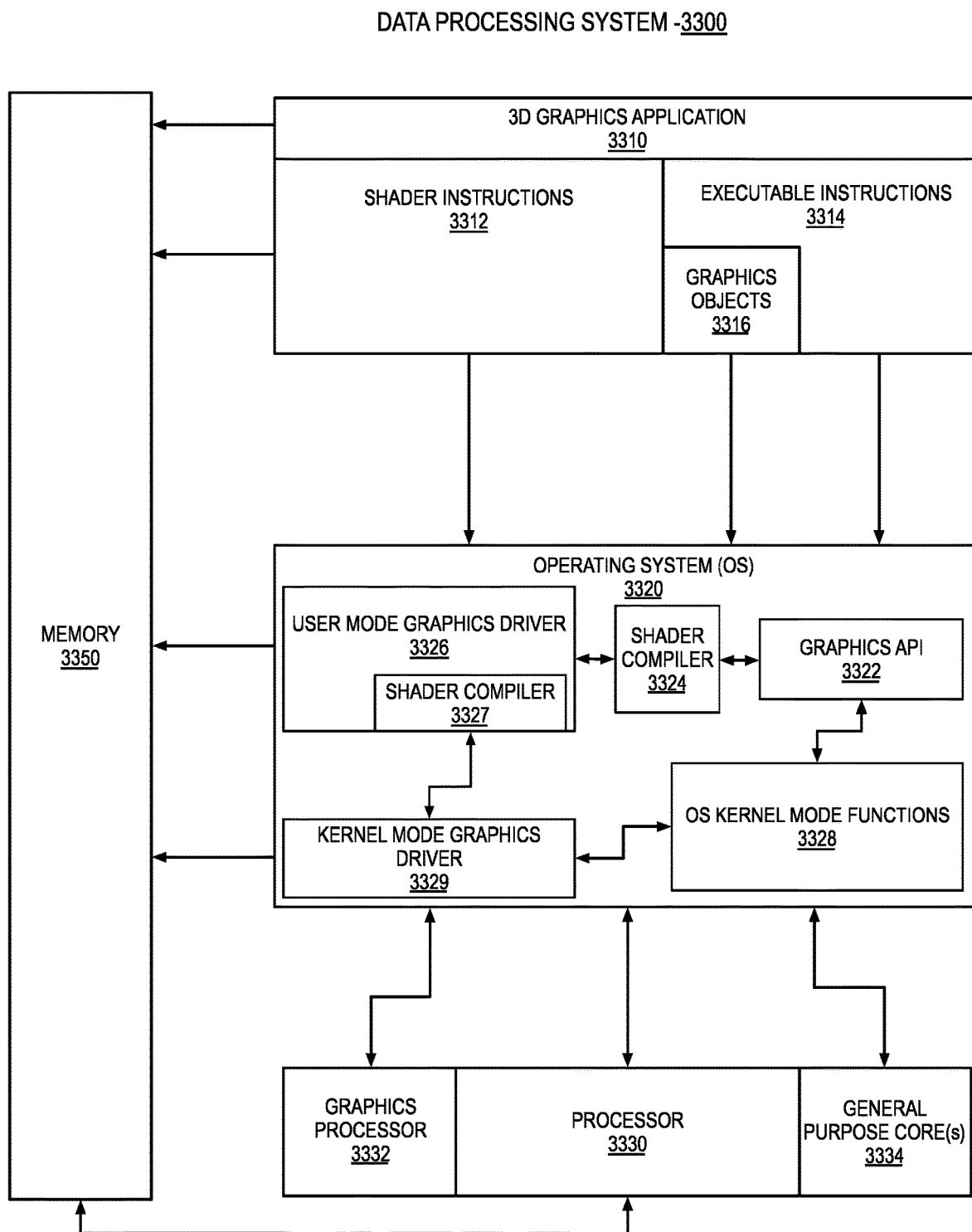
FIG. 33 illustrates exemplary graphics software architecture for a data processing system according to some embodiments.

FIG. 33 illustrates exemplary graphics software architecture for a data processing system 3300 according to some embodiments. In some embodiments, software architecture includes a 3D graphics application 3310, an operating system 3320, and at least one processor 3330. In some embodiments, processor 3330 includes a graphics processor 3332 and one or more general-purpose processor core(s) 3334. The graphics application 3310 and operating system 3320 each execute in the system memory 3350 of the data processing system.

In some embodiments, 3D graphics application 3310 contains one or more shader programs including shader instructions 3312. The shader language instructions may be in a high-level shader language, such as the High Level Shader Language (HLSL) or the OpenGL Shader Language (GLSL). The application also includes executable instructions 3314 in a machine language suitable for execution by the general-purpose processor core 3334. The application also includes graphics objects 3316 defined by vertex data.

In some embodiments, operating system 3320 is a Microsoft® Windows® operating system from the Microsoft Corporation, a proprietary UNIX-like operating system, or an open source UNIX-like operating system using a variant of the Linux kernel. The operating system 3320 can support a graphics API 3322 such as the Direct3D API, the OpenGL API, or the Vulkan API. When the Direct3D API is in use, the operating system 3320 uses a front-end shader compiler 3324 to compile any shader instructions 3312 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 3310. In some embodiments, the shader instructions 3312 are provided in an intermediate form, such as a version of the Standard Portable Intermediate Representation (SPIR) used by the Vulkan API.

In some embodiments, user mode graphics driver 3326 contains a back-end shader compiler 3327 to convert the shader instructions 3312 into a hardware specific representation. When the OpenGL API is in use, shader instructions 3312 in the GLSL high-level language are passed to a user mode graphics driver 3326 for compilation. In some embodiments, user mode graphics driver 3326 uses operating system kernel mode functions 3328 to communicate with a kernel mode graphics driver 3329. In some embodiments, kernel mode graphics driver 3329 communicates with graphics processor 3332 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 34:
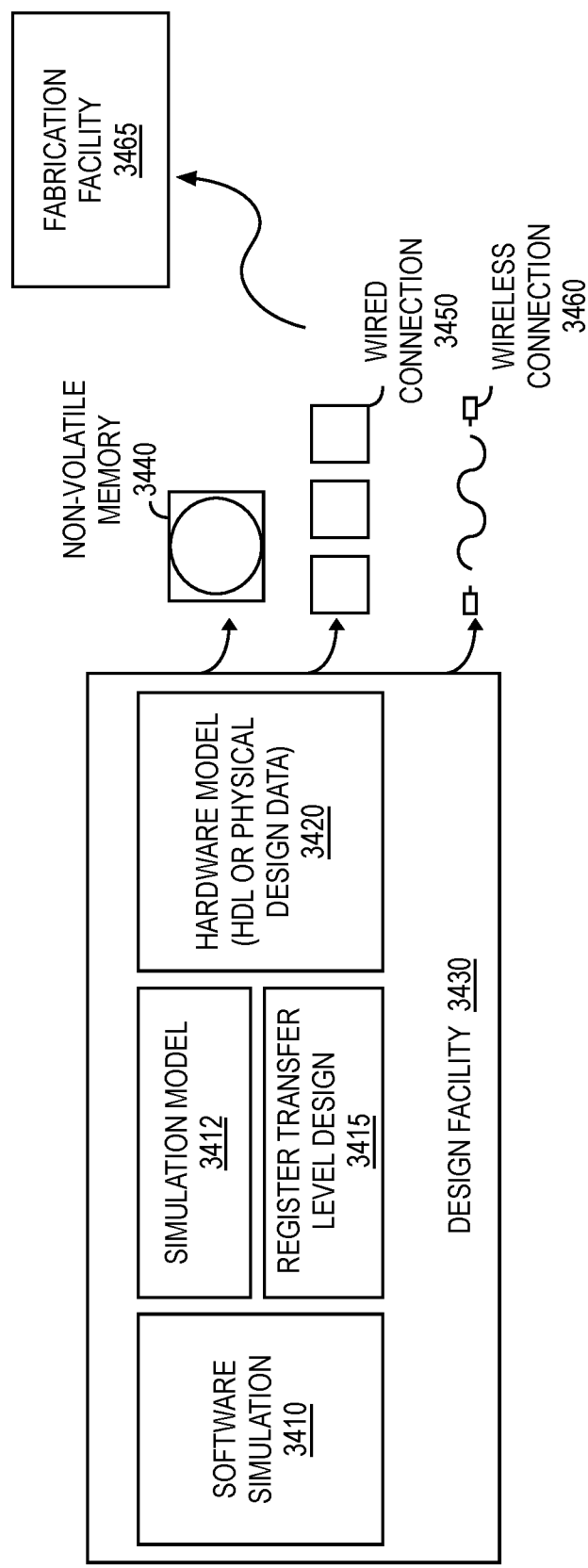
FIG. 34 is a block diagram illustrating an IP core development system, according to an embodiment.

FIG. 34 is a block diagram illustrating an IP core development system 3400 that may be used to manufacture an integrated circuit to perform operations according to an embodiment. The IP core development system 3400 may be used to generate modular, re-usable designs that can be incorporated into a larger design or used to construct an entire integrated circuit (e.g., an SOC integrated circuit). A design facility 3430 can generate a software simulation 3410 of an IP core design in a high level programming language (e.g., C/C++). The software simulation 3410 can be used to design, test, and verify the behavior of the IP core using a simulation model 3412. The simulation model 3412 may include functional, behavioral, and/or timing simulations. A register transfer level (RTL) design 3415 can then be created or synthesized from the simulation model 3412. The RTL design 3415 is an abstraction of the behavior of the integrated circuit that models the flow of digital signals between hardware registers, including the associated logic performed using the modeled digital signals. In addition to an RTL design 3415, lower-level designs at the logic level or transistor level may also be created, designed, or synthesized. Thus, the particular details of the initial design and simulation may vary.

The RTL design 3415 or equivalent may be further synthesized by the design facility into a hardware model 3420, which may be in a hardware description language (HDL), or some other representation of physical design data. The HDL may be further simulated or tested to verify the IP core design. The IP core design can be stored for delivery to a $3^{rd}$ party fabrication facility 3465 using non-volatile memory 3440 (e.g., hard disk, flash memory, or any non-volatile storage medium). Alternatively, the IP core design may be transmitted (e.g., via the Internet) over a wired connection 3450 or wireless connection 3460. The fabrication facility 3465 may then fabricate an integrated circuit that is based at least in part on the IP core design. The fabricated integrated circuit can be configured to perform operations in accordance with at least one embodiment described herein.

Exemplary System on a Chip Integrated Circuit

Figure 35:
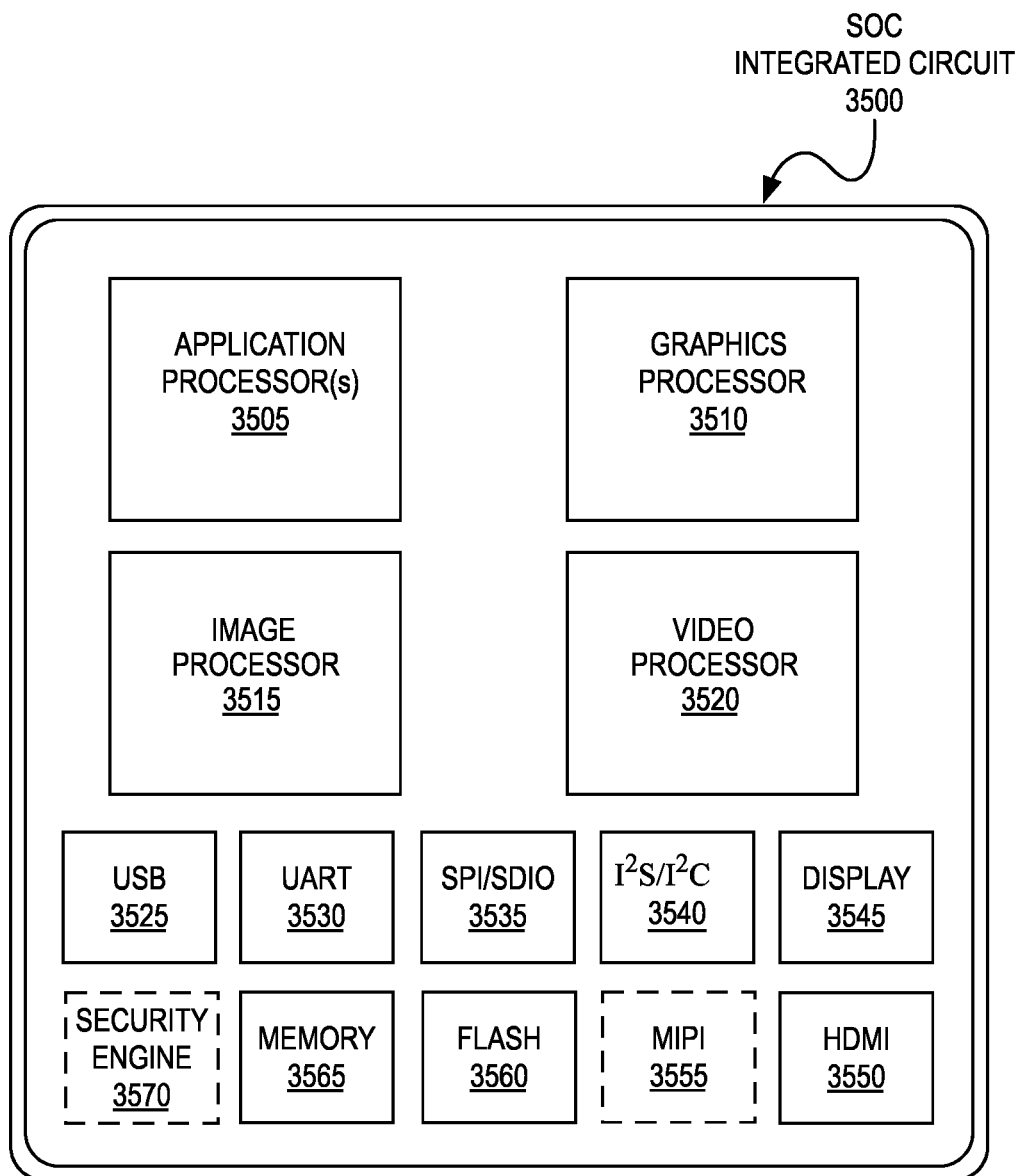
FIG. 35 is a block diagram illustrating an exemplary system on a chip integrated circuit, according to an embodiment.
Figure 36:
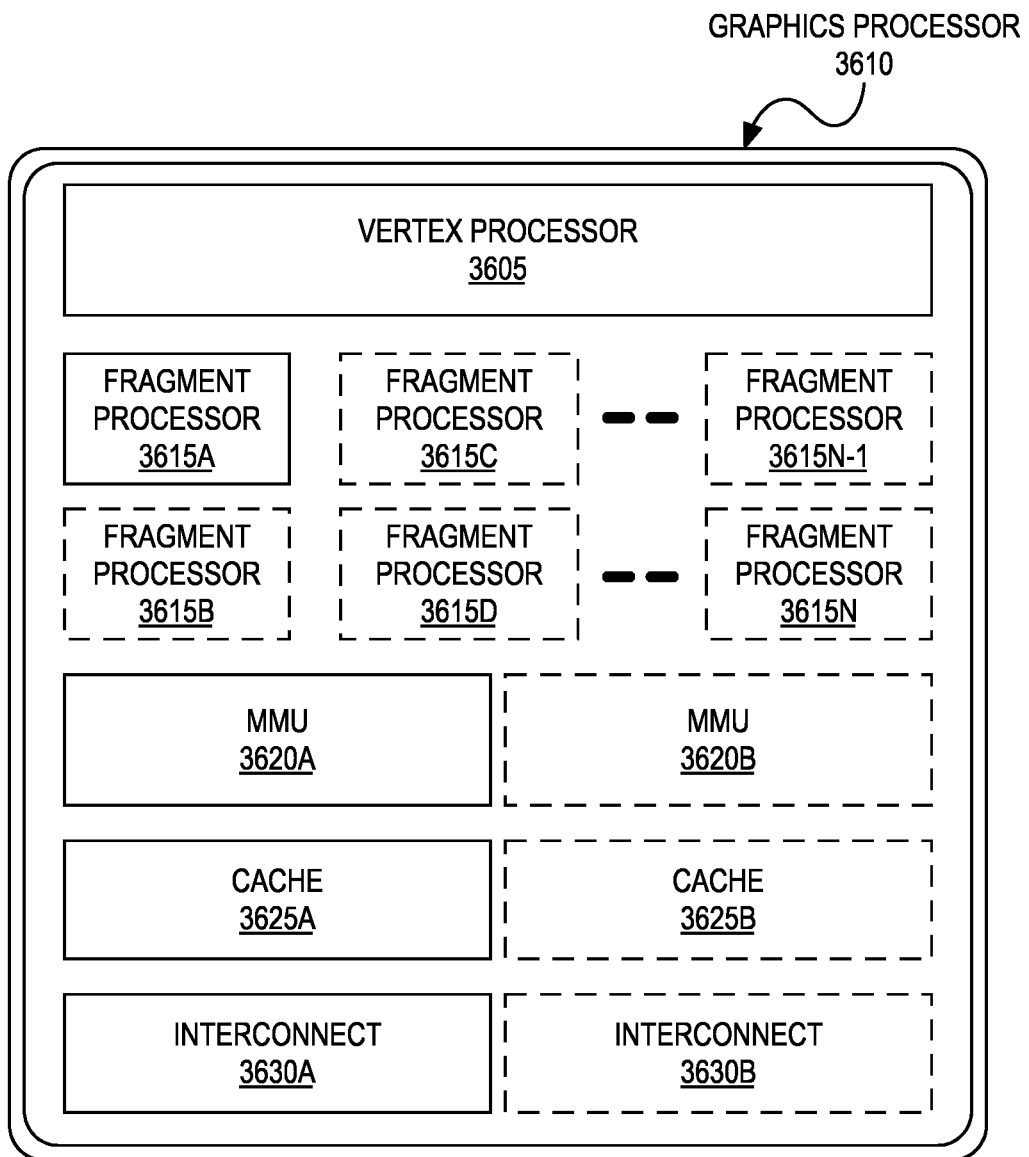
FIG. 36 is a block diagram illustrating an additional graphics processor, according to an embodiment.
Figure 37:
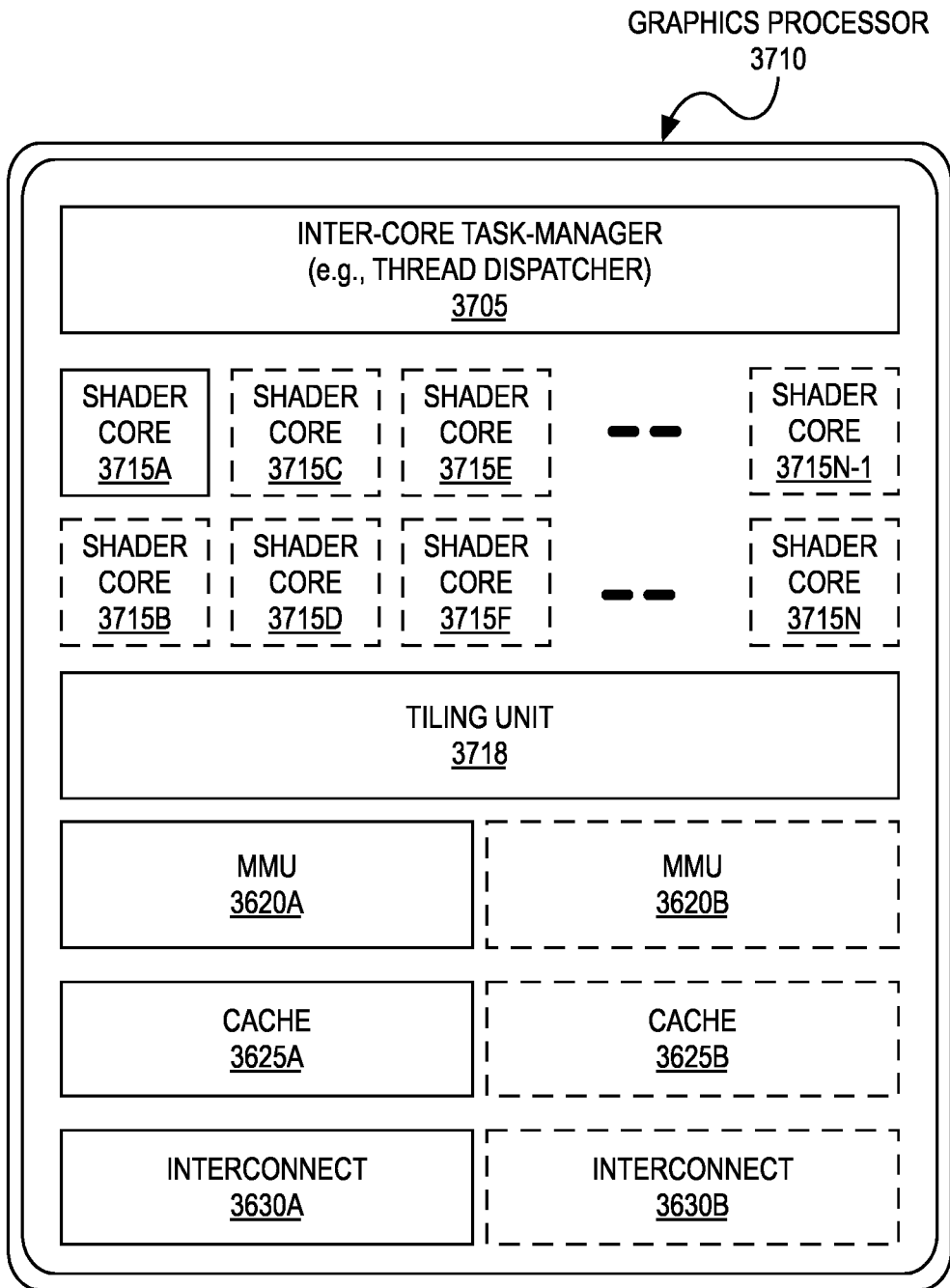
FIG. 37 is a block diagram illustrating an additional exemplary graphics processor of a system on a chip integrated circuit, according to an embodiment.

FIG. 35-37 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 35 is a block diagram illustrating an exemplary system on a chip integrated circuit 3500 that may be fabricated using one or more IP cores, according to an embodiment. Exemplary integrated circuit 3500 includes one or more application processor(s) 3505 (e.g., CPUs), at least one graphics processor 3510, and may additionally include an image processor 3515 and/or a video processor 3520, any of which may be a modular IP core from the same or multiple different design facilities. Integrated circuit 3500 includes peripheral or bus logic including a USB controller 3525, UART controller 3530, an SPI/SDIO controller 3535, and an $I^2/I^2C$ controller 3540. Additionally, the integrated circuit can include a display device 3545 coupled to one or more of a high-definition multimedia interface (HDMI) controller 3550 and a mobile industry processor interface (MIPI) display interface 3555. Storage may be provided by a flash memory subsystem 3560 including flash memory and a flash memory controller. Memory interface may be provided via a memory controller 3565 for access to SDRAM or SRAM memory devices. Some integrated circuits additionally include an embedded security engine 3570.

FIG. 36 is a block diagram illustrating an exemplary graphics processor 3610 of a system on a chip integrated circuit that may be fabricated using one or more IP cores, according to an embodiment. Graphics processor 3610 can be a variant of the graphics processor 3610 of FIG. 36. Graphics processor 3610 includes a vertex processor 3605 and one or more fragment processor(s) 3615A-3615N (e.g., 3615A, 3615B, 3615C, 3615D, through 3615N-1, and 3615N). Graphics processor 3610 can execute different shader programs via separate logic, such that the vertex processor 3605 is optimized to execute operations for vertex shader programs, while the one or more fragment processor(s) 3615A-3615N execute fragment (e.g., pixel) shading operations for fragment or pixel shader programs. The vertex processor 3605 performs the vertex processing stage of the 3D graphics pipeline and generates primitives and vertex data. The fragment processor(s) 3615A-3615N use the primitive and vertex data generated by the vertex processor 3605 to produce a framebuffer that is displayed on a display device. In one embodiment, the fragment processor(s) 3615A-3615N are optimized to execute fragment shader programs as provided for in the OpenGL API, which may be used to perform similar operations as a pixel shader program as provided for in the Direct 3D API.

Graphics processor 3610 additionally includes one or more memory management units (MMUs) 3620A-3620B, cache(s) 3625A-3625B, and circuit interconnect(s) 3630A-3630B. The one or more MMU(s) 3620A-3620B provide for virtual to physical address mapping for graphics processor 3610, including for the vertex processor 3605 and/or fragment processor(s) 3615A-3615N, which may reference vertex or image/texture data stored in memory, in addition to vertex or image/texture data stored in the one or more cache(s) 3625A-3625B. In one embodiment the one or more MMU(s) 3625A-3625B may be synchronized with other MMUs within the system, including one or more MMUs associated with the one or more application processor(s) 3505, image processor 3515, and/or video processor 3520 of FIG. 35, such that each processor 3505-3520 can participate in a shared or unified virtual memory system. The one or more circuit interconnect(s) 3630A-3630B enable graphics processor 3610 to interface with other IP cores within the SoC, either via an internal bus of the SoC or via a direct connection, according to embodiments.

FIG. 37 is a block diagram illustrating an additional exemplary graphics processor 3710 of a system on a chip integrated circuit that may be fabricated using one or more IP cores, according to an embodiment. Graphics processor 3710 can be a variant of the graphics processor 3510 of FIG. 35. Graphics processor 3710 includes the one or more MMU(s) 3520A-3520B, caches 3525A-3525B, and circuit interconnects 3530A-3530B of the integrated circuit 3500 of FIG. 35.

Graphics processor 3710 includes one or more shader core(s) 3715A-3715N (e.g., 3715A, 3715B, 3715C, 3715D, 3715E, 3715F, through 3715N-1, and 3715N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 3710 includes an inter-core task manager 3705, which acts as a thread dispatcher to dispatch execution threads to one or more shader cores 3715A-3715N and a tiling unit 3718 to accelerate tiling operations for tile-based rendering, in which rendering operations for a scene are subdivided in image space, for example to exploit local spatial coherence within a scene or to optimize use of internal caches.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Various components can be a means for performing the operations or functions described.

The embodiments described herein refer to specific configurations of hardware, such as application specific integrated circuits (ASICs), configured to perform certain operations or having a predetermined functionality. Such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage devices of a given electronic device typically store code and/or data for execution on the set of one or more processors of that electronic device.

One embodiment provides a compute apparatus comprising a decode unit to decode a single instruction into a decoded instruction, the decoded instruction to cause the compute apparatus to perform a complex compute operation including multiple pipeline commands, a memory controller including a near-data compute unit, first circuitry to schedule the multiple pipeline commands to one or more of multiple types of compute units, and second circuitry to determine operations to perform for the single instruction. The multiple types of compute units include a general-purpose graphics compute unit and a near-data compute unit. The second circuitry coupled with the memory controller. The operations include to offload a compute kernel to the near-data compute unit and to offload the compute kernel to the near-data compute unit includes to determine an address range for a near-data compute operation within the compute kernel and offload the compute kernel to the near-data compute unit in response to a determination that the memory controller is associated with the address range of the near-data compute operation. The compute apparatus can additionally include third circuitry including a fetch unit to fetch the single instruction and store the single instruction to a cache memory. In one embodiment, the third circuitry additionally includes the decode unit. The compute apparatus can also include a machine learning accelerator to determine a set of operations to perform to execute the decoded instruction, where the set of operations includes to offload the compute kernel to the near-data compute unit and determine the multiple pipeline commands to perform for the complex compute operation.

In a further embodiment, the complex compute operation causes the compute apparatus to perform a convolution for a layer of a convolutional neural network, where the convolution includes multiple matrix operations. The multiple types of compute units can include a sparse compute unit that is configured to accelerate primitives associated with the multiple matrix operations, where the multiple matrix operations are performed on one or more sparse matrices. The offloaded compute kernel can perform a gather operation to read elements of the one or more sparse matrices from memory or a scatter operation to write elements of a sparse output matrix to memory, where the sparse output matrix is generated by at least one of the multiple matrix operations.

One embodiment provides a method of performing machine learning operations. The method comprises decoding a single instruction into a decoded instruction, the decoded instruction associated with a set of multiple machine learning operations to be performed via a compute pipeline of a general-purpose graphics processing unit; determining a set of pipeline commands to perform the set of multiple machine learning operations, where the set of pipeline commands offload a near-data compute operation to a near-data compute unit and determining the set of pipeline commands to perform the set of multiple machine learning operations includes analyzing parameters associated with the decoded instruction. The method additionally includes scheduling the set of pipeline commands to the compute pipeline of the general-purpose graphics processing unit.

One embodiment provides a data processing system comprising a general-purpose graphics processing unit including a decode unit to decode a single instruction into a decoded instruction. The decoded instruction causes the data processing system to execute multiple pipeline commands to perform a complex machine learning compute operation. The data processing system additionally includes a memory coupled to the general-purpose graphics processing unit and a memory controller coupled with the general-purpose graphics processing unit and the memory, the memory controller including a near-data compute unit. The multiple pipeline commands include a command to offload an operation of a compute kernel to the near-data compute unit.

One embodiment provides a compute apparatus to perform compute operations, the compute apparatus comprising a decode unit to decode a single instruction into a decoded instruction, the decoded instruction to cause the compute apparatus to perform a complex compute operation including multiple pipeline commands; a micro-controller to execute firmware instructions, the firmware instructions to enable a parameter analyzer to determine a type of complex compute operation to perform for the single instruction; and a scheduler controller to schedule the multiple pipeline commands for the complex compute operation to one or more of multiple types of compute units, wherein the multiple types of compute units include a first sparse compute unit configured for input at a first level of sparsity and a second sparse compute unit configured for input at a second level of sparsity that is higher than the first level of sparsity.

Of course, one or more parts of an embodiment may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the embodiments may be practiced without some of these specific details. In certain instances, well-known structures and functions were not described in elaborate detail to avoid obscuring the inventive subject matter of the embodiments. Accordingly, the scope and spirit of the invention should be judged in terms of the claims that follow.

What is claimed is:

1. A parallel processor comprising:
a hardware scheduler to schedule pipeline commands for compute operations to one or more of multiple types of compute units, wherein the multiple types of compute units include a first sparse compute unit configured for input at a first level of sparsity and a second sparse compute unit configured for input at a second level of sparsity that is greater than the first level of sparsity;
a plurality of processing resources coupled with the hardware scheduler, the plurality of processing resources including the first sparse compute unit; and
hybrid memory circuitry coupled with the plurality of processing resources, the hybrid memory circuitry including a memory controller, a memory interface, and the second sparse compute unit.

2. The parallel processor of claim 1, the plurality of processing resources configured to access a device memory of the parallel processor via the memory interface of the hybrid memory circuitry.

3. The parallel processor of claim 1, the first sparse compute unit and the second sparse compute unit each include an array of processing elements configured to perform matrix operations on a plurality of input matrices.

4. The parallel processor of claim 3, the first sparse compute unit including a first number of processing elements and the second sparse compute unit including a second number of processing elements that is less than the first number of processing elements.

5. The parallel processor of claim 4, the first sparse compute unit including an internal randomly accessible memory and circuitry configured to store non-zero value elements of a first input matrix having the first level of sparsity to the internal randomly accessible memory.

6. The parallel processor of claim 4, the second sparse compute unit including a cache memory and second circuitry, the second circuitry configured to perform a gather operation to gather non-zero value elements of an input matrix having the second level of sparsity and store the non-zero value elements to the cache memory.

7. The parallel processor of claim 6, the second circuitry configured to gather the non-zero value elements from a second randomly accessible memory via the memory interface, the second randomly accessible memory including device memory of the parallel processor.

8. The parallel processor of claim 1, further comprising a microcontroller configured to implement the hardware scheduler.

9. The parallel processor of claim 8, the hardware scheduler configured to:
receive a first instruction to be scheduled;
schedule a first plurality of pipeline commands to the first sparse compute unit to implement operations associated with the first instruction;
receive a second instruction to be scheduled; and
schedule a second plurality of pipeline commands to the second sparse compute unit to implement operations associated with the second instruction.

10. A data processing system comprising:
a parallel processor comprising:
a hardware scheduler to schedule pipeline commands for compute operations to one or more of multiple types of compute units, wherein the multiple types of compute units include a first sparse compute unit configured for input at a first level of sparsity and a second sparse compute unit configured for input at a second level of sparsity that is greater than the first level of sparsity;
a plurality of processing resources coupled with the hardware scheduler, the plurality of processing resources including the first sparse compute unit; and
hybrid memory circuitry coupled with the plurality of processing resources, the hybrid memory circuitry including a memory controller, a memory interface, and the second sparse compute unit; and
a memory device coupled with the memory interface of the hybrid memory circuitry.

11. The data processing system of claim 10, the plurality of processing resources configured to access the memory device via the memory interface of the hybrid memory circuitry, wherein the memory device is a device memory of the data processing system.

12. The data processing system of claim 10, the first sparse compute unit and the second sparse compute unit each include an array of processing elements configured to perform matrix operations on a plurality of input matrices.

13. The data processing system of claim 12, the first sparse compute unit including a first number of processing elements and the second sparse compute unit including a second number of processing elements that is less than the first number of processing elements.

14. The data processing system of claim 10, further comprising a microcontroller configured to execute firmware to implement the hardware scheduler, wherein the multiple types of compute units additionally include general-purpose graphics compute units and the plurality of processing resources includes a general-purpose graphics compute unit.

15. The data processing system of claim 14, the hardware scheduler to schedule a pipeline command to the general-purpose graphics compute unit to cause execution of instructions associated with a kernel program.

16. The data processing system of claim 15, the hybrid memory circuitry including a near-data compute unit and the kernel program includes an instruction to offload a near-memory compute operation to the near-data compute unit.

17. A method comprising:
receiving a first instruction for execution at a parallel processor, the parallel processor including a first sparse compute unit configured for input at a first level of sparsity and a second sparse compute unit configured for input at a second level of sparsity that is greater than the first level of sparsity;
scheduling pipeline commands to enable execution of the first instruction via a hardware scheduler of the parallel processor, the pipeline commands scheduled to the first sparse compute unit;
receiving a second instruction for execution at the parallel processor; and
scheduling pipeline commands to enable execution of the second instruction via the hardware scheduler of the parallel processor, the pipeline commands scheduled to the second sparse compute unit.

18. The method of claim 17, wherein the first instruction is determined to be executed by the first sparse compute unit and the second instruction is determined to be executed by the second sparse compute unit.

19. The method of claim 18, wherein the first instruction is pre-determined to be executed by the first sparse compute unit by an instruction set architecture of the parallel processor.

20. The method of claim 18, wherein the second instruction is determined to be executed by the second sparse compute unit based on analysis of an input matrix associated with the second instruction.

* * * * *